(12) United States Patent
Mikami

(10) Patent No.: US 8,596,853 B2
(45) Date of Patent: Dec. 3, 2013

(54) BACKLIGHT AND LIQUID CRYSTAL DISPLAY APPARATUS

(75) Inventor: Kazuaki Mikami, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 810 days.

(21) Appl. No.: 12/207,515

(22) Filed: Sep. 10, 2008

(65) Prior Publication Data
US 2009/0073346 A1 Mar. 19, 2009

(30) Foreign Application Priority Data
Sep. 13, 2007 (JP) .................................. 2007-238379

(51) Int. Cl.
*F21V 7/04* (2006.01)

(52) U.S. Cl.
USPC .............................. 362/616; 362/612; 362/632

(58) Field of Classification Search
USPC .................................. 362/612, 616, 632–633
See application file for complete search history.

(56) References Cited

U.S. PATENT DOCUMENTS

| | | | |
|---|---|---|---|
| 6,512,557 B1 | 1/2003 | Miwa | |
| 6,951,401 B2 * | 10/2005 | Van Hees et al. | 362/612 |
| 7,139,046 B2 * | 11/2006 | Katahira | 349/58 |
| 7,585,098 B2 | 9/2009 | Mikami | |
| 7,708,450 B2 | 5/2010 | Mikami | |
| 2005/0180168 A1 * | 8/2005 | Chun et al. | 362/618 |
| 2005/0259444 A1 * | 11/2005 | Choi | 362/633 |
| 2006/0098458 A1 * | 5/2006 | Mikami | 362/632 |

FOREIGN PATENT DOCUMENTS

| | | |
|---|---|---|
| CN | 1773350 | 5/2006 |
| CN | 1885132 | 12/2006 |
| CN | 1971372 | 5/2007 |
| JP | 2001-108988 | 4/2001 |
| JP | 2004-184493 | 7/2004 |
| JP | 2004-199967 | 7/2004 |
| JP | 2004-296193 | 10/2004 |
| JP | 2007-207751 | 8/2007 |

OTHER PUBLICATIONS

Chinese Official Action—200810160811.2—Feb. 28, 2011.
JP Office Action dated Dec. 4, 2012, with English translation; Application No. 2008-206659.

* cited by examiner

*Primary Examiner* — Sean Gramling
(74) *Attorney, Agent, or Firm* — Young & Thompson

(57) ABSTRACT

The backlight includes a first light guide plate which emits a light inputted from an end face thereof from a main surface thereof, a second light guide plate which includes an end face for an incoming light and an end face for an emitting light, and which is arranged behind the first light guide plate, a reflection sheet which is arranged between the first light guide plate and the second light guide plate, a chassis which houses the first light guide plate, the second light guide plate and the reflection sheet, and a rear cover which fixes the first light guide plate, the second light guide plate and the reflection sheet with the chassis. The first light guide plate and the second light guide plate are positioned in a thickness direction thereof.

16 Claims, 37 Drawing Sheets

BACKLIGHT AND LIQUID CRYSTAL DISPLAY APPARATUS

This application is based upon and claims the benefit of priority from Japanese Patent Application No. 2007-238379, filed on Sep. 13, 2007, the disclosure of which is incorporated herein in its entirety by reference.

TECHNICAL FIELD

The present invention relates to a backlight and a liquid crystal display apparatus. In particular, the present invention relates to a backlight and a liquid crystal display apparatus to which a point light source such as a LED (Light Emitting Diode) is applied as a light source.

BACKGROUND ART

A LCD (Liquid Crystal Display) apparatus which is installed in a personal computer, a mobile phone or the like includes a liquid crystal display panel in which a liquid crystal layer is sandwiched between two substrates and includes a backlight arranged behind the liquid crystal display panel.

As a light source of the backlight, a linear light source such as a CCFL (Cold Cathode Fluorescent Lamp) or the like is used, as disclosed in Japan patent application publication number 2001-108988 (hereinafter, referred to as document 1). However, the CCFL includes a disadvantage in color reproduction range. Therefore, a backlight which employs a LED as the light source is used increasingly in recent years.

When a LED is applied to a light source for a medium-sized or a large-sized display apparatus, a large number of LEDs are needed in order to generate required brightness Furthermore, in order to generate a white light, a plurality of LEDs including a LED emitting a red light, a LED emitting a green light, and a LED emitting a blue light have to be used.

If LEDs emitting red, green and blue lights are employed as the light source for the backlight, the red, green and blue lights have to be homogeneously mixed. Moreover, the mixed lights have to be emitted toward a display face as an even light. Therefore, the backlight requires a second light guide plate for mixing lights having three colors in addition to a first light guide plate for illuminating the mixed lights. An example of the liquid crystal display apparatus which uses the above mentioned LEDs as the light source is disclosed in Japan patent application publication number 2004-199967 (hereinafter, referred to as document 2). FIG. 42 is a cross sectional view showing a configuration of the liquid crystal display apparatus.

As shown in FIG. 42, the liquid crystal display apparatus includes a liquid crystal display panel 39 and a light source apparatus which illuminates the liquid crystal display panel 39. The light source apparatus mainly includes a LED 31 as a light source, a first light guide plate 37 and a second light guide plate 33. One end face of the second light guide plate 33 receives a light emitted from the LED 31. Then, the second light guide plate 33 mixes the received light therein and emits the mixed light, that is, a white light from other end face. Afterward, the first light guide plate 37 receives the light emitted from the second light guide plate 33 and emits the light from a whole main surface thereof. The light emitted from the first light guide plate 37 illuminates the liquid crystal display panel 39. The LED 31 and a first reflector 32 are mounted near an incident face of the second light guide plate 33. The LED 31 includes a LED emitting a red (R) light, a LED emitting a green (G) light and a LED emitting a blue (B) light.

The first reflector 32 reflects the light emitted from the LED 31 to guide the light to the second light guide plate 33. A second reflector 34 is mounted on a side of an emission face of the second light guide plate 33. The second reflector 34 reflects the light to an incident face of the first light guide plate 37. The second reflector 34 encircles the emission face of the second light guide plate 33 and a side face of the first light guide plate 37. In order to reflect the light efficiently, the first reflector 32 and the second reflector 34 include a mirror face on each of inside surfaces. The liquid crystal display panel 39 is mounted on a side of the display face of the first light guide plate 37. An optical sheet 38 is arranged between the first light guide plate 37 and the liquid crystal display panel 39. The optical sheet 38 includes a diffusion sheet, a protection sheet and a prism sheet. The optical sheet 38 diffuses or concentrates an incident light which is emitted from the first light guide plate 37 and inputted to the optical sheet 38. Afterward, the optical sheet 38 emits the light toward the liquid crystal display panel 39.

A reflection sheet 36 is arranged on a side of a rear side (a side away from the liquid crystal display panel 39) of the first light guide plate 37. The reflection sheet 36 reflects a light emitted from a bottom face of the first light guide plate 37 and emits again the reflected light to the first light guide plate 37. That is, the reflection sheet 36 is used in order to improve use efficiency of the light in the first light guide plate 37.

Next, light propagation in the liquid crystal display apparatus will be described with reference to FIG. 42. Lights emitted by the LED 31 is directly inputted to the incident face of the second light guide plate 33 or is inputted to the incident face thereof by reflection by the first reflector 32. The lights inputted to the incident face of the second light guide plate 33 is mixed while propagating in the second light guide plate 33. The lights are fully mixed and become a white light. The white light is emitted from the emission face of the second light guide plate 33 and inputted to the second reflector 34. The second reflector 34 reflects the light emitted from the second light guide plate 33 toward the first light guide plate 37. The light inputted into the first light guide plate 37 diffuses in whole of the first light guide plate 37 homogeneously. After that, the diffused light is emitted from the emission face (illumination face) which faces the optical sheet 38 and the liquid crystal display panel 39. The Light emitted from a rear face of the first light guide plate 37 is reflected by the reflection sheet 36. The reflected light is inputted into the first light guide plate 37 again.

SUMMARY

An exemplary object of the present invention is to provide a backlight and a liquid crystal display apparatus, which can reduce unevenness in brightness and color of an illumination face per each product, and the unevenness in brightness and color per the illumination face of the product, and consequently, can improve display quality.

A backlight according to an exemplary aspect of the invention, includes a first light guide plate which emits a light inputted from an end face thereof from a main surface thereof, a second light guide plate which includes an end face for an incoming light and an end face for an emitting light, and which is arranged behind the first light guide plate, a light source which is arranged near the end face for an incoming light of the second light guide plate, a reflection sheet which is arranged between the first light guide plate and the second light guide plate, a chassis which houses the first light guide plate, the second light guide plate and the reflection sheet, and a rear cover which fixes the first light guide plate, the second light guide plate and the reflection sheet with the chassis.

The first light guide plate and the second light guide plate are positioned in a thickness direction thereof.

BRIEF DESCRIPTION OF THE DRAWINGS

Exemplary features and advantages of the present invention will become apparent from the following detailed description when taken with the accompanying drawings in which.

EXEMPLARY EMBODIMENT

According to a preferred exemplary embodiment of the present invention, a backlight and a liquid crystal display apparatus include a configuration in which two kinds of light guide plates are fixed separately and a gap between the two kinds of the light guide plates is kept constant. Hereinafter, the exemplary embodiment on the backlight and the liquid crystal display apparatus will be described in detail with reference to drawings.

First Exemplary Embodiment

First, a backlight and a liquid crystal display apparatus including the backlight will be described with reference to FIG. 1 according to a first exemplary embodiment.

Figure 1:
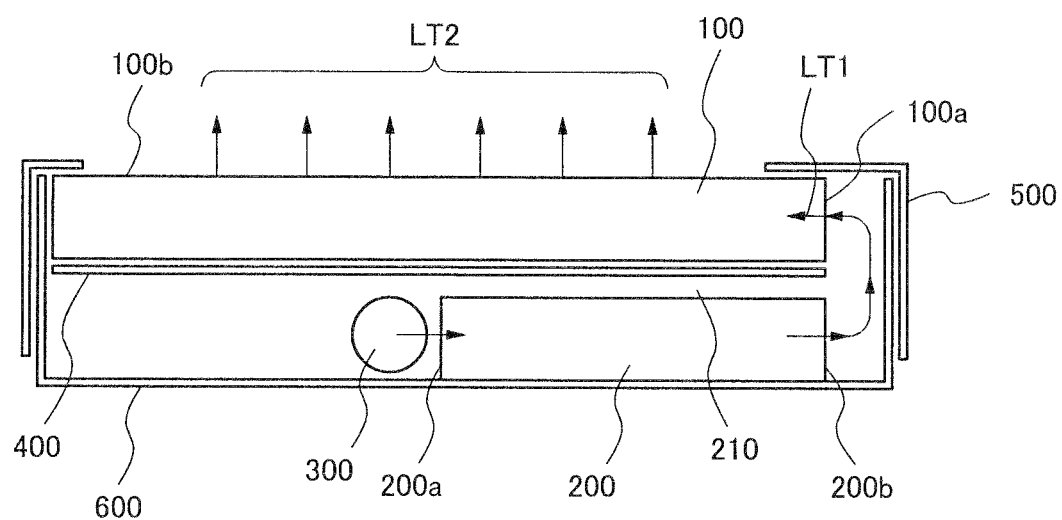
FIG. 1 is a schematic cross sectional view showing a backlight according to a first exemplary embodiment.

FIG. 1 is a schematic cross sectional view showing a backlight according to a first exemplary embodiment.

As shown in FIG. 1, the backlight according to the exemplary embodiment includes a first light guide plate 100, a second light guide plate 200, a light source 300, a reflection sheet 400, a chassis 500 and a rear cover 600. Here, the first light guide plate 100 emits light LT1, which is inputted from one surface 100a corresponding to a right side surface of the first light guide plate 100 in FIG. 1, from one main surface 100b corresponding to an upper side surface of the first light guide plate 100 in FIG. 1 as illumination light LT2. The second light guide plate 200 includes a light inputting surface 200a, which is corresponding to a left side surface of the second light guide plate 200 in FIG. 1, and a light emitting surface 200b which is a right side surface of the second light guide plate 200 in FIG. 1. The second light guide plates 200 is mounted oppositely to the main surface 100b of the first light guide plate 100, that is, mounted on rear side of the first light guide plate 100, as shown in lower side of FIG. 1. The light source 300 is mounted near the light inputting surface 200a of the second light guide plate 200. The reflection sheet 400 is laid between the first light guide plate 100 and the second light guide plate 200. In particular, the reflection sheet 400 is laid so that a layer 210 of air may exist between the reflection sheet 400 and the second light guide plate 200. The chassis 500 stores the first light guide plate 100, the second light guide plate 200 and the reflection sheet 400 inside. In particular, the chassis 500 stores the first light guide plate 100, the second light guide plate 200 and the reflection sheet 400 in a state that the first light guide plate 100, the reflection sheet 400 and the second light guide plate 200 are mounted in sequence as mentioned above. The rear cover 600 interposes the first light guide plate 100, the second light guide plate 200 and the reflection sheet 400 with the chassis 500.

Moreover, with regard to the backlight according to the exemplary embodiment, at least, the first light guide plate 100 and the second light guide plate 200 are fixed at predetermined interval in thickness direction separately and held to the fixed positions respectively by the chassis 500 and the rear cover 600.

Therefore, with regard to the backlight according to the exemplary embodiment, the above mentioned configuration can improve accuracy in positioning the light source 300, the first light guide plate 100, the second light guide plate 200 and the reflection sheet 400. Accordingly, the backlight and the liquid crystal display apparatus equipped with the backlight according to the exemplary embodiment can reduce unevenness of brightness and color of the illumination surface per each product and unevenness of brightness and color per the illumination surface. As a result, the exemplary embodiment has an effect to improve quality of display.

Further, each constituent of the exemplary embodiment shown in FIG. 1 corresponds to each of following constituent according to an embodiment described hereinafter. That is, the first light guide plate 100 corresponds to a first light guide plate 7. The second light guide plate 200 corresponds to a second light guide plate 5. The layer 210 of air corresponds to an layer 13 of air. The light source 300 corresponds to a light source 3. The reflection sheet 400 corresponds to a reflection sheet 8. The chassis 500 corresponds to a chassis 10. The rear cover 600 corresponds to a rear cover 2.

Second Exemplary Embodiment

Next, a backlight and a liquid crystal display apparatus will be described with reference to FIG. 2 to FIG. 9 according to a second exemplary embodiment.

Figure 2:
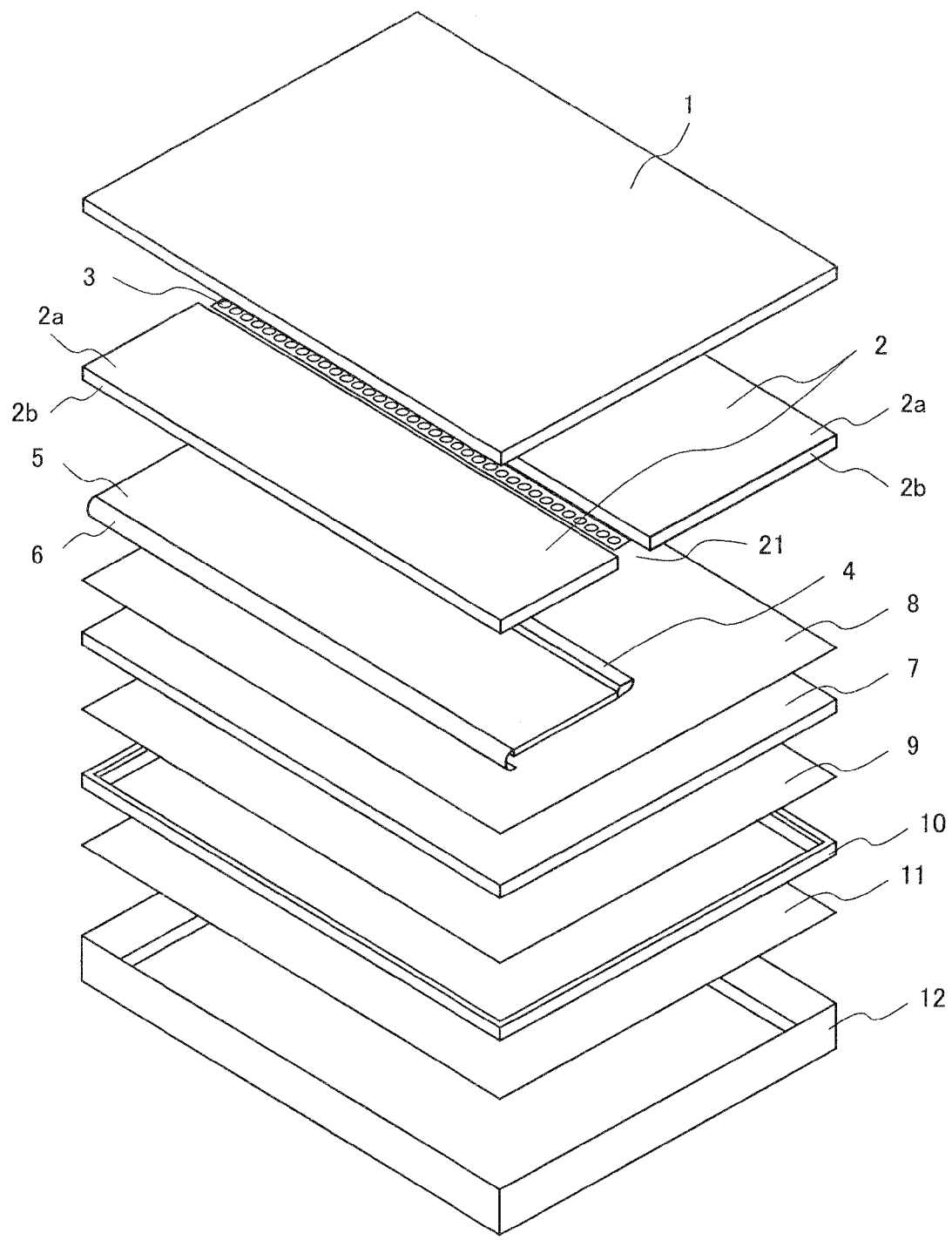
FIG. 2 is an exploded perspective view showing a liquid crystal display apparatus according to a second exemplary embodiment.
Figure 3:
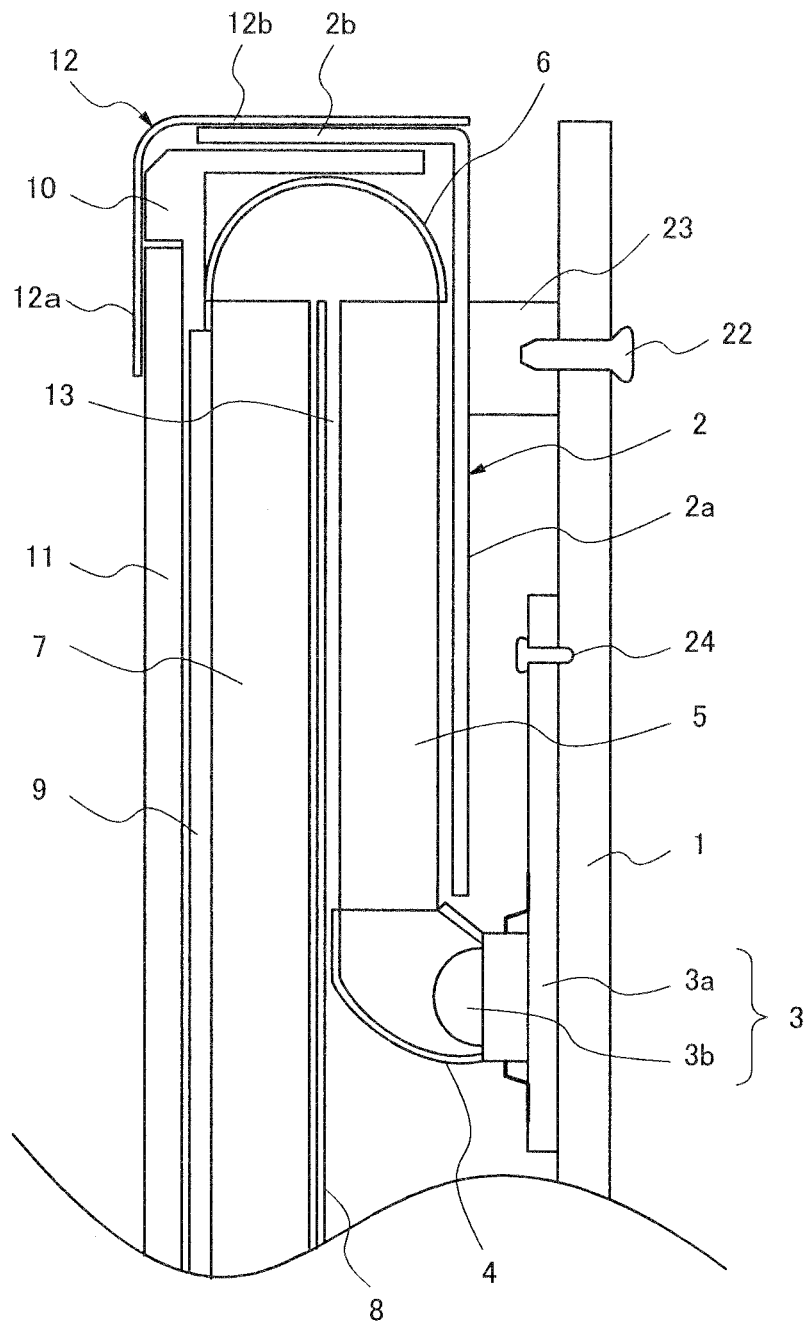
FIG. 3 is a fragmentary cross sectional view showing a cross section which is vertical to an arrangement direction of light emitting diodes mounted on the liquid crystal display apparatus according to the second exemplary embodiment.
Figure 4A:
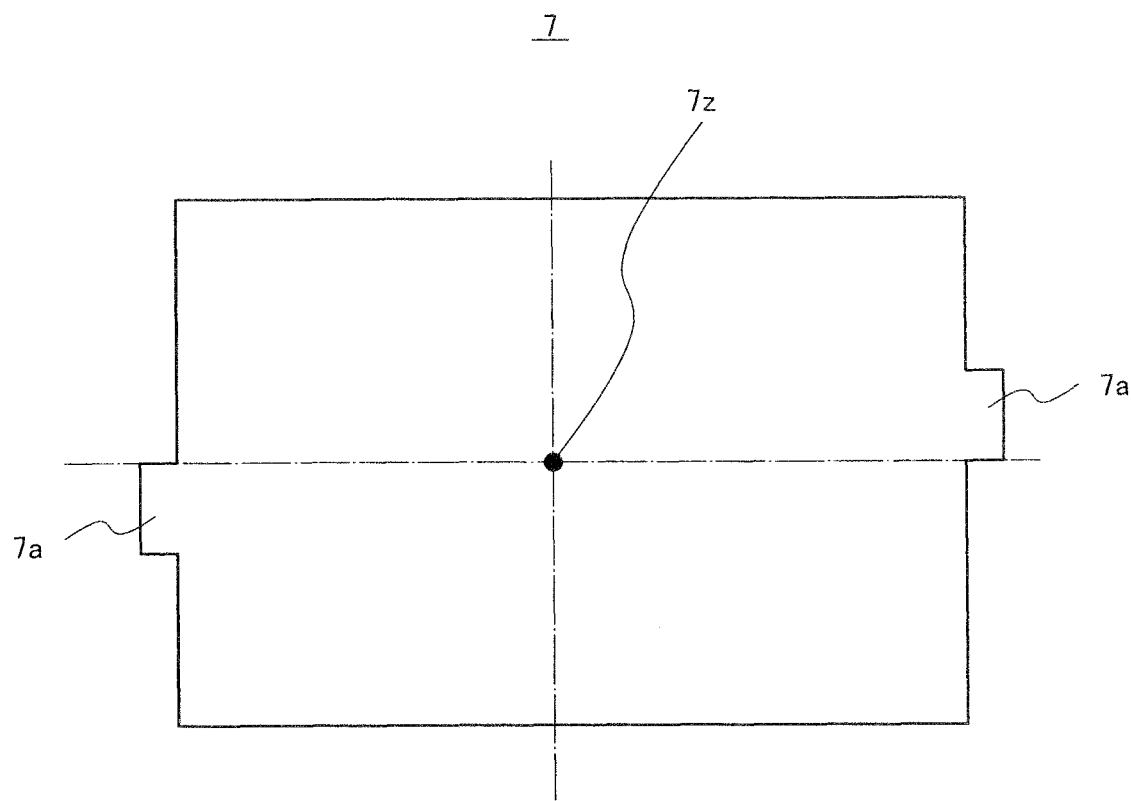
FIG. 4A is a plan view showing a projection part of a first light guide plate applied to the second exemplary embodiment.
Figure 4B:
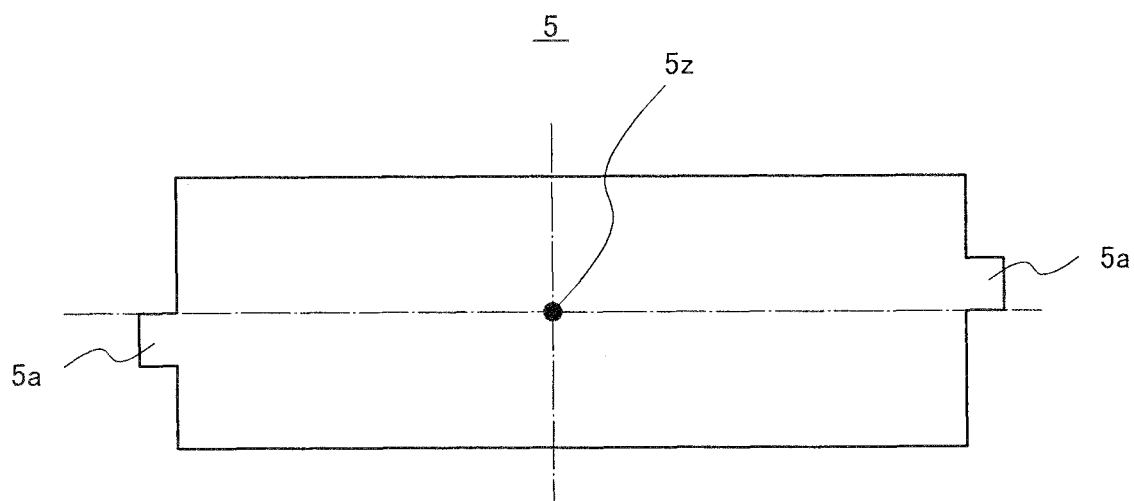
FIG. 4B is a plan view showing a projection part of a second light guide plate applied to the second exemplary embodiment.
Figure 5A:
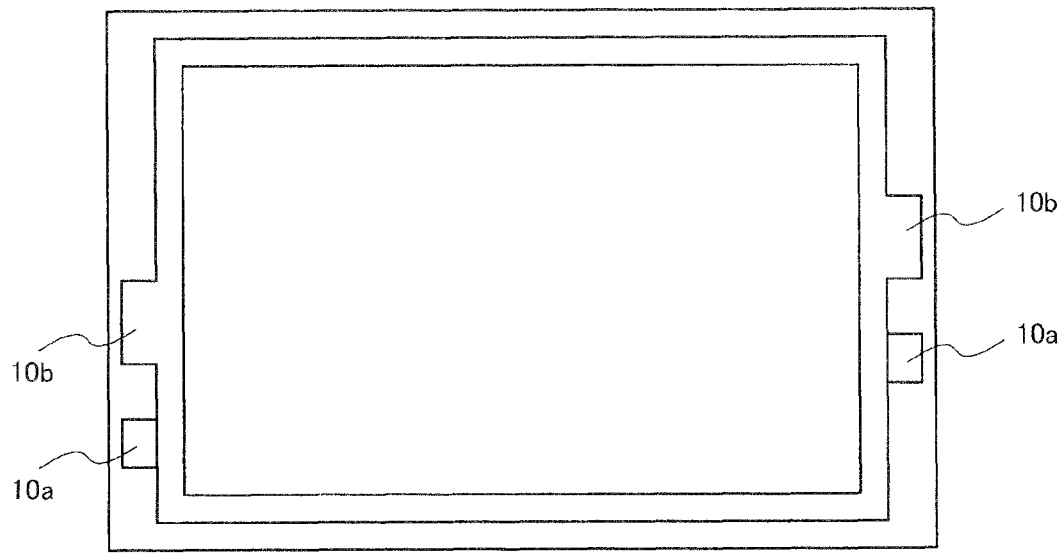
FIG. 5A is a plan view showing a concave part of a chassis applied to the second exemplary embodiment.
Figure 5B:
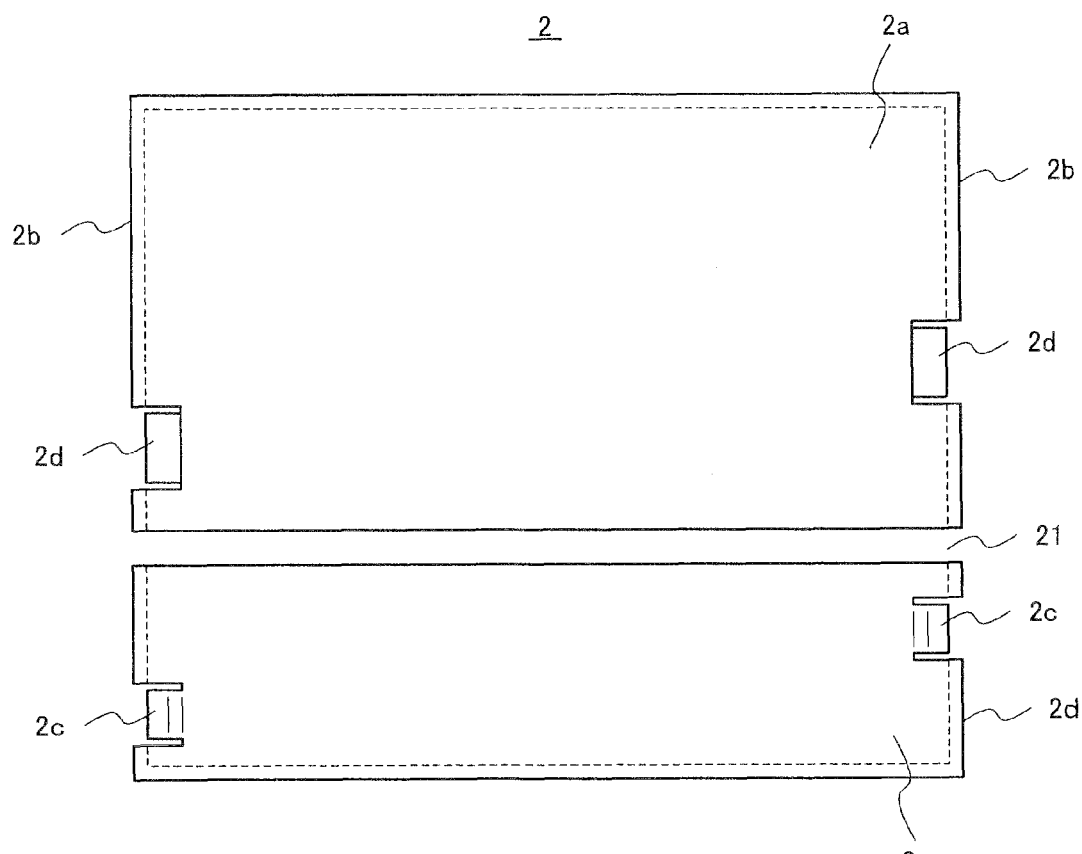
FIG. 5B is a plan view showing a nail part of a rear cover applied to the second exemplary embodiment.
Figure 6A:
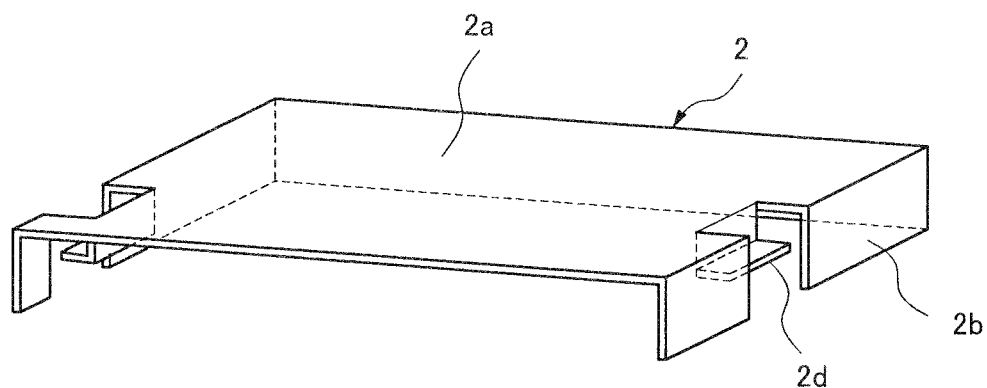
FIG. 6A is a perspective view showing a nail part of a rear cover shown upside in FIG. 5B.
Figure 6B:
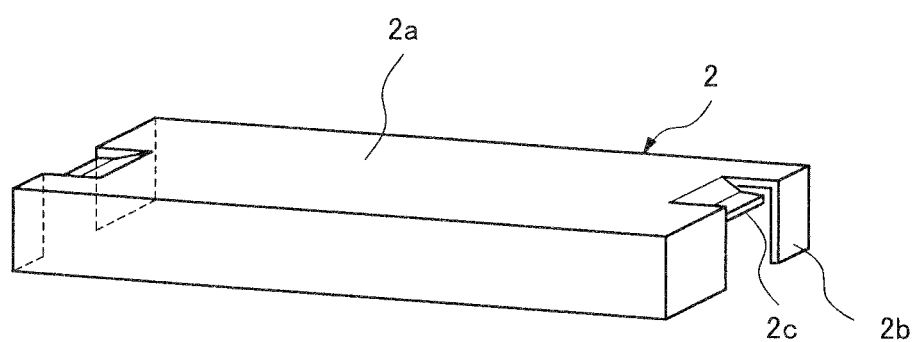
FIG. 6B is a perspective view showing a nail part of a rear cover shown downside in FIG. 5B.
Figure 7A:
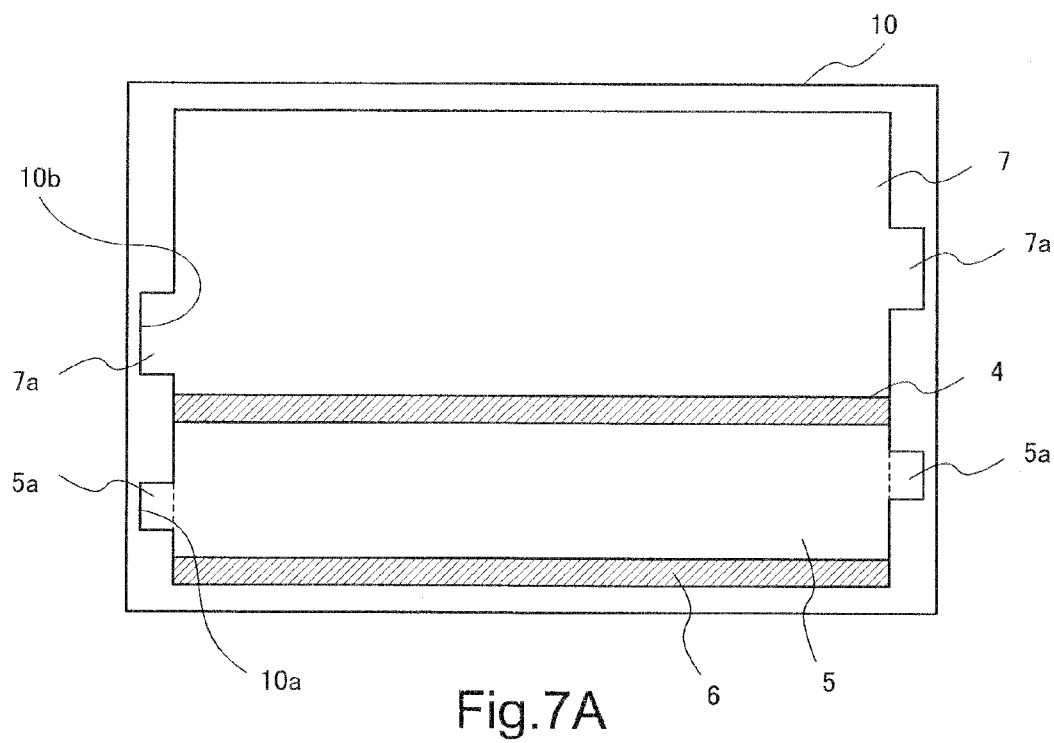
FIG. 7A is a plan view, which is seen from the back side of the liquid crystal display apparatus, showing a state assembled a first light guide plate and a second light guide plate into a chassis applied to the second exemplary embodiment.
Figure 7B:
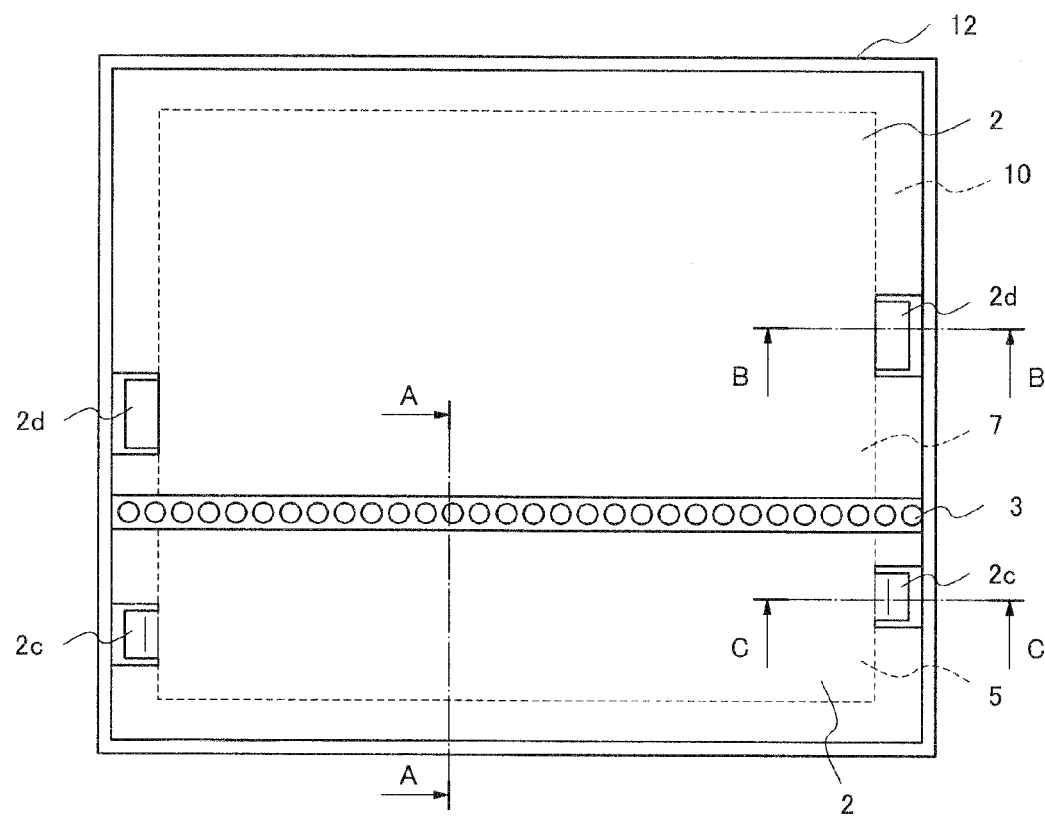
FIG. 7B is a plan view, which is seen from the back side of the liquid crystal display apparatus, showing a state assembled a rear cover, a light source, a liquid crystal display panel and a front cover as well as the state shown in FIG. 7A.
Figure 8:
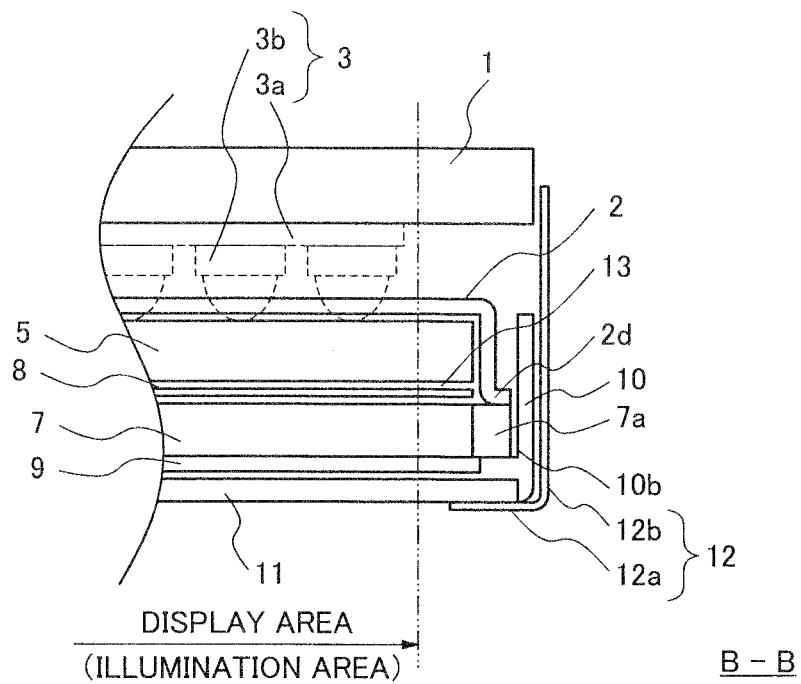
FIG. 8 is a fragmentary cross sectional view showing a cross section, which is parallel to an arrangement direction of the light emitting diodes mounted on the liquid crystal display apparatus, including a projection part of a first light guide plate applied to the second exemplary embodiment.
Figure 9:
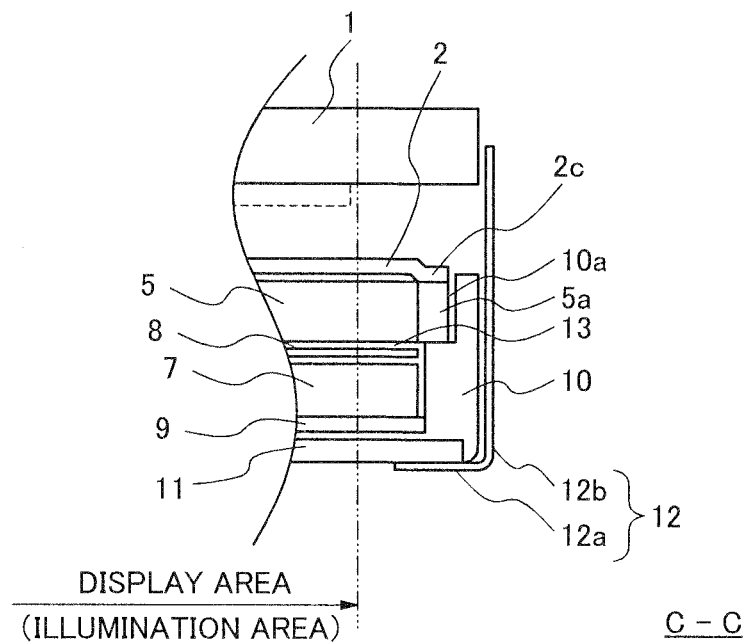
FIG. 9 is a fragmentary cross sectional view showing a cross section, which is parallel to the arrangement direction of the light emitting diodes mounted on the liquid crystal display apparatus, including a projection part of a second light guide plate applied to the second exemplary embodiment.

FIG. 2 is an exploded perspective view showing the liquid crystal display apparatus according to the second exemplary embodiment. FIG. 3 is a fragmentary cross sectional view showing a cross section which is vertical to an arrangement direction of light emitting diodes mounted on the liquid crystal display apparatus. Here, FIG. 3 is a cross sectional view which is taken along A-A line in the plan view of the liquid crystal display apparatus as shown in FIG. 7B mentioned below. FIG. 4A is a plan view showing a projection part of a first light guide plate. FIG. 4B is a plan view showing a projection part of a second light guide plate. FIG. 5A is a plan view showing a concave part of a chassis. FIG. 5B is a plan view showing a nail part of a rear cover. FIG. 6A is a perspective view showing a nail part of a rear cover shown upside in FIG. 5B. FIG. 6B is a perspective view showing a nail part of a rear cover shown downside in FIG. 5B. FIG. 7A is a plan view, which is seen from the back side of the liquid crystal display apparatus (that is, right side direction in FIG. 3), showing a state assembled a first light guide plate and a second light guide plate into a chassis for the sake of convenience. FIG. 7B is a plan view, which is seen from the back side of the liquid crystal display apparatus (that is, right side direction in FIG. 3), showing a state assembled a rear cover, a light source, a liquid crystal display panel and a front cover as well as the state shown in FIG. 7A for the sake of convenience. FIG. 8 is a fragmentary cross sectional view showing a cross section, which is parallel to an arrangement direction of the light emitting diodes mounted on the liquid crystal display apparatus, including a projection part of a first light guide plate applied to the exemplary embodiment. Here, FIG. 8 is a cross sectional view which is taken along B-B line in the plan view of the liquid crystal display apparatus as shown in FIG. 7B mentioned below. FIG. 9 is a fragmentary cross sectional view showing a cross section, which is parallel to an arrangement direction of the light emitting diodes mounted on the liquid crystal display apparatus, including a projection part of a second light guide plate applied to the exemplary embodiment. Here, FIG. 9 is a cross sectional view which is taken along C-C line in the plan view of the liquid crystal display apparatus as shown in FIG. 7B mentioned below.

As shown in FIG. 2 and FIG. 3, the liquid crystal display apparatus includes a heat sink 1, a rear cover 2, a light source 3, reflectors 4 and 6, a second light guide plate 5, a first light guide plate 7, a reflection sheet 8, an optical sheet 9, a chassis 10, a liquid crystal display panel 11 and a front cover 12 according to the exemplary embodiment. Here, the backlight applied to the liquid crystal display apparatus includes the heat sink 1, the rear cover 2, the light source 3, the reflectors 4 and 6, the second light guide plate 5, the first light guide plate 7, the reflection sheet 8, the optical sheet 9 and the chassis 10 according to the exemplary embodiment.

Hereinafter, a configuration of the backlight and the liquid crystal display apparatus will be described specifically according to the exemplary embodiment.

As shown in FIG. 2 and FIG. 3, the backlight which is applied to the liquid crystal display apparatus includes the heat sink 1 according to the exemplary embodiment. The heat sink 1 is made of aluminum, for example, and is formed with a cutout method.

As shown in FIG. 2 and FIG. 3, the backlight includes the rear cover 2 in front of the heat sink 1 (that is, a left side direction in FIG. 3). The rear cover 2 is made of aluminum, for example, and is formed with pressing a board member. As shown in FIG. 2 and FIG. 5B, the rear cover 2 is divided into two parts. A gap 21 is formed between two parts of the divided rear cover 2. Moreover, as shown in FIGS. 2, 3, 6A and 6B, each of two parts of the rear cover 2 includes a bottom plate 2a and a side plate 2b which is extended toward a front part of the liquid crystal display apparatus (that is, left direction in FIG. 3) from three sides of the bottom plate 2a other than a side facing the gap 21. As shown in FIGS. 5B, 6A, 6B, 8 and 9, each of the two parts of the rear cover 2 include respectively nail parts 2c and 2d which are located on two sides that are vertical to an arrangement direction (that is, right and left direction in FIG. 5B) of the light source 3, inside the side plate 2b and outside an illumination area of the backlight (further, the nail parts 2c and 2d are not shown in FIG. 2). Here, a height of the nail part 2d is different from that of the nail part 2c in a thickness direction (that is, right and left direction in FIG. 3) of the liquid crystal display apparatus. As shown in FIG. 8 and FIG. 9, the above-mentioned nail part 2d extends from the bottom plate 2a toward the liquid crystal display panel 11. A length of the nail part 2d is longer than a thickness of the second light guide plate 5. As shown in FIG. 3, a nut 23 is fixed on a position of a rear face of the bottom plate 2a which corresponds to a position of a bolt 22. The nut 23 is fitted with the screw of the bolt 22. The bolt 22 is fitted with the nut 23 through penetrating a hole formed in the heat sink 1. As a result, the rear cover 2 is connected to the heat sink 1 keeping a predetermined distance corresponding to a height of the nut 23.

Further, in the embodiment, the illumination area of the backlight means an area corresponding to a display area of the liquid crystal display panel 11.

As shown in FIG. 2 and FIG. 7B, the backlight includes the light source 3 arranged in the gap 21 between two parts of the rear cover 2. As shown in FIG. 3, the light source 3 includes a base material 3a and a plurality of light emitting diodes 3b mounted on the front face (that is, the face of the left side in FIG. 3) of the base material 3a. The base material 3a is a tabular member which extends in the arrangement direction of the light emitting diode 3b. All of light emitting diodes 3b are mounted on the base material 3a. Moreover, as shown in FIG. 3, the base material 3a is connected to the heat sink 1 by the screw 24. As a result, the base material 3a is fixed on the heat sink 1. Some of the light emitting diodes 3b are red diodes emitting a red light. Other some thereof are green diodes emitting a green light. The rest of the light emitting diodes 3b are blue diodes emitting a blue light.

Moreover, as shown in FIG. 3, the backlight includes the reflector 4 which changes a direction of a light which the light source 3 emits forward (that is, left side of FIG. 3) at an angle of 90 degrees and outputs the light. The reflector 4 includes an outer shape formed by dividing a cylinder into quarters. Moreover, as shown in FIG. 2 and FIG. 7A, the reflector 4 extends in the arrangement direction of the light emitting diodes 3b. A curved surface inside the reflector 4 includes a mirror face. Then, as shown in FIG. 3, the light which the light emitting diodes 3b emits forward (that is, in a left direction in FIG. 3) is inputted to the reflector 4. The reflector 4 is arranged in the gap 21 so that the light is emitted toward a side face of the backlight. Further, as shown in FIG. 3, the reflector 4 is arranged in front of the bottom plate 2a of the rear cover 2 (that is, a left side direction of FIG. 3) and arranged at a position corresponding to the side plate 2b thereof.

Moreover, as shown in FIG. 3, the backlight includes the second light guide plate 5 located at a position to which the light emitted from the reflector 4 is inputted. The second light guide plate 5 is formed of a transparent tabular member. The second light guide plate 5 is arranged in parallel to the bottom plate 2a inside one part of the rear cover 2. The second light guide plate 5 optically combines with the reflector 4. The light reflected by the reflector 4 passes through the second light guide plate 5 toward the side face of the backlight, in the meantime, a red, a green and a blue lights included in the reflected light are mixed. As shown in FIG. 4B, two sides of the second light guide plate 5 which are orthogonal to the arrangement direction of the light emitting diodes 3b includes a pair of projection parts 5a. Positions of the pair of projection parts 5a corresponds to positions of the nail parts 2c in the rear cover 2 (further, the projection parts 5a are not illustrated in FIG. 2).

Further, specifically, as shown in FIG. 4B, the above-mentioned pair of projection parts 5a is located on two sides opposed to each other in the second light guide plates 5 respectively. The pair of projection parts 5a is located at positions which are symmetric about a point with respect to a rotation central axis 5z which is vertical to a plane (paper plane on which FIG. 4B is described) of the second light guide plate 5.

Moreover, as shown in FIG. 3, the backlight includes the reflector 6 which is arranged on a side of the second light guide plate 5 which is an opposite side of the reflector 4. The reflector 6 changes a direction of the incident light at an angle of 180 degrees, and outputs the light changed the direction. The reflector 6 includes an outer shape formed by halving a cylinder lengthwise. As shown in FIG. 2 and FIG. 7A, the reflector 6 extends in the arrangement direction of the light emitting diodes 3b. A curved surface inside the reflector 6 includes a mirror face. As shown in FIG. 3, the reflector 6 is arranged within one part of the rear cover 2. The reflector 6 combines with the second light guide plate 5 optically. As a result, the reflector 6 reflects an incident light which the second light guide plate 5 emits toward a side of the backlight, and emits the light toward an opposed side thereof.

Moreover, as shown in FIG. 3, the backlight includes the first light guide plate 7 in front of the second light guide plate 5 (that is, a left side direction in FIG. 3). The first light guide plate 7 is arranged so as to be parallel to the second light guide plate 5. The first light guide plate 7 is formed of a transparent tabular member. Moreover, one end face of the first light guide plate 7 combines with the reflector 6 optically. As a result, the light reflected by the reflector 6 is inputted into one end face of the first light guide plate 7. A plurality of dots (not illustrated in figure) are formed on a rear face of the first light guide plate 7. As a result, the first light guide plate 7 homogeneously emits the light reflected by the reflector 6 toward a front (that is, left direction in FIG. 3) of the liquid crystal display apparatus. As shown in FIG. 4A, two sides of the first light guide plate 7 which are orthogonal to the arrangement direction of the light emitting diodes 3b includes a pair of projection parts 7a. Positions of the pair of projection parts 7a corresponds to positions of the nail parts 2*d* in the rear cover 2 (further, the projection parts 7*a* are not illustrated in FIG. 2).

Further, specifically, as shown in FIG. 4A, the above-mentioned pair of projection parts 7*a* is located on two sides opposed to each other in the first light guide plate 7 respectively. The pair of projection parts 7*a* is located at position which are symmetric about a point with respect to a rotation central axis 7*z* which is vertical to a plane (paper plane on which FIG. 4A is described) of the second light guide plate 7.

Moreover, as shown in FIG. 2 and FIG. 3, the backlight includes the reflection sheet 8 arranged between the second light guide plate 5 and the first light guide plate 7 in order to prevent light leak which is generated between both the light guide plates.

Moreover, as shown in FIG. 2 and FIG. 3, the backlight includes the optical sheet 9 arranged in front of the first light guide plate 7 (that is, left side direction in FIG. 3). While the optical sheet 9 is illustrated as one sheet in FIGS. 2, 3, 8 and 9 for the sake of convenience, the optical sheet 9 actually includes laminated three thin sheets. That is, the optical sheet 9 includes a diffusion sheet, a light concentration sheet and a light polarization sheet which are arranged in such order from the first light guide plate 7. The diffusion sheet is a transparent sheet stuck with a plurality of beads. As a result, the diffusion sheet diffuses an incident light.

Generally, in the optical seat applied to the liquid crystal display apparatus, if the diffusion sheet is not employed, a dot pattern of the first light guide plate 7 appears in an image. The light concentration sheet is a transparent sheet whose surface includes a prism-like unevenness. As a result, the light concentration sheet concentrates a light diffused by the diffusion sheet in front of the liquid crystal display apparatus (that is, left direction in FIG. 3). Moreover, a polarized light which can pass through a polarizer arranged on the liquid crystal display panel 11 mentioned below can pass through the light polarization sheet. On the other hand, the polarized light which cannot pass through the polarizer is reflected backward by the light polarization sheet. Further, it may be preferable that the optical sheet includes suitable combination of sheets on the basis of required brightness. Therefore, it is not necessary that the optical sheet has to include three sheets.

As shown in FIG. 2 and FIG. 3, the backlight includes the frame-shaped chassis 10 in front of the optical sheet 9 (that is, left side direction in FIG. 3). As shown in FIGS. 3, 8 and 9, the chassis 10 fixes the second light guide plate 5, the reflector 6, the reflection sheet 8, the first light guide plate 7 and the optical sheet 9 mentioned above.

As shown in FIG. 5A, two sides of the chassis 10 which are orthogonal to the arrangement direction of the light emitting diodes 3*b* includes a pair of the concave parts 10*a*. Positions of the pair of the concave parts 10*a* corresponds to positions of the projection parts 5*a* of the second light guide plate 5 in FIG. 4B. As shown in FIG. 5A, two sides of the chassis 10 which are orthogonal to the arrangement direction of the light emitting diodes 3*b* includes a pair of the concave parts 10*b*. Positions of the pair of the concave parts 10*b* corresponds to positions of the projection parts 7*a* of the second light guide plate 7 in FIG. 4A. Further, the concave part 10*a* and the concave part 10*b* are not illustrated in FIG. 2. As shown in FIG. 7A and FIG. 8, the above-mentioned concave part 10*b* can make the first light guide plate 7 dropped (fall down) and can come into contact with the projection part 7*a* of the first light guide plate 7. As shown in FIG. 7A and FIG. 9, the above-mentioned concave part 10*a* can make the second light guide plate 5 dropped (fall down) and can come into contact with the projection part 5*a* of the first light guide plate 5 while the second light guide plate 5 does not come into contact with the first light guide plate 7. As a result, as shown in FIGS. 3, 8 and 9, a layer 13 of air is formed between the first light guide plate 7 and the second light guide plate 5, strictly between the reflection sheet 8 and the second light guide plate 5. Since the reflection sheet 8 is not pressed against the first light guide plate 7 even if the second light guide plate 5 is caused to be got warped, the reflection sheet 8 and the first light guide plate 7 becomes stably fixed. As shown in FIG. 3 and FIG. 7B, the chassis 10 is arranged inside the rear cover 2. As shown in FIGS. 3, 8 and 9, the second light guide plate 5, the reflection sheet 8, the first light guide plate 7 and the optical sheet 9 are fixed or sandwiched by the chassis 10 and the rear cover 2.

As shown in FIG. 2 and FIG. 3, the liquid crystal display apparatus according to the exemplary embodiment includes the liquid crystal display panel 11 in front of the optical sheet 9 and the chassis 10 (that is, left side direction in FIG. 3). The liquid crystal display panel 11 is connected to a circuit substrate (not illustrated) which includes wiring lines for inputting electric power and an image signal from an outside apparatus. Further, in the liquid crystal display apparatus, each of the liquid crystal display panel 11, the optical sheet 9, the first light guide plate 7, the reflection sheet 8 and the heat sink 1 includes almost the same outer shape with respect to a direction perpendicular to the liquid crystal display apparatus (that is, left side direction in FIG. 3).

Further, the liquid crystal display panel 11, as shown in FIG. 3, employs a transmission type liquid crystal display panel which transmits a light emitted from one main surface (a face facing the optical sheet 9) of the first light guide plate 7 to toward outside of the panel, that is, toward a viewer located in left side of the liquid crystal display apparatus in FIG. 3.

Further, as shown in FIGS. 2, 3, 8 and 9, the liquid crystal display apparatus includes the front cover 12 in front of the liquid crystal display panel 11 (that is, left side direction in FIG. 3). As shown in FIGS. 3, 8 and 9, the liquid crystal display panel 11 is sandwiched between the front cover 12 and the chassis 10. The front cover 12 includes a frame-shaped front plate 12*a*. As shown in FIGS. 3, 8 and 9, the front plate 12*a* covers an edge area of a front face (that is, a face of the left side direction in FIG. 3) of the liquid crystal display panel 11. Moreover, as shown in FIGS. 3, 8 and 9, the front cover 12 includes four side plates 12*b* which extend backward from edge sides of the front plate 12*a*.

Further, with regard to the backlight and the liquid crystal display apparatus according to the exemplary embodiment, the projection part 7*a* of the first light guide plate 7 corresponds to the first positioning part according to the present invention, and the projection part 5*a* of the second light guide plate 5 corresponds to the second positioning part according to the present invention. The concave part 10*b* of the chassis 10 corresponds to the first engaging part according to the present invention, and the concave part 10*a* of the chassis 10 corresponds to the second engaging part according to the present invention.

In the liquid crystal display apparatus according to the exemplary embodiment, the first light guide plate 7 is positioned and fixed vertically and horizontally and held to the fixed position, since the projection part 7*a* of the first light guide plate 7 is engaged with the concave part 10*b* of the chassis 10. Moreover, the second light guide plate 5 is positioned and fixed vertically and horizontally and held to the fixed position, since the projection part 5*a* of the second light guide plate 5 is engaged with the concave part 10*a* of the chassis 10. When the nail part 2*d* of the rear cover 2 is engaged with the projection part 7*a* of the first light guide plate 7 which is dropped into the concave part 10*b* of the chassis 10, the first light guide plate 7 is positioned and fixed in thickness direction and held to the fixed position in order to interpose therein. When the nail part 2c of the rear cover 2 is engaged with the projection part 5a of the second light guide plate 5 which is dropped into the concave part 10a of the chassis 10, the second light guide plate 5 is positioned and fixed in thickness direction and held to the fixed position in order to interpose therein. Moreover, as shown in FIGS. 3, 8 and 9, when the heat sink 1 to which the base material 3a of the light emitting diodes 3b is fixed is connected to the rear cover 2, positions of the second light guide plate 5 and the first light guide plate 7 in thickness direction on the basis of the position of the light emitting diode 3b are fixed.

That is, as shown in FIG. 7A and FIG. 8, the first light guide plate 7 is positioned and fixed in vertical and horizontal directions, that is, in a surface direction, when the projection part 7a of the first light guide plate 7 is engaged with the concave part 10b of the chassis 10. Here, the vertical direction and the horizontal direction of the first light guide plate 7 means respectively an up-and-down direction and a right and left direction with regard to the first light guide plate 7 in FIG. 4A. As shown in FIG. 7A and FIG. 9, the second light guide plate 5 is positioned and fixed in the vertical and the horizontal directions, that is, in the surface direction, when the projection part 5a of the second light guide plate 5 is engaged with the concave part 10a of the chassis 10. Here, vertical and horizontal directions of the second light guide plate 5 means respectively up-and-down direction and right and left direction with regard to the second light guide plate 5 in FIG. 4B. As shown in FIG. 7B and FIG. 8, when the nail part 2d of the rear cover 2 is engaged with the projection part 7a of the first light guide plate 7 which is dropped into the concave part 10b of the chassis 10, the first light guide plate 7 is interposed. Therefore, the first light guide plate 7 is positioned and fixed in a thickness direction and held to the fixed position. Moreover, as shown in FIG. 7B and FIG. 9, when the nail part 2c of the rear cover 2 is engaged with the projection part 5a of the second light guide plate 5 which is dropped into the concave part 10a of the chassis 10, the second light guide plate 5 is interposed. Therefore, the second light guide plate 5 is positioned and fixed in a thickness direction and held to the fixed position. As a result, the first light guide plate 7 and the second light guide plate 5 are positioned and fixed individually in the surface direction and in the thickness direction and held to the fixed positions respectively.

Further, a fragmentary cross section view of the liquid crystal display apparatus shown in FIG. 8 illustrates configuration in which the second light guide plate 5 is mounted above the first light guide plate 7 in the figure via the layer 13 of air, for the sake of convenience. According to the configuration, position of the first light guide plate 7 in thickness direction in relation to position of the second light guide plate 5 is indicated clearly. However, with regard to the liquid crystal display apparatus according to the exemplary embodiment, the second light guide plate 5 does not exist actually in the cross section view taken along B-B line in the plan view of the liquid crystal display apparatus shown in FIG. 7B. That is, in case that the pick part is mounted on the rear cover 2 described in lower side of FIG. 7B in an attaching state shown in FIG. 7B, the liquid crystal display apparatus has configuration in which the second light guide plate 5 is mounted above the first light guide plate 7, as shown in FIG. 8. Each fragmentary cross section view shown in FIG. 11, FIG. 21, FIG. 26, FIG. 34 and FIG. 40 is interpreted similarly.

Figure 10:
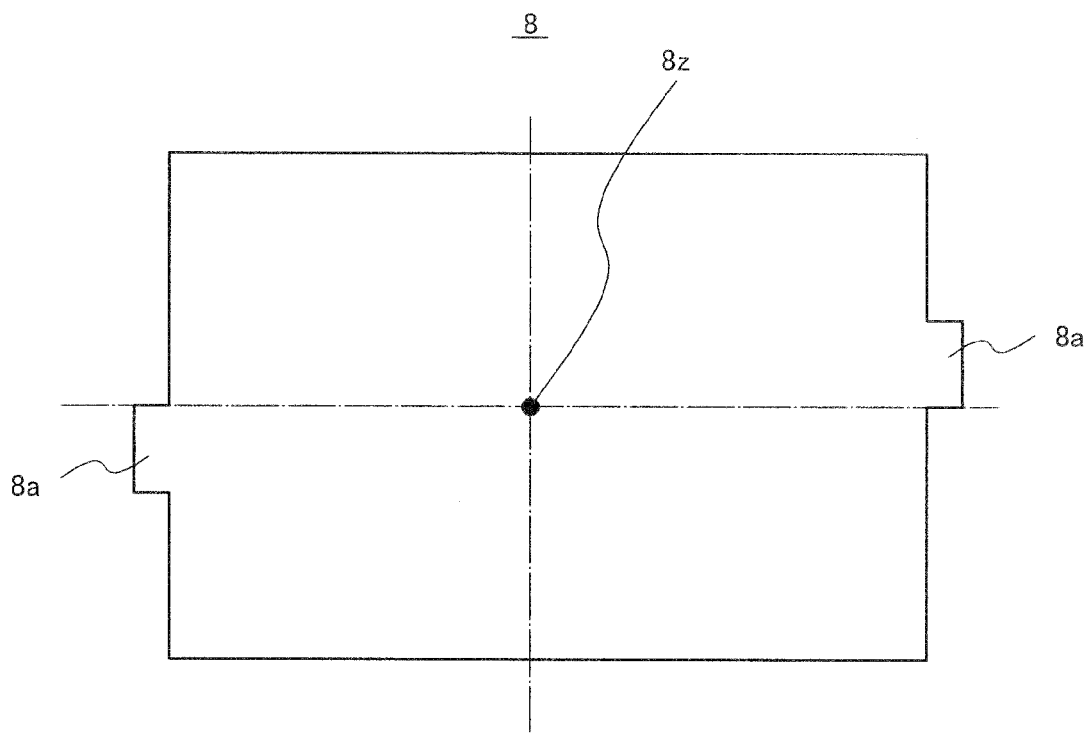
FIG. 10 is a plan view showing a projection part of a reflection sheet applied to other exemplary configuration 1 regarding the backlight and the liquid crystal display apparatus according to the second exemplary embodiment.

Further, as shown in FIG. 8, the projection part 7a of the first light guide plate 7 is positioned and fixed in a thickness direction by the concave part 10b of the chassis 10 and the nail part 2d of the rear cover 2. But the present invention is not limited to the configuration. With respect to the backlight and the liquid crystal display apparatus according to the exemplary embodiment, as shown in FIG. 10 mentioned below, it may be preferable that a projection part of the reflection sheet 8 is mounted at a position which corresponds to a position of the projection part 7a of the first light guide plate 7. As a result, the projection part 7a of the first light guide plate 7 and the projection part of the reflection sheet 8 are positioned and fixed in a thickness direction by the concave part 10b of the chassis 10 and the nail part 2d of the rear cover 2. With respect to the backlight and the liquid crystal display apparatus according to the exemplary embodiment, as shown in FIG. 12 mentioned below, it may be preferable that a projection part of the reflection sheet 8 is mounted at positions which corresponds to neither position of the projection part 7a of the first light guide plate 7 nor the projection part 5a of the second light guide plate 5. In this case, it may be preferable that the concave part of the chassis 10 and the nail part of the rear cover 2 are mounted at position which corresponds to a position of the projection part of the reflection sheet 8. As a result, the first light guide plate 7, the reflection sheet 8 and the second light guide plate 5 are individually positioned and held to the fixed positions.

Each exemplary configuration will be described below with reference to drawings. Here, about composition equivalent to a second embodiment mentioned above, the same numerals are attached and shown in the drawings, and their descriptions are omitted. In the following explanation, drawings shown in a second embodiment mentioned above will be referred to suitably.

Figure 11:
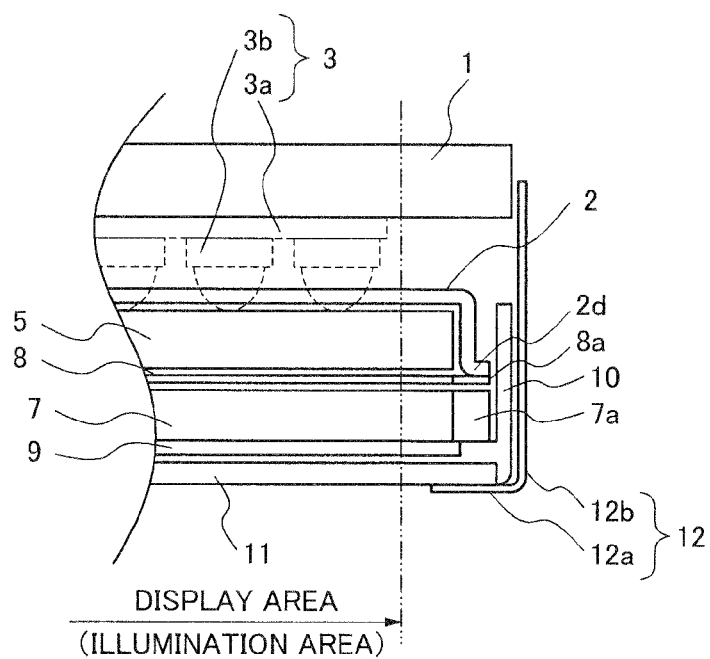
FIG. 11 is a fragmentary cross sectional view showing a cross section, which is parallel to the arrangement direction of the light emitting diodes mounted on the liquid crystal display apparatus, including the projection part of the reflection sheet applied to other exemplary configuration 1 of the second exemplary embodiment.

FIG. 10 is a plan view showing a projection part of a reflection sheet applied to other exemplary configuration 1 regarding the backlight and the liquid crystal display apparatus according to the exemplary embodiment. FIG. 11 is a fragmentary cross sectional view showing a cross section which is parallel to the arrangement direction of the light emitting diodes mounted on the liquid crystal display apparatus, including the projection part of the reflection sheet applied to other exemplary configuration 1 of the first exemplary embodiment.

The first light guide plate 7 and the second light guide plate 5 applied to other exemplary configuration 1 with regard to the backlight and the liquid crystal display apparatus according to the exemplary embodiment are equivalent to the configuration shown in FIG. 4A and FIG. 4B mentioned above. The chassis 10 and the rear cover 2 are equivalent to the configuration shown in FIG. 5A and FIG. 5B mentioned above. Specifically, as shown in FIG. 10 for example, the reflection sheet 8 includes a pair of projection parts 8a at positions which correspond to the position of the projection 7a of the first light guide plate 7 in FIG. 4A. Here, as shown in FIG. 10, the pair of projection parts 8a is arranged on opposed sides of the reflection sheet 8 and is arranged at positions which are symmetric about a point with respect to a rotation central axis 8z which is vertical to a plane (paper plane on which FIG. 10 is described) of the reflection sheet 8.

According to above mentioned configuration, as shown in FIG. 11, the first light guide plate 7 and the reflection sheet 8 are positioned and fixed in vertical and horizontal directions, that is, in a surface direction, the projection part 7a of the first light guide plate 7 and the projection part 8a of the reflection plate 8 are engaged with the concave part 10b of the chassis 10. Moreover, the nail part 2d of the rear cover 2 is engaged with the projection part 7a of the first light guide plate 7 and the projection part 8a of the reflection sheet 8 which are dropped into the concave part 10b of the chassis 10. Therefore, the first light guide plate 7 and the reflection sheet 8 are positioned and fixed in a thickness direction. That is, the first light guide plate 7 and the reflection sheet 8 are positioned and fixed in a surface direction and in a thickness direction concurrently. Moreover, the second light guide plate 5 is positioned and fixed in the surface direction and in the thickness direction individually like the embodiment mentioned above.

Figure 12A:
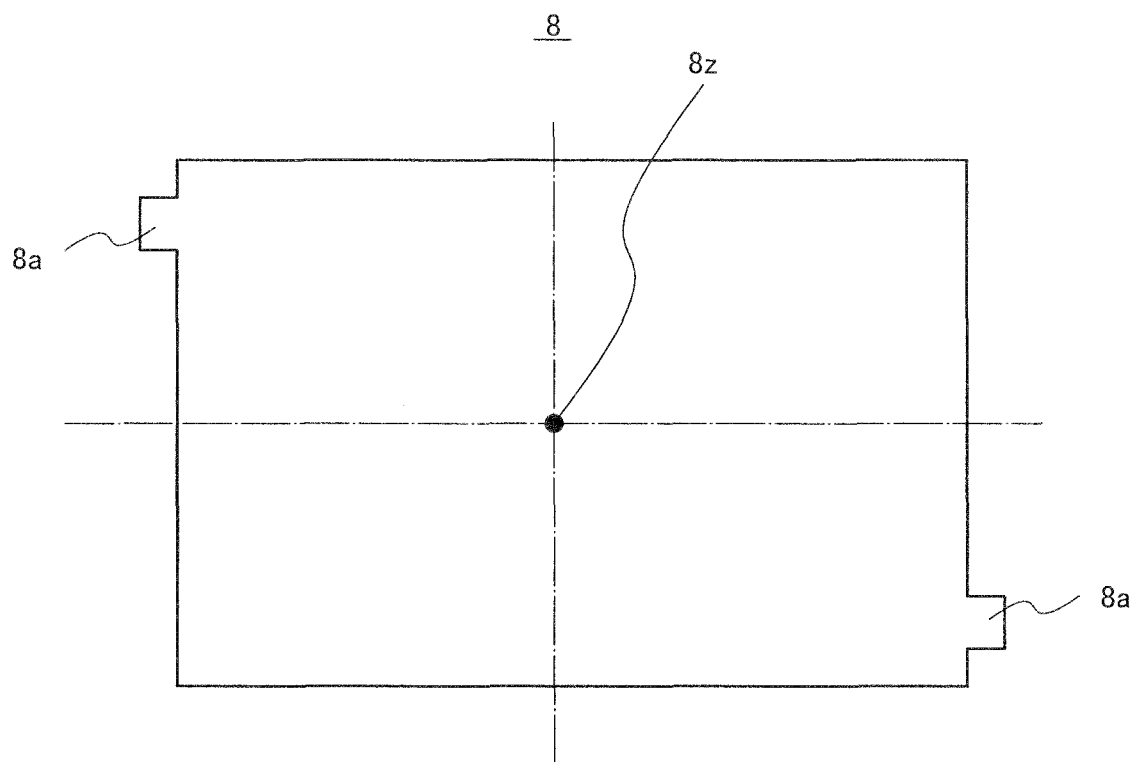
FIG. 12A is a plan view showing a projection part of a reflection sheet applied to other exemplary configuration 2 regarding the backlight and the liquid crystal display apparatus according to the second exemplary embodiment.
Figure 12:
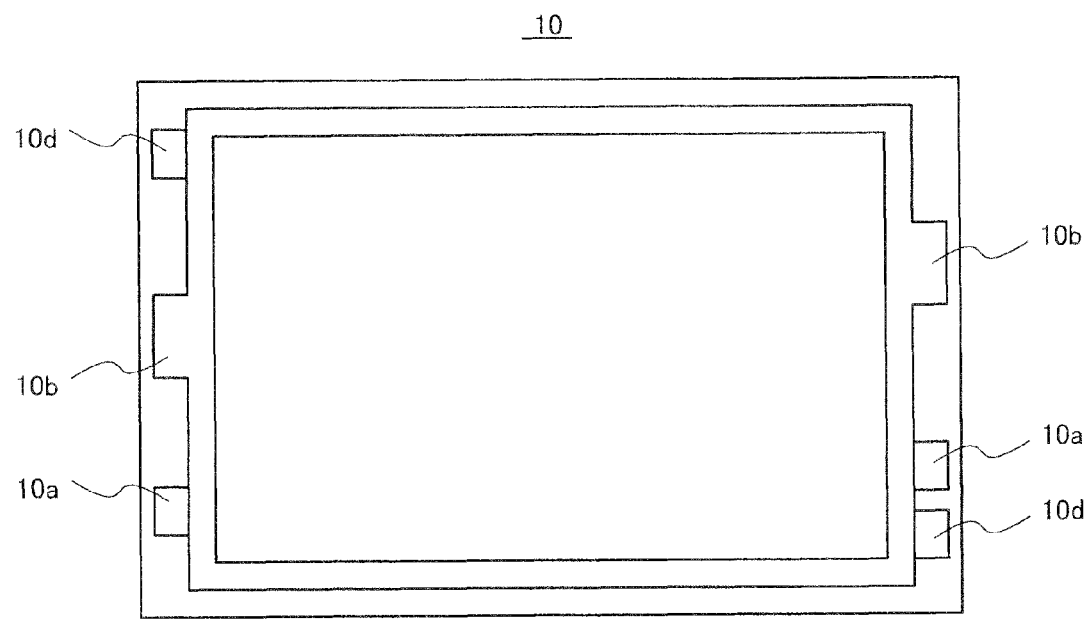
FIG. 12B is a plan view showing a concave part of a chassis applied to other exemplary configuration 2 of the second exemplary embodiment.
FIG. 12C is a plan view showing a nail part of a rear cover applied to other exemplary configuration 2 of the second exemplary embodiment.
Figure 12:
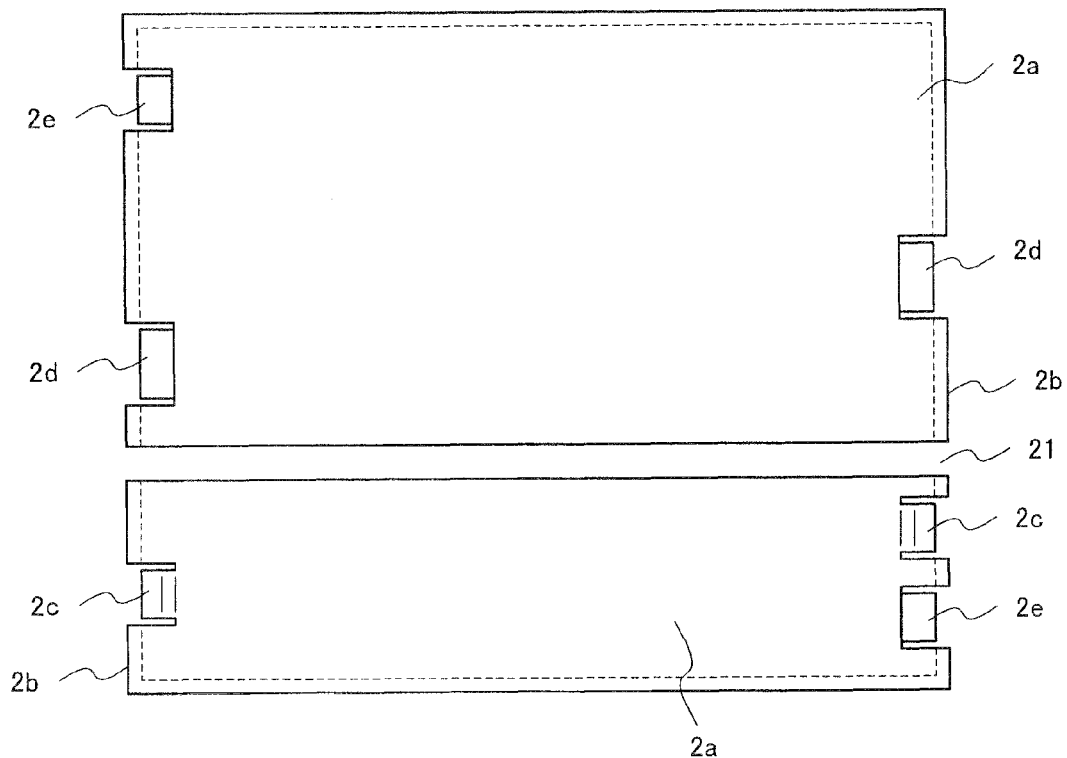
Figure 13A:
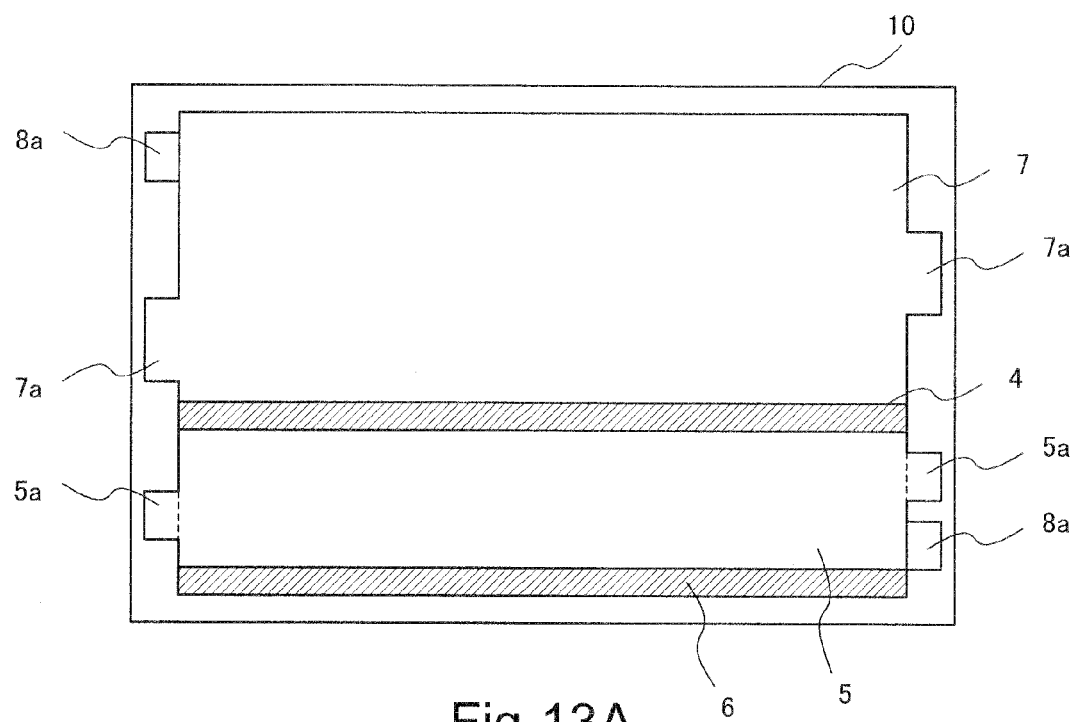
FIG. 13A is a plan view, which is seen from the back side of the liquid crystal display apparatus, showing a state assembled a first light guide plate, a reflection sheet and a second light guide plate into a chassis applied to other exemplary configuration 2 of the second exemplary embodiment.
Figure 13B:
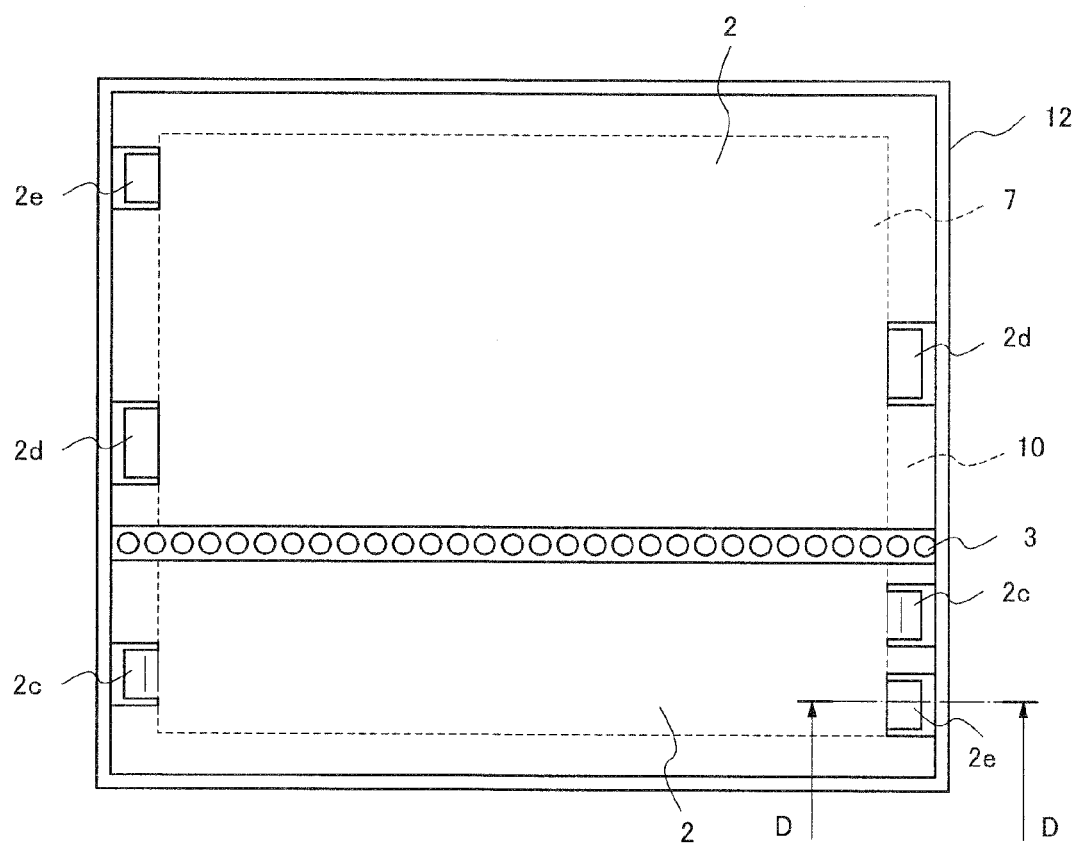
FIG. 13B is a plan view, which is seen from the back side of the liquid crystal display apparatus, showing a state assembled a rear cover, a light source, a liquid crystal display panel and a front cover as well as the state shown in FIG. 13A.
Figure 14:
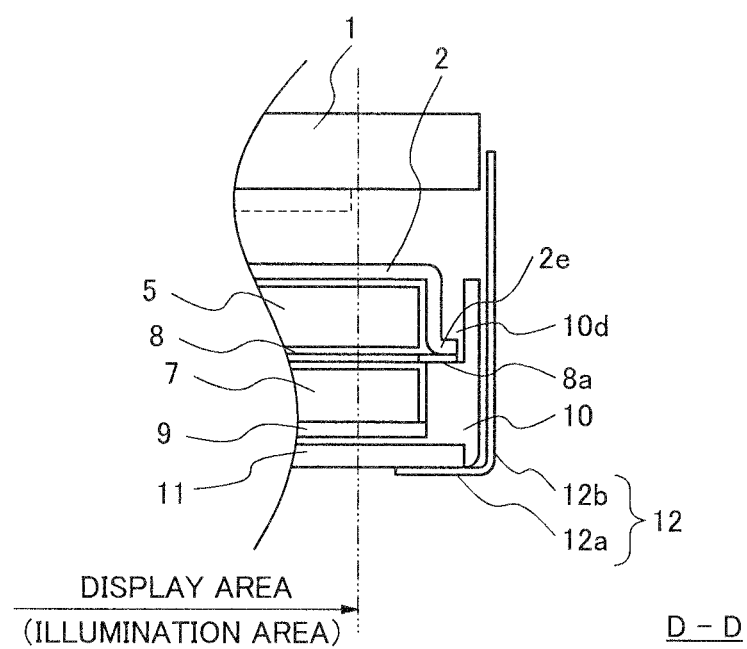
FIG. 14 is a fragmentary cross sectional view showing a cross section, which is parallel to the arrangement direction of the light emitting diodes mounted on the liquid crystal display apparatus, including the projection part of the reflection sheet applied to other exemplary configuration 2 of the second exemplary embodiment.

FIG. 12A is a plan view showing a projection part of a reflection sheet applied to other exemplary configuration 2 regarding the backlight and the liquid crystal display apparatus according to the second exemplary embodiment. FIG. 12B is a plan view showing a concave part of a chassis applied to other exemplary configuration 2. FIG. 12C is a plan view showing a nail part of a rear cover applied to other exemplary configuration 2. FIG. 13A is a plan view, which is seen from the back side of the liquid crystal display apparatus (that is, right side direction in FIG. 3), showing a state assembled a first light guide plate, a reflection sheet and a second light guide plate into a chassis for the sake of convenience. FIG. 13B is a plan view, which is seen from the back side of the liquid crystal display apparatus (that is, right side direction in FIG. 3), showing a state assembled a rear cover, a light source, a liquid crystal display panel and a front cover as well as the state shown in FIG. 13A for the sake of convenience. FIG. 14 is a fragmentary cross sectional view showing a cross section which is parallel to an arrangement direction of the light emitting diodes mounted on the liquid crystal display apparatus including the projection part of the reflection sheet applied to other exemplary configuration 2 of the present embodiment. Here, FIG. 14 is a cross sectional view which is taken along D-D line in the plan view of the liquid crystal display apparatus as shown in FIG. 13B.

The first light guide plate 7 and the second light guide plate 5 applied to other exemplary configuration 2 with regard to the backlight and the liquid crystal display apparatus according to the exemplary embodiment are equivalent to the configuration shown in FIG. 4A and FIG. 4B mentioned above. The chassis 10 and the rear cover 2 are equivalent to the configuration shown in FIG. 5A and FIG. 5B mentioned above. Specifically, as shown in FIG. 12A for example, the reflection sheet 8 includes a pair of projection parts 8a at positions which corresponds to neither position of the projection part 7a of the first light guide plate 7 nor the projection part 5a of the second light guide plate 5 in FIG. 4A and FIG. 4B. Here, as shown in FIG. 12A, the pair of projection parts 8a is arranged on opposed sides of the reflection sheet 8 and is arranged at positions which are symmetric about a point with respect to a rotation central axis 8z which is vertical to a plane of the reflection sheet 8.

As shown in FIG. 12B, two sides of the chassis 10 which are orthogonal to the arrangement direction of the light emitting diodes 3b include a pair of concave parts 10d at positions which correspond to positions of the pair of projection parts 8a of the reflection sheet 8 mentioned above. The chassis 10 includes the pair of concave parts 10b and the pair of concave parts 10a at positions which are correspond respectively to positions of the projection part 7a of the first light guide plate 7 and the projection part 5a of the second light guide plate 5 like the configuration shown in FIG. 5A, in addition to the concave part 10d.

Further, as shown in FIG. 13A and FIG. 14, the above-mentioned concave part 10d can make the reflection sheet 8 dropped and can come into contact with the projection part 8a of the reflection sheet 8. As shown in FIG. 12C, the rear cover 2 includes a nail part 2e at a position which is outside an illumination area corresponding to the display area of the liquid crystal display panel 11, in addition to the nail part 2c and the nail part 2d shown in FIG. 5B. Here, a height of the nail part 2e is different from those of the nail part 2c and the nail part 2d. The nail part 2e is formed at a position corresponding to the projection part 8a of the reflection sheet 8 and extends from the bottom plate 2a toward the liquid crystal display panel 11. A length of the nail part 2e is longer than a thickness of the second light guide plate 5.

According to above mentioned configuration, as shown in FIG. 13A and FIG. 8, the first light guide plate 7 is positioned and fixed in vertical and horizontal directions, that is, in a surface direction, if the projection part 7a of the first light guide plate 7 is engaged with the concave part 10b of the chassis 10. As shown in FIG. 13A and FIG. 14, the reflection sheet 8 is positioned and fixed in the vertical and the horizontal directions, that is, in the surface direction, if the projection part 8a of the reflection sheet 8 is engaged with the concave part 10d of the chassis 10. As shown in FIG. 13A and FIG. 9, the second light guide plate 5 is positioned and fixed in the vertical and the horizontal directions, that is, in the surface direction, if the projection part 5a of the second light guide plate 5 is engaged with the concave part 10a of the chassis 10.

As shown in FIG. 13B and FIG. 8, when the nail part 2d of the rear cover 2 is engaged with the projection part 7a of the first light guide plate 7 which is dropped into the concave part 10b of the chassis 10, the first light guide plate 7 is interposed. Therefore, the first light guide plate 7 is positioned and fixed in a thickness direction. As shown in FIG. 13B and FIG. 14, when the nail part 2e of the rear cover 2 is engaged with the projection part 8a of the reflection sheet 8 which is dropped into the concave part 10d of the chassis 10, the reflection sheet 8 is interposed. Therefore, the reflection sheet 8 is positioned and fixed in a thickness direction. Moreover, as shown in FIG. 13B and FIG. 9, when the nail part 2c of the rear cover 2 is engaged with the projection part 5a of the second light guide plate 5 which is dropped into the concave part 10a of the chassis 10, the second light guide plate 5 is interposed. Therefore, the second light guide plate 5 is positioned and fixed in a thickness direction. That is, the first light guide plate 7, the reflection sheet 8 and the second light guide plate 5 are individually positioned and fixed in the vertical and the horizontal directions and in the thickness direction.

Further, according to FIG. 4 to FIG. 14, the projection part 7a, the projection part 5a, the concave parts 10a, the concave part 10b, the nail part 2c and the nail part 2d are arranged on opposed sides so as to keep the first light guide plate 7 parallel to the second light guide plate 5. It may be preferable that each of the parts above described is arranged on three or more sides or at a plurality of positions per one side. When after putting one side of the first light guide plate 7 and the second light guide plate 5 into the chassis 10, the opposite side of the first light guide plate 7 and the second light guide plate 5 are dropped into the chassis 10, in stead of making both sides of the first light guide plate 7 and the second light guide plate 5 dropped into the chassis 10, the nail parts 2c and 2d may be arranged on only one side of the rear cover 2. According to FIG. 4 to FIG. 14, the projection part 7a, the projection part 5a, the concave part 10a, the concave part 10b, the nail part 2c and the nail part 2d are arranged at positions which are symmetric about a point with respect to opposed sides respectively so that the first light guide plate 7 and the second light guide plate 5 can be prevented from being arranged inside out. The present invention is not limited to such configuration. It is possible to prevent the first light guide plate 7 and the second light guide plate 5 from being arranged inside out or right-side left, when the projection part 7a, the projection part 5a, the concave part 10a, the concave part 10b, the nail part 2c and the nail part 2d are arranged at positions which are asymmetric about a point on opposed sides respectively.

Each exemplary configuration mentioned above will be described below with reference to drawings.

Figure 15A:
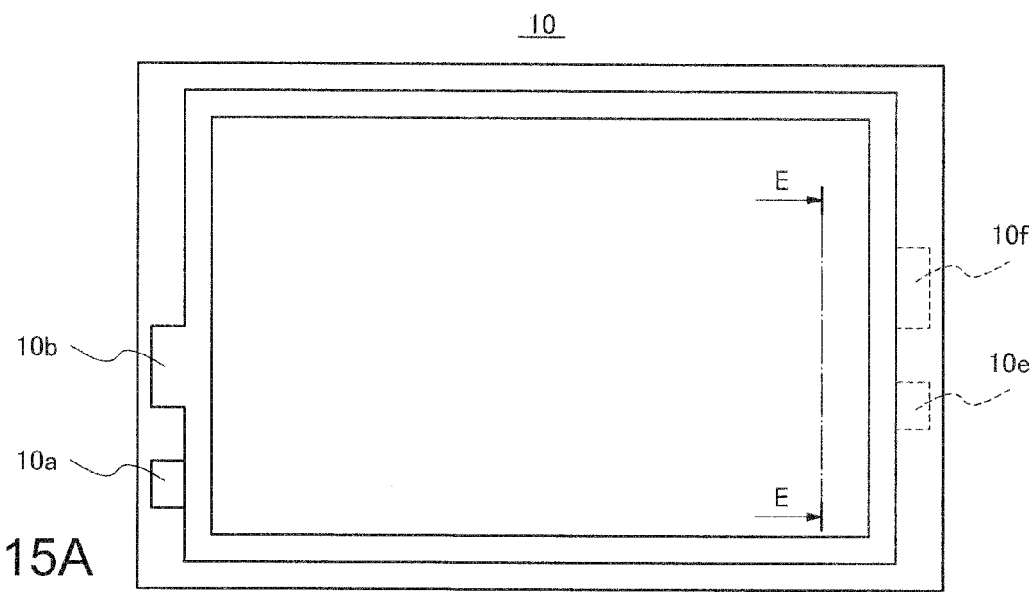
FIG. 15A is a plan view showing a concave part of a chassis applied to other exemplary configuration 3 regarding the backlight and the liquid crystal display apparatus according to the second exemplary embodiment.
Figure 15B:
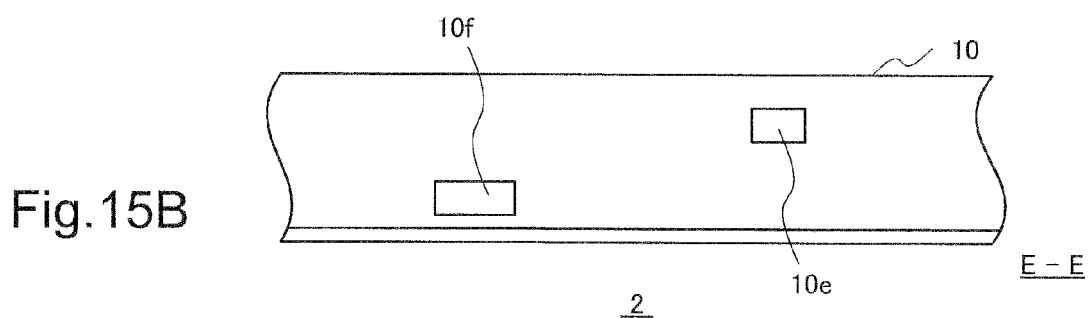
FIG. 15B is a view showing an opening edge of a concave part of a chassis applied to other exemplary configuration 3 of the second exemplary embodiment.
Figure 15C:
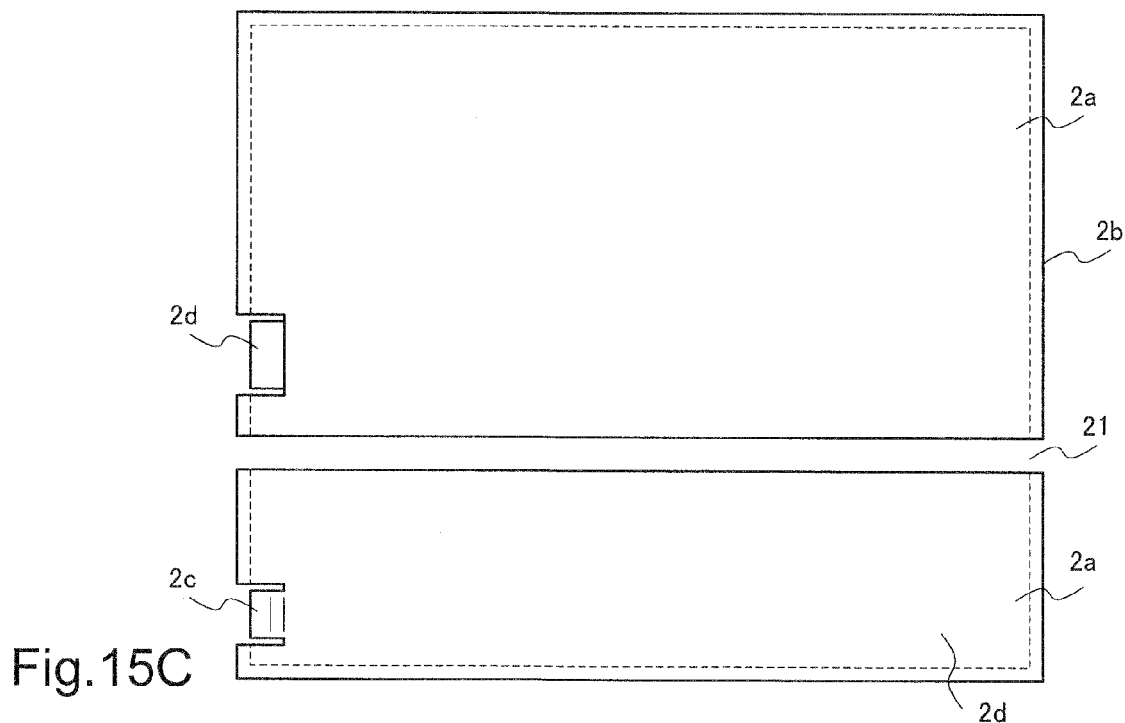
FIG. 15C is a plan view showing a nail part of a rear cover applied to other exemplary configuration 3 of the second exemplary embodiment.
Figure 16A:
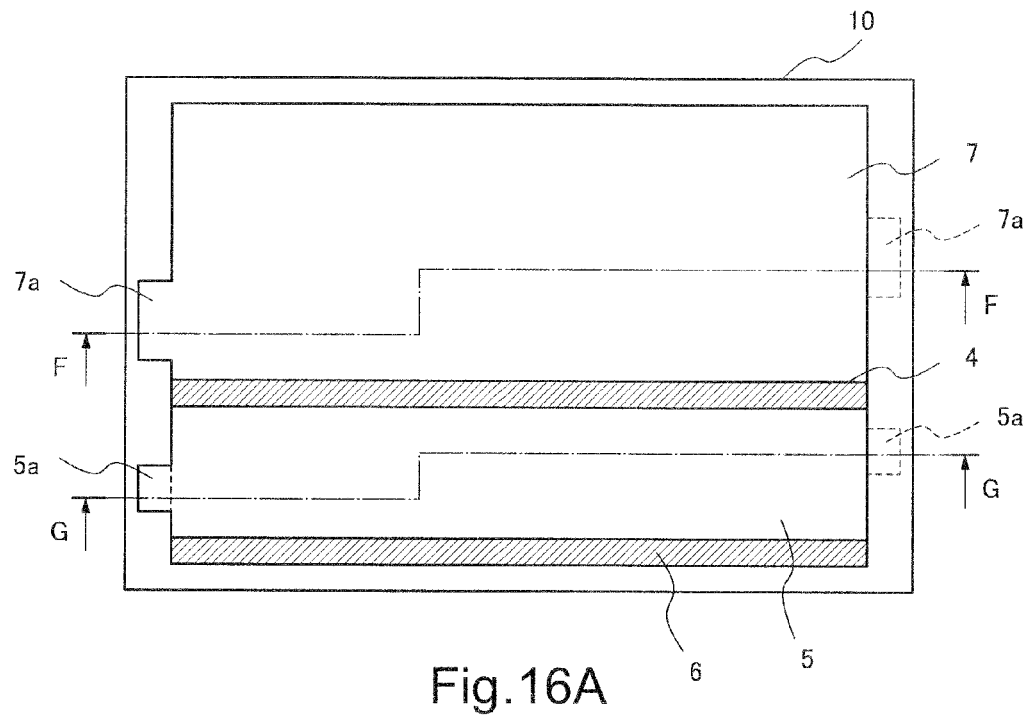
FIG. 16A is a plan view, which is seen from the back side of the liquid crystal display apparatus, showing a state assembled a first light guide plate and a second light guide plate into a chassis applied to other exemplary configuration 3 of the second exemplary embodiment.
Figure 16B:
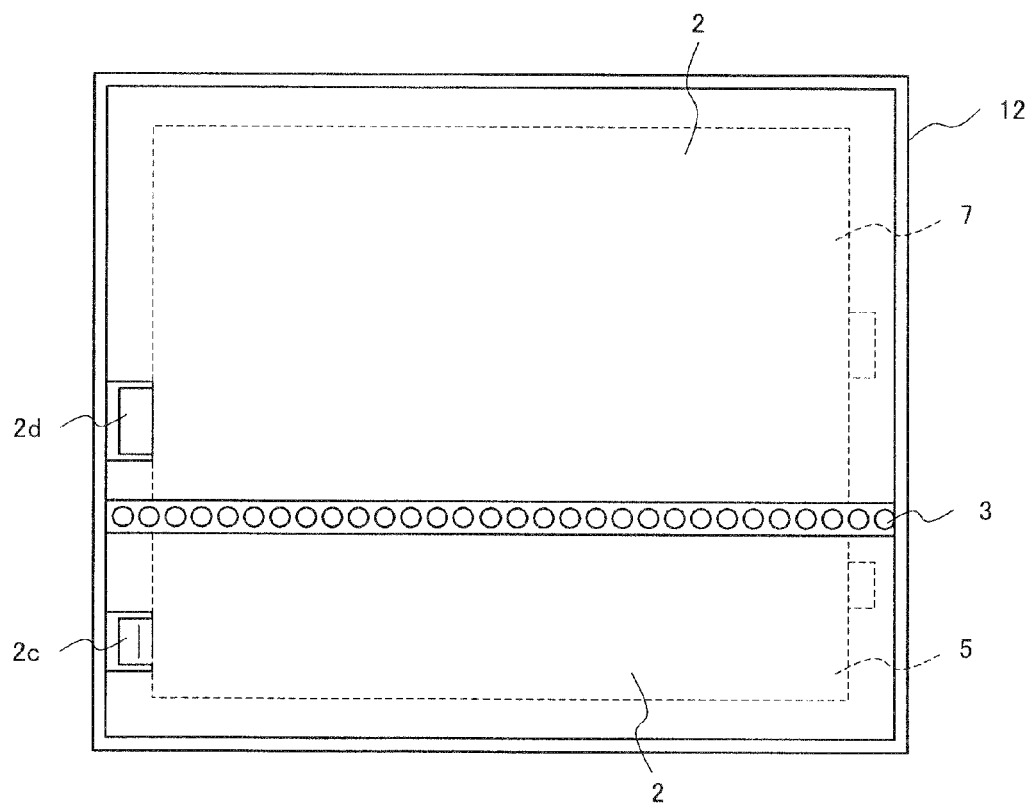
FIG. 16B is a plan view, which is seen from the back side of the liquid crystal display apparatus, showing a state assembled a rear cover, a light source, a liquid crystal display panel and a front cover as well as the state shown in FIG. 16A.
Figure 17A:
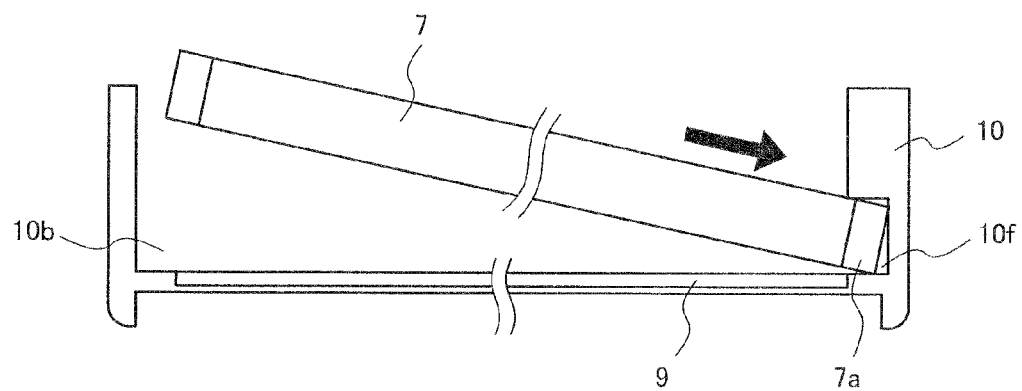
FIG. 17A is a schematic view showing an assembling procedure 1 of a light guide plate applied to other exemplary configuration 3 of the second exemplary embodiment.
Figure 17B:
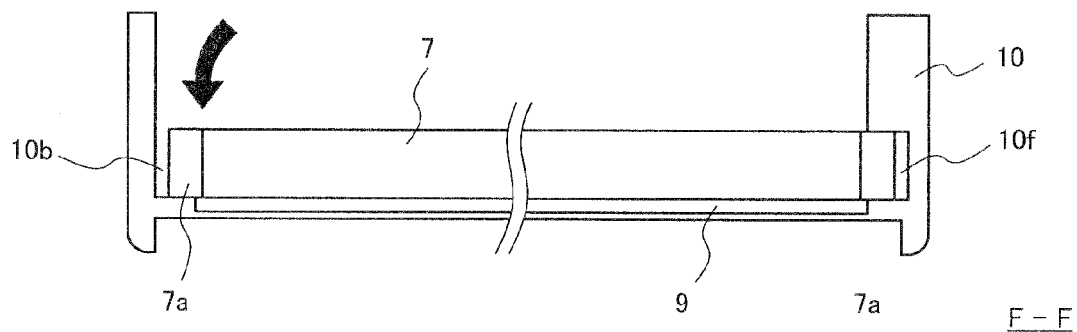
FIG. 17B is a schematic view showing an assembling procedure 2 of the light guide plate applied to other exemplary configuration 3 of the second exemplary embodiment.
Figure 17C:
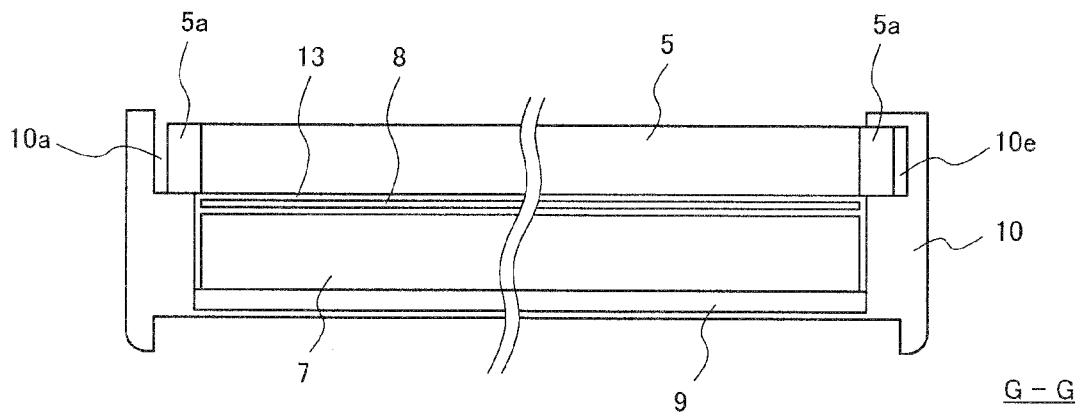
FIG. 17C is a schematic view showing an assembling procedure 3 of the light guide plate applied to other exemplary configuration 3 of the second exemplary embodiment.

FIG. 15A is a plan view showing a concave part of a chassis applied to other exemplary configuration 3 with regard to the backlight and the liquid crystal display apparatus according to the exemplary embodiment. FIG. 15B is a view showing an opening edge of a concave part of a chassis applied to other exemplary configuration 3. Here, FIG. 15B is a view which is taken along E-E line indicated by arrows in the chassis as shown in FIG. 15A. FIG. 15C is a plan view showing a nail part of a rear cover applied to other exemplary configuration 3. FIG. 16A is a plan view, which is seen from the back side of the liquid crystal display apparatus (that is, right side direction in FIG. 3), showing a state assembled a first light guide plate and a second light guide plate into a chassis for the sake of convenience. FIG. 16B is a plan view, which is seen from the back side of the liquid crystal display apparatus (that is, right side direction in FIG. 3), showing a state assembled a rear cover, a light source, a liquid crystal display panel and a front cover as well as the state shown in FIG. 16A for the sake of convenience. FIG. 17A to FIG. 17C is a schematic view showing procedures 1 to 3 for assembling of a light guide plate into a chassis applied to other exemplary configuration 3. Here, FIG. 17A and FIG. 17B are a cross sectional view which is taken along F-F line in the plan view of the liquid crystal display apparatus as shown in FIG. 16A. FIG. 17C is a cross sectional view which is taken along G-G line in the plan view of the liquid crystal display apparatus as shown in FIG. 16A.

The first light guide plate 7 and the second light guide plate 5 applied to other exemplary configuration 3 with regard to the backlight and the liquid crystal display apparatus according to the exemplary embodiment are equivalent to the configuration shown in FIG. 4A and FIG. 4B mentioned above. The chassis 10 includes, as shown in FIG. 15A for example, one concave part 10b and one concave part 10a at positions respectively corresponding to the projection part 7a of the first light guide plate 7 and the projection part 5a of the second light guide plate 5, on a left side in FIG. 15A. As shown in FIG. 15A and FIG. 15B, for example, the chassis 10 includes one concave part 10f and one concave part 10e at positions respectively corresponding to the projection part 7a of the first light guide plate 7 and the projection part 5a of the second light guide plate 5, on right side in FIG. 15A. Here, each of the concave parts 10f and 10e includes an opening edge which faces toward inside of the chassis 10.

As shown in FIG. 16A and FIG. 17B, the projection part 7a of the first light guide plate 7 can be put into the concave part 10f from inside of the chassis 10 and then, each face of the projection part 7a of the first light guide plate 7 can come into contact with inner faces of the concave part 10f. Similarly, as shown in FIG. 16A and FIG. 17C, the projection part 5a of the second light guide plate 5 can be put into the concave part 10e from inside of the chassis 10 and then, each face of the projection part 5a of the second light guide plate 5 can come into contact with inner faces of the concave part 10e. Here, as shown in FIG. 17C, the concave parts 10f and 10e are arranged at suitable positions so that the second light guide plate 5 does not come into contact with the first light guide plate 7 when the first light guide plate 7 and the second light guide plate 5 are assembled to the chassis 10. As shown in FIG. 15C, the rear cover 2 includes one nail part 2d and one nail part 2c at positions corresponding to the positions of the concave part 10b and the concave part 10a of the chassis 10 respectively, similarly as shown to FIG. 6 and FIG. 7.

Based on the configuration, a first procedure for assembling the light guide plate is, as shown in FIG. 17A, to puts one projection of the projection parts 7a (projection on right side in the figure) of the first light guide plate 7 into the concave part 10f from inside of the chassis 10 (refer to arrow indicated in the figure). Here, if the chassis 10 is made of an elastic material such as resin, an applied external force which puts one projection of the projection part 7 into the concave part 10f transforms the chassis 10 to extend a side having the concave part 10f of the chassis 10 outward. As a result, it becomes easy to puts one projection of the projection parts 7a of the first light guide plate 7 into the concave part 10f of the chassis 10. After completion of putting one projection of the projection parts 7a into the concave part 10f, the chassis 10 is returned to an original shape by releasing the above-mentioned external force. Afterward, as shown in FIG. 17B, the other projection of projection parts 7a (projection on left side in FIG. 17B) of the first light guide plate 7 is dropped into the concave part 10b of the chassis 10. As a result, as shown in FIG. 16A, the first light guide plate 7 is positioned and fixed in vertical and horizontal directions, that is, in a surface direction. Further, since one projection of the projection parts 7a of the first light guide plate 7 is put into the concave part 10f of the chassis 10 and fitted thereto, one side of the first light guide plate 7 is positioned and fixed in the thickness direction.

Next, after the reflection sheet 8 is arranged on the first light guide plate 7, the second light guide plate 5 is put into the chassis 10 using a similar method to the above mentioned method for putting the first light guide plate 7 into the chassis 10. That is, initially one projection of the projection parts 5a of the second light guide plate 5 is put into the concave part 10e from an inside of the chassis 10. Afterward, the other projection of the projection parts 5a of the second light guide plate 5 is dropped into the concave part 10a. As a result, the second light guide plate 5 is positioned and fixed in vertical and horizontal directions, that is, in the surface direction as shown in FIG. 16A and FIG. 17C. Further, since one projection of the projection part 5a of the second light guide plate 5 is put into the concave part 10e of the chassis 10 and fitted thereto, the one side of the second light guide plate 5 is positioned and fixed in the thickness direction.

As shown in FIG. 16B and FIG. 8, since the nail part 2d arranged at one position of the rear cover 2 is engaged with the concave part 10b of the chassis 10, the other projection of the projection part 7a of the first light guide plate 7 is sandwiched by the concave part 10b and the nail part 2d. Therefore, the other side of the first light guide plate 7 is positioned and fixed in the thickness direction. As shown in FIG. 16B and FIG. 9, since the nail part 2c arranged at one position of the rear cover 2 is engaged with the concave part 10a of the chassis 10, the other projection of the projection part 5a of the second light guide plate 5 is sandwiched by the concave part 10a and the nail part 2c. Therefore, the other side of the second light guide plate 5 is positioned and fixed in the thickness direction. Accordingly, the first light guide plate 7 is held parallel to the second light guide plate 5 via a layer 13 of air.

Figure 18A:
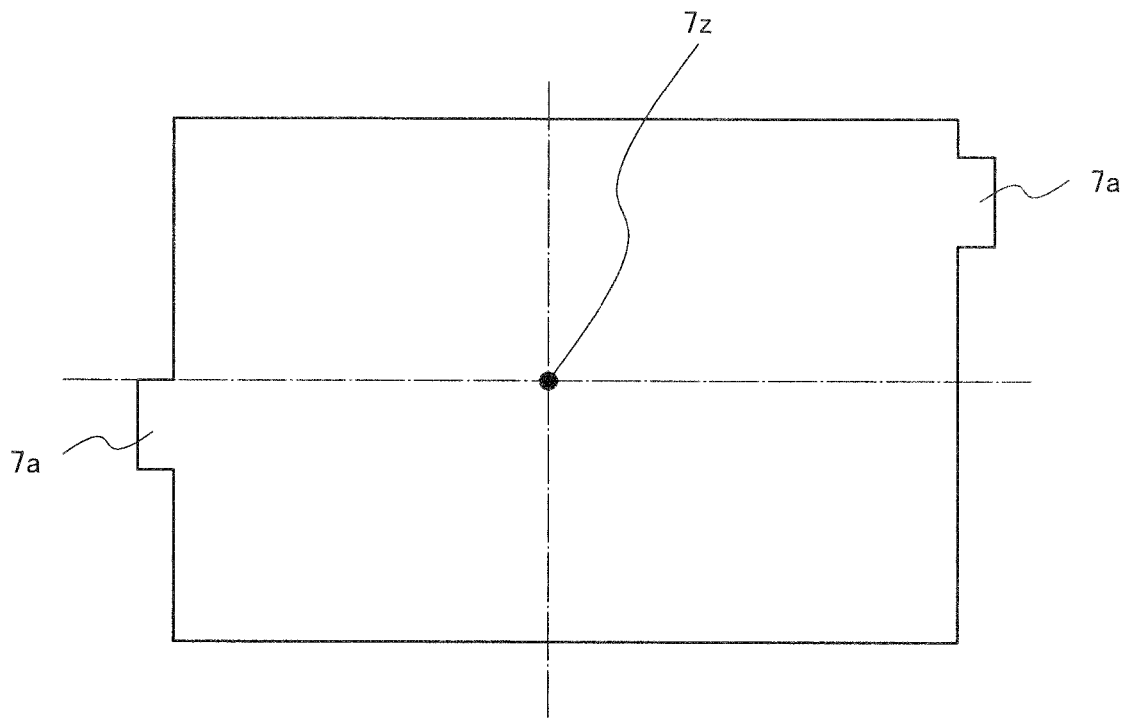
FIG. 18A is a plan view showing a projection part of a first light guide plate applied to other exemplary configuration 4 of the second exemplary embodiment.
Figure 18B:
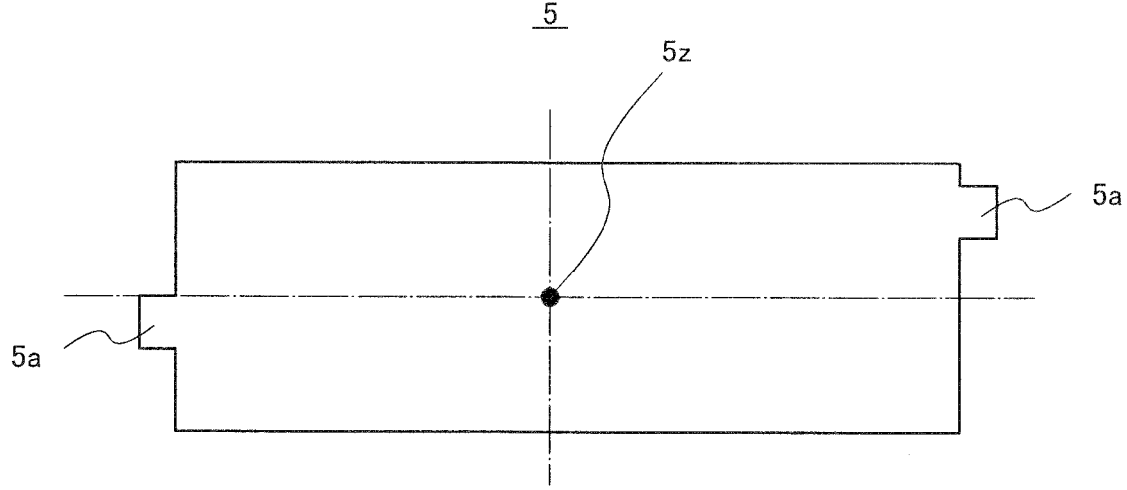
FIG. 18B is a plan view showing a projection part of a second light guide plate applied to other exemplary configuration 4 regarding the backlight and the liquid crystal display apparatus according to the second exemplary embodiment.
Figure 19A:
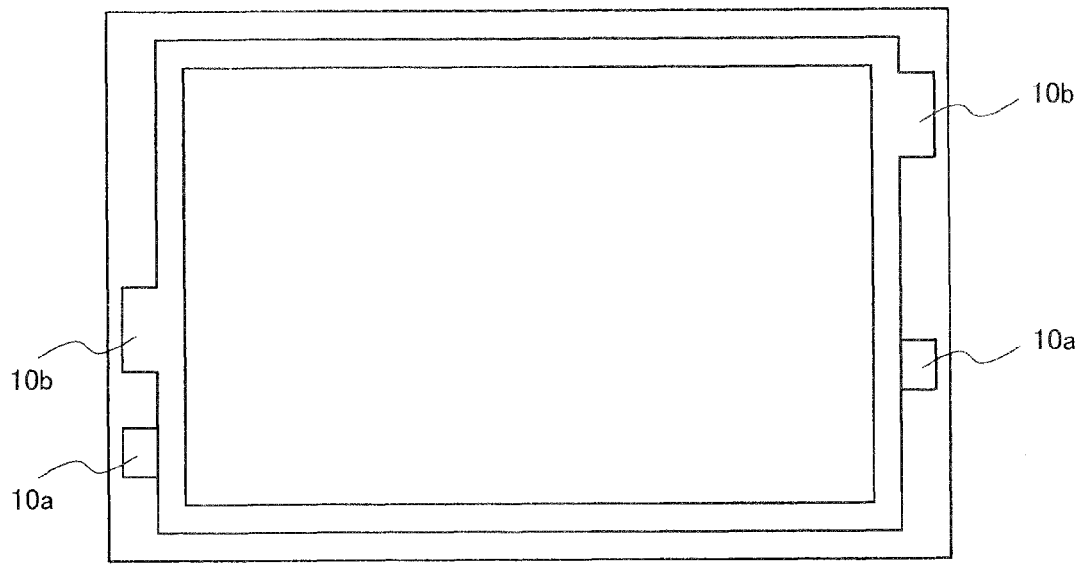
FIG. 19A is a plan view showing a concave part of a chassis applied to other exemplary configuration 4 according to the second exemplary embodiment.
Figure 19B:
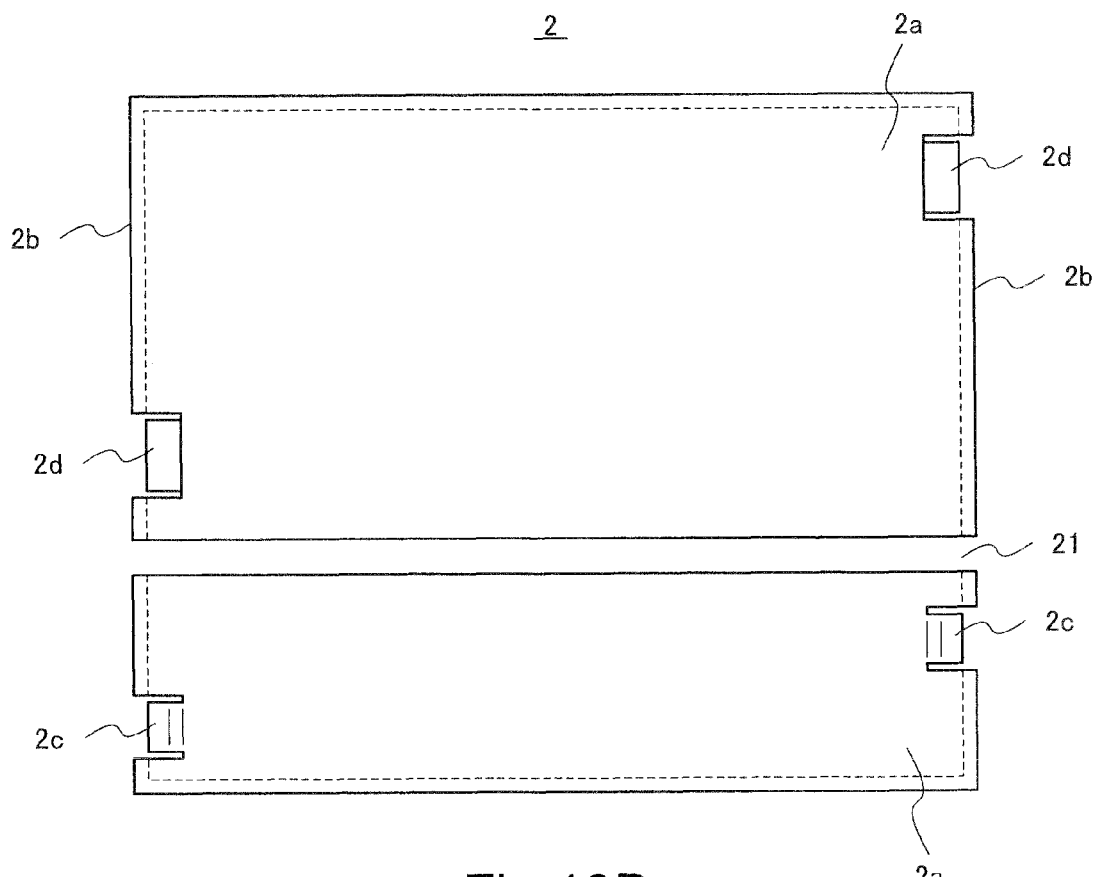
FIG. 19B is a plan view showing a nail part of a rear cover applied to other exemplary configuration 4 according to the second exemplary embodiment.

FIG. 18A is a plan view showing a projection part of a first light guide plate applied to other exemplary configuration 4 with regard to the backlight and the liquid crystal display apparatus according to the exemplary embodiment. FIG. 18B is a plan view showing a projection part of a second light guide plate applied to other exemplary configuration 4 according to the exemplary embodiment. FIG. 19A is a plan view showing a concave part of a chassis applied to other exemplary configuration 4 according to the exemplary embodiment. FIG. 19B is a plan view showing a nail part of a rear cover applied to other exemplary configuration 4 according to the exemplary embodiment.

A first light guide plates 7 applied to other exemplary configuration 4 with regard to the backlight and the liquid crystal display apparatus according to the exemplary embodiment includes, specifically, as shown in FIG. 18A, a pair of projections 7a is located on opposed sides in the first light guide plate 7 respectively. The pair of projection parts 7a is located at positions which are asymmetric about a point with respect to a rotation central axis 7z which is vertical to a plane of the first light guide plate 7. That is, the pair of the projection parts 7a is arranged at positions which are not symmetric about a point with respect to the rotation central axis 7z. A second light guide plates 5 includes, as shown in FIG. 18B, a pair of projections 5a is located on opposed sides in the second light guide plates 5 respectively. The pair of projection parts 5a is located at positions which are asymmetric about a point with respect to a rotation central axis 5z which is vertical to a plane of the second light guide plate 5. That is, the pair of the projection parts 5a is arranged at positions which are not symmetric about a point with respect to the rotation central axis 5z. As shown in FIG. 19A, a chassis 10 includes a concave parts 10b and a concave part 10a at positions corresponding to a position of the projection part 7a of the first light guide plate 7 and a position of the projection part 5a of the second light guide plate 5 respectively. As shown in FIG. 19B, a rear cover 2 includes a nail part 2d and a nail part 2c at positions corresponding to a position of the projection part 7a of the first light guide plate 7 and a position of the projection part 5a of the second light guide plate 5 respectively.

That is, the pair of projection parts 7a of the first light guide plate 7, the pair of projection parts 5a of the second light guide plate 5, the pair of concave parts 10a of the chassis 10, the pair of concave parts 10b of the chassis 10, the pair of nail parts 2c of the rear cover 2 and the pair of nail parts 2d of the rear cover 2 are respectively arranged at positions which are not symmetric about a point with respect to opposed sides. As a result, it is possible to prevent the first light guide plate 7 and the second light guide plate 5 from being arranged inside out or right-side left when the first light guide plate 7 and the second light guide plate 5 are assembled to the chassis 10.

Next, an operation of the liquid crystal display apparatus including the backlight of aforementioned configuration will be described below.

First, when an electric power is applied and an image signal is inputted to the liquid crystal display apparatus 11, the liquid crystal display panel 11 generates an image based on the image signal. Meanwhile, a plurality of light emitting diodes 3b of the backlight, that is, a red diode, a green diode and a blue diode emit red, green and blue light forward (that is, left direction in FIG. 3) respectively. Each color light enters the reflector 4, and is reflected by 90 degrees by the reflector 4, and then, is outputted in a lateral direction (that is, upper direction in FIG. 3). Each color light emitted from the reflector 4 enters the second light guide plate 5. Each color light is mixed to change to a white light, while propagating through the second light guide plate 5 in a lateral direction. After that, the white light reaches the reflector 6. Then, the white light is reflected by the reflector 6, that is, the white light is bent by 180 degrees by the reflector 6, and then, is emitted in the lateral direction (that is, lower direction in FIG. 3). After entering the first light guide plate 7, the white light is diffused by the dots while propagating through the first light guide plate 7 in the lateral direction. Afterward, the white light is emitted from a front face (that is, a face of the left side direction in FIG. 3) of the first light guide plate 7 almost homogeneously forward (that is, left direction in FIG. 3) from the liquid crystal display apparatus.

Then, Light emitted from the front face of the first light guide plate 7 is diffused, concentrated, and polarized by the optical sheet 9, and afterward is inputted to the liquid crystal display panel 11. At this time, only polarized light which can be inputted to the liquid crystal display panel 11 passes through the light polarization sheet of the optical sheet 9. On the other hand, a polarized light which cannot be inputted to the liquid crystal display panel 11 is reflected backward by the light polarization sheet for reuse. That is, after being reflected further by the first light guide plate 7 or the reflection sheet 8 and being changed a polarization direction thereof, the light reflected backward is inputted to the optical sheet 9 again. When the light passes through the optical sheet 9 and the liquid crystal display panel 11, the light which carries an image is emitted forward (that is, left direction in FIG. 3) from the liquid crystal display apparatus. As a result, the liquid crystal display apparatus can display the image. Then, the light emitting diode 3b generates heat due to operation of the light emitting diode 3b. The heat is conducted to the heat sink 1 and is radiated from the heat sink 1 outward. As a result, the light emitting diode 3b is cooled. Furthermore, since the backlight includes the reflection sheet 8, it is possible to prevent light leakage which may occur between both light guide plates when a light propagates through the first light guide plate 7. As a result, the backlight and the liquid crystal display apparatus according to the exemplary embodiment can improve use efficiency of light.

Third Exemplary Embodiment

Next, a backlight and a liquid crystal display apparatus according to a third exemplary embodiment will be described below with reference to FIG. 20 to FIG. 22.

Figure 20A:
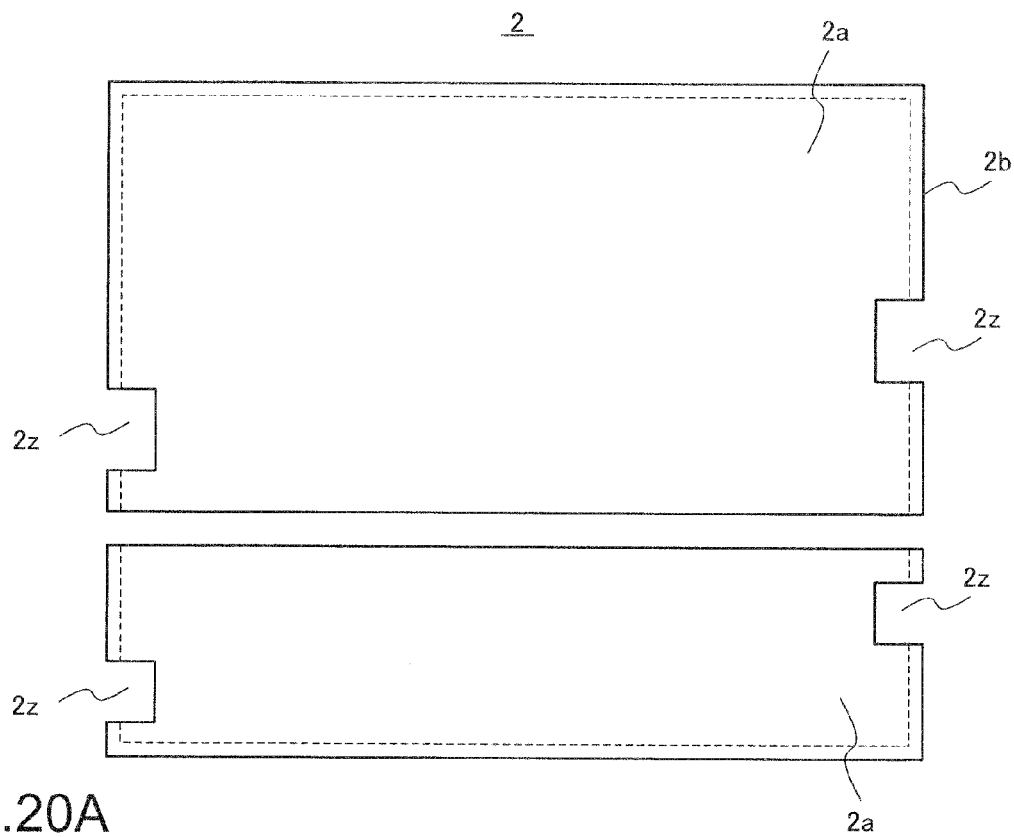
FIG. 20A is a plan view showing a cutting part of a rear cover applied to the backlight and the liquid crystal display apparatus according to the third exemplary embodiment.
Figure 20B:
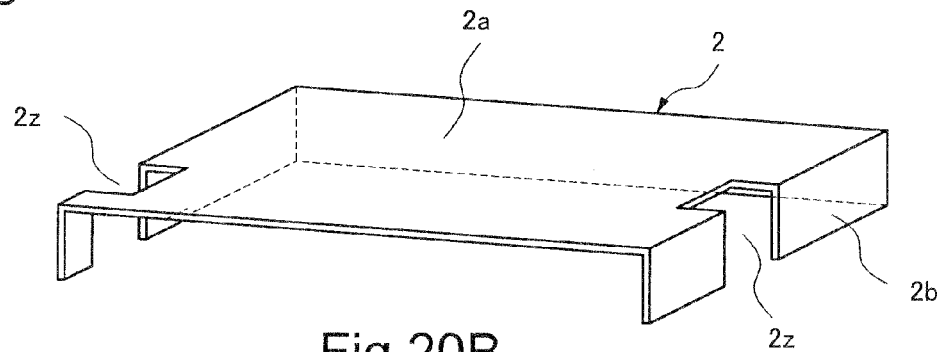
FIG. 20B is a perspective view showing a cutting part of a rear cover shown upside in FIG. 20A.
Figure 20C:
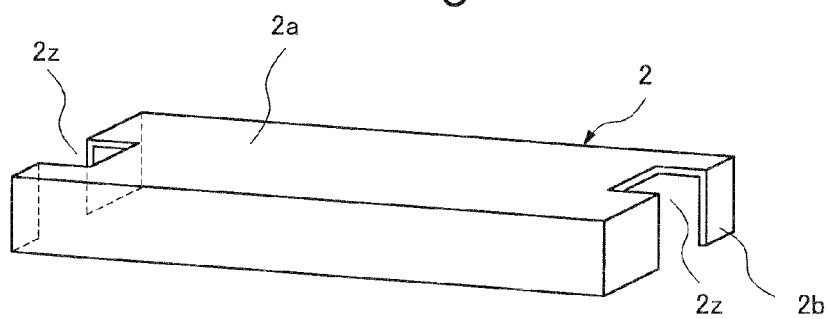
FIG. 20C is a perspective view showing a cutting part of a rear cover shown downside in FIG. 20A.

FIG. 20A is a plan view showing a cutting part of a rear cover applied to the backlight and the liquid crystal display apparatus according to the third exemplary embodiment. FIG. 20B is a perspective view showing a cutting part of a rear cover shown upside in FIG. 20A. FIG. 20C is a perspective view showing a cutting part of a rear cover shown downside in FIG. 20A. FIG. 21 is a fragmentary cross section view showing a cross section which is parallel to an arrangement direction of light emitting diodes arranged on the liquid crystal display apparatus including a projection part of a first light guide plate which is applied to the backlight and the liquid crystal display apparatus according to the third exemplary embodiment. FIG. 22 is a fragmentary cross section view showing a cross section, which is parallel to the arrangement direction of the light emitting diodes arranged on the liquid crystal display apparatus including a projection part of a second light guide plate which is applied to the exemplary embodiment. Here, FIG. 21 and FIG. 22 indicate a cross sectional views of the configuration which includes stationary parts instead of the nail part 2d and 2c, in the cross sectional views which are taken along B-B line and C-C line in the plan view of the liquid crystal display apparatus respectively as shown in FIG. 7B mentioned above.

According to the backlight of the second exemplary embodiment mentioned above, the first light guide plate 7 and the second light guide plate 5 are positioned and fixed on a rear face using the nail part 2d and the nail part 2c integrally formed on the rear cover 2. But the present invention is not limited to the configuration.

Figure 21:
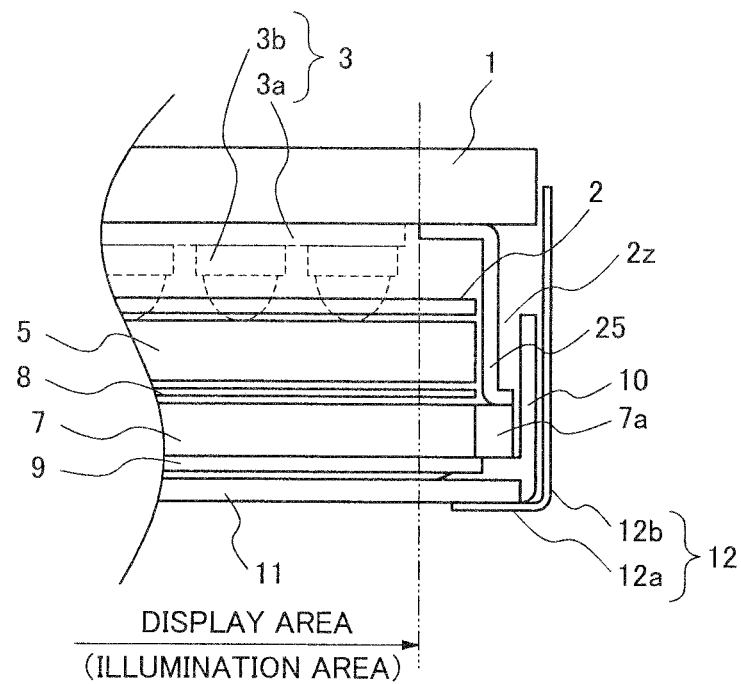
FIG. 21 is a fragmentary cross sectional view showing a cross section, which is parallel to an arrangement direction of the light emitting diodes mounted on the liquid crystal display apparatus, including a projection part of a first light guide plate applied to a third exemplary embodiment.
Figure 22:
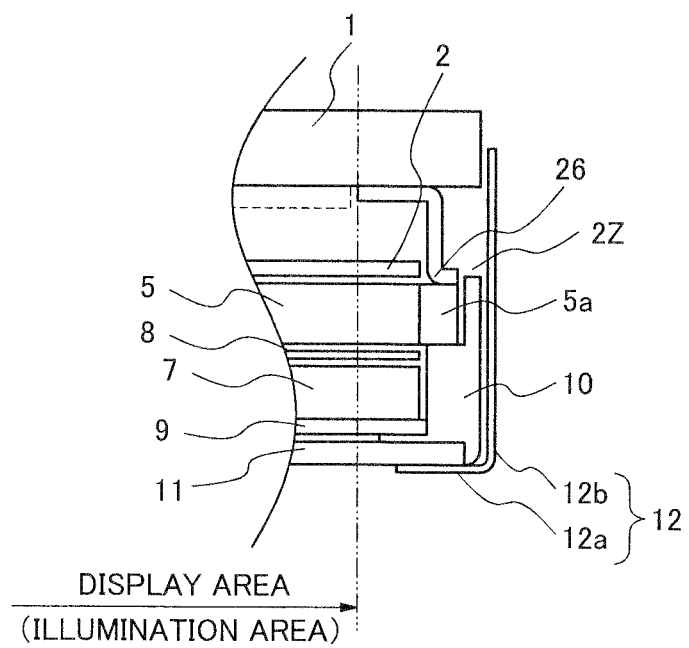
FIG. 22 is a fragmentary cross sectional view showing a cross section, which is parallel to an arrangement direction of the light emitting diodes mounted on the liquid crystal display apparatus, including a projection part of a second light guide plate applied to the third exemplary embodiment.

The backlight and the liquid crystal display apparatus according to the third embodiment may include, as shown in FIG. 21 and FIG. 22, stationary parts 25 and 26 which are fixed to a heat sink 1, instead of the nail parts 2d and 2c.

That is, the first light guide plate 7 and the second light guide plate 5 according to the exemplary embodiment are equivalent respectively to the first light guide plate 7 shown in FIG. 4A and the second light guide plate 5 shown in FIG. 4B mentioned above. Similarly, the chassis 10 according to the exemplary embodiment is equivalent to the chassis 10 shown in FIG. 5A mentioned above. Moreover, as shown in FIG. 20A, FIG. 20B and FIG. 20C, the rear cover 2 has a plurality of cut parts 2z outside the illumination area which is corresponding to display area of the liquid crystal display panel 11. Here, the rear cover 2 has the cut part 2z at position which is corresponding to position of the projection part 7a of the first light guide plate 7 and position of the projection part 5a of the second light guide plate 5. As shown in FIG. 21 and FIG. 22, the fastening devices 25 and 26, which are fixed on the heat sink 1, engages respectively with the projection part 7a of the first light guide plate 7 and the projection part 5a of the second light guide plate 5, which are dropped into the concave parts 10b and 10a of the chassis 10 respectively through the cut part 2z of the rear cover 2.

Therefore, according to the configuration, a first light guide plate 7 and a second light guide plate 5 can be positioned and fixed on the rear face. Moreover, according to the exemplary embodiment, the stationary parts 25 and 26 may be fixed to the rear cover 2 instead of the heat sink 1. Furthermore, as shown in FIG. 10 mentioned above, it may be preferable that a reflection sheet 8 includes a projection part, and the first light guide plate 7 and the reflection sheet 8 are integrally positioned and fixed in a thickness direction by the stationary part 25 according to the exemplary embodiment. Also, as shown in FIG. 12A to FIG. 12C mentioned above, it may be preferable that the chassis 10 and the rear cover 2 include a concave part and a nail part respectively at positions corresponding to positions of the projection parts of the reflection sheet 8 according to the exemplary embodiment. As a result, the first light guide plate 7, the reflection sheet 8 and the second light guide plate 5 are individually positioned and fixed in a thickness direction.

Further, the exemplary embodiment is not limited to the configuration in which the projection part 7a of the first light guide plate 7, the projection part 5a of the second light guide plate 5, the concave part 10b of the chassis 10, the concave part 10a of the chassis 10, the stationary part 25 and the stationary part 26 which are connected to the heat sink 1 or the rear cover 2 are arranged only on opposed sides respectively. That is, it may be preferable that each part of the above-mentioned projection parts 7a and 5a, the concave parts 10b and 10a and the stationary parts 25 and 26 is arranged on three or more sides or at a plurality of positions per one side according to the exemplary embodiment. Moreover, as mentioned above, the exemplary embodiment is not limited to the configuration in which the pair of projection parts 7a, the pair of projection parts 5a, the pair of concave parts 10b, the pair of concave parts 10a, the pair of stationary parts 25 and the pair of stationary parts 26 are arranged respectively at positions which are symmetric about a point with respect to a predetermined central rotation axis. That is, it may be preferable that the pair of projection parts 7a, the pair of projection parts 5a, the pair of concave parts 10b, the pair of concave parts 10a, the pair of stationary parts 25 and the pair of stationary parts 26 are arranged respectively at positions which are not symmetric about a point according to the exemplary embodiment.

Fourth Exemplary Embodiment

Next, a backlight and a liquid crystal display apparatus according to a fourth exemplary embodiment will be described below with reference to FIG. 23 to FIG. 26.

Figure 23A:
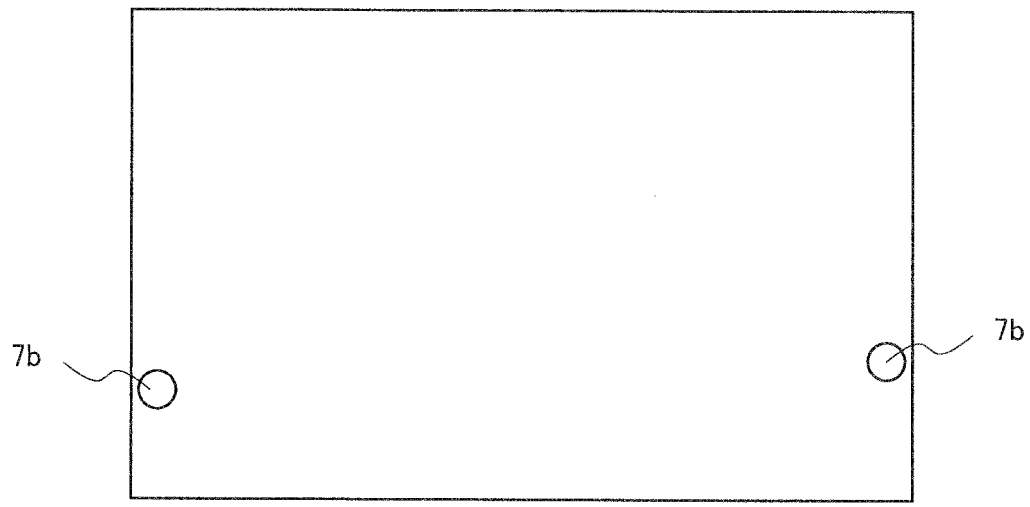
FIG. 23A is a plan view showing a hole part of a first light guide plate applied to the backlight and the liquid crystal display apparatus according to the fourth exemplary embodiment.
Figure 23B:
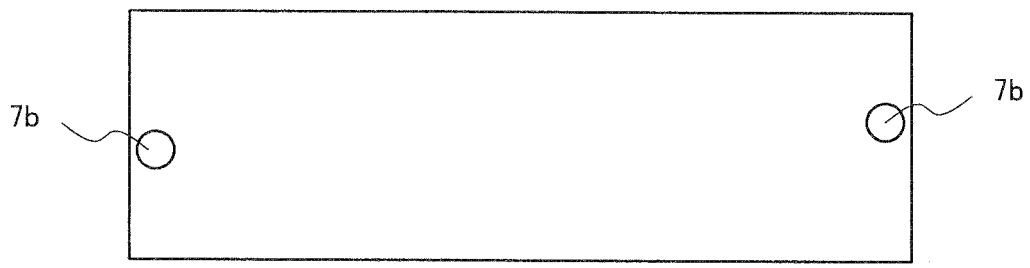
FIG. 23B is a plan view showing a hole part of a second light guide plate applied to the fourth exemplary embodiment.
Figure 24A:
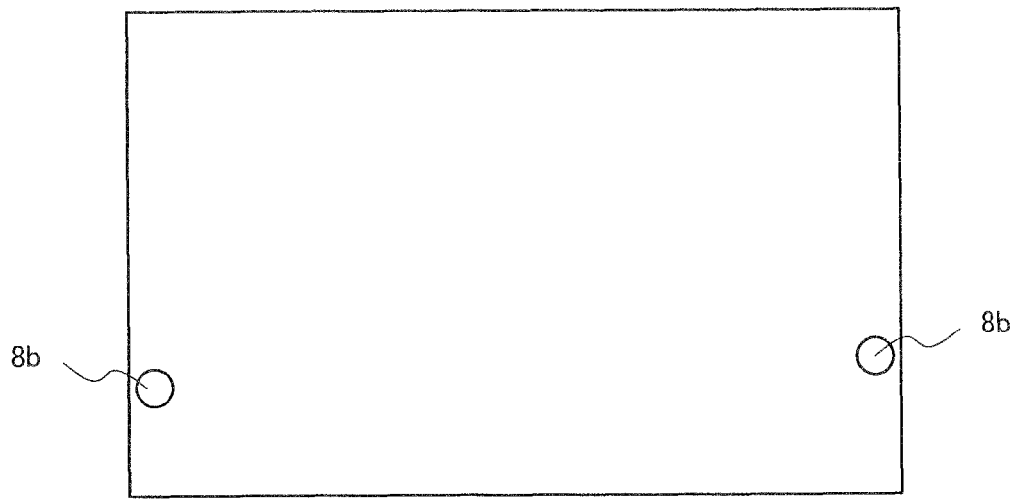
FIG. 24A is a plan view showing a hole part of a reflection sheet applied to the fourth exemplary embodiment.
Figure 24B:
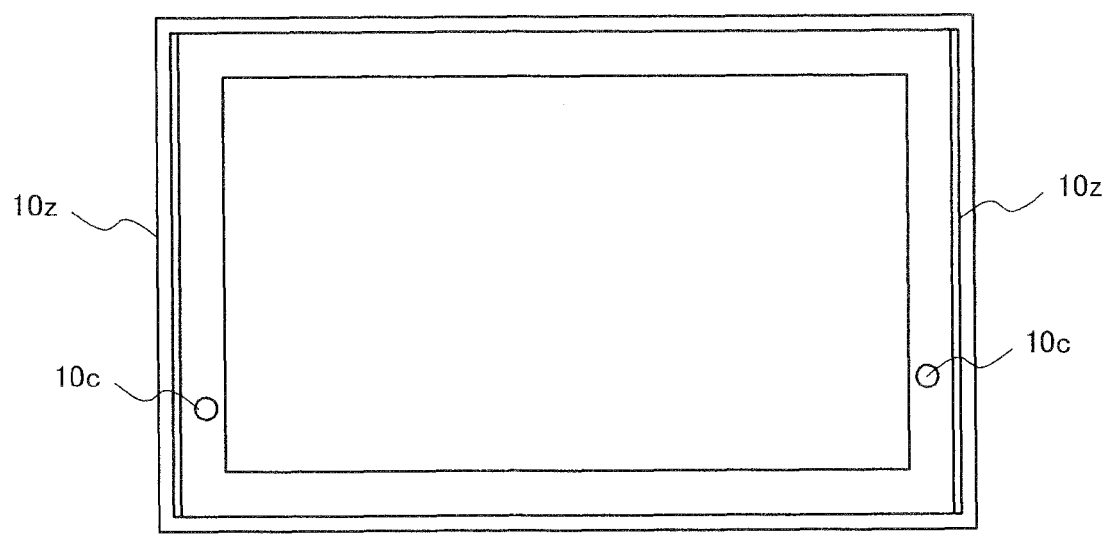
FIG. 24B is a plan view showing a columnar projection part of a chassis applied to the fourth exemplary embodiment.
Figure 25A:
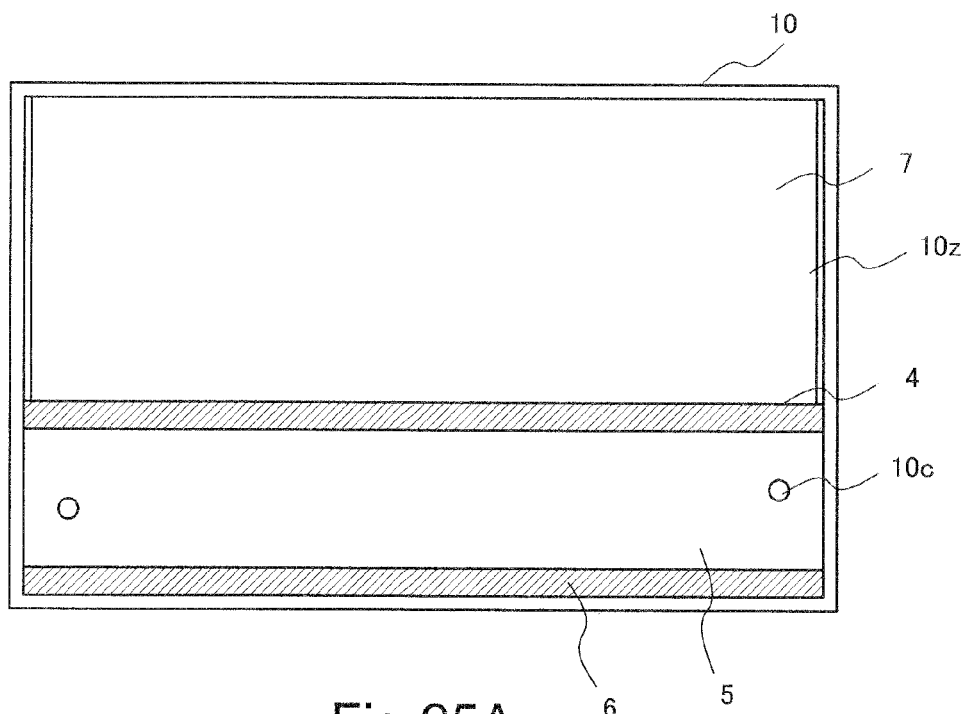
FIG. 25A is a plan view, which is seen from the back side of the liquid crystal display apparatus, showing a state assembled a first light guide plate and a second light guide plate into a chassis applied to the fourth exemplary embodiment.
Figure 25B:
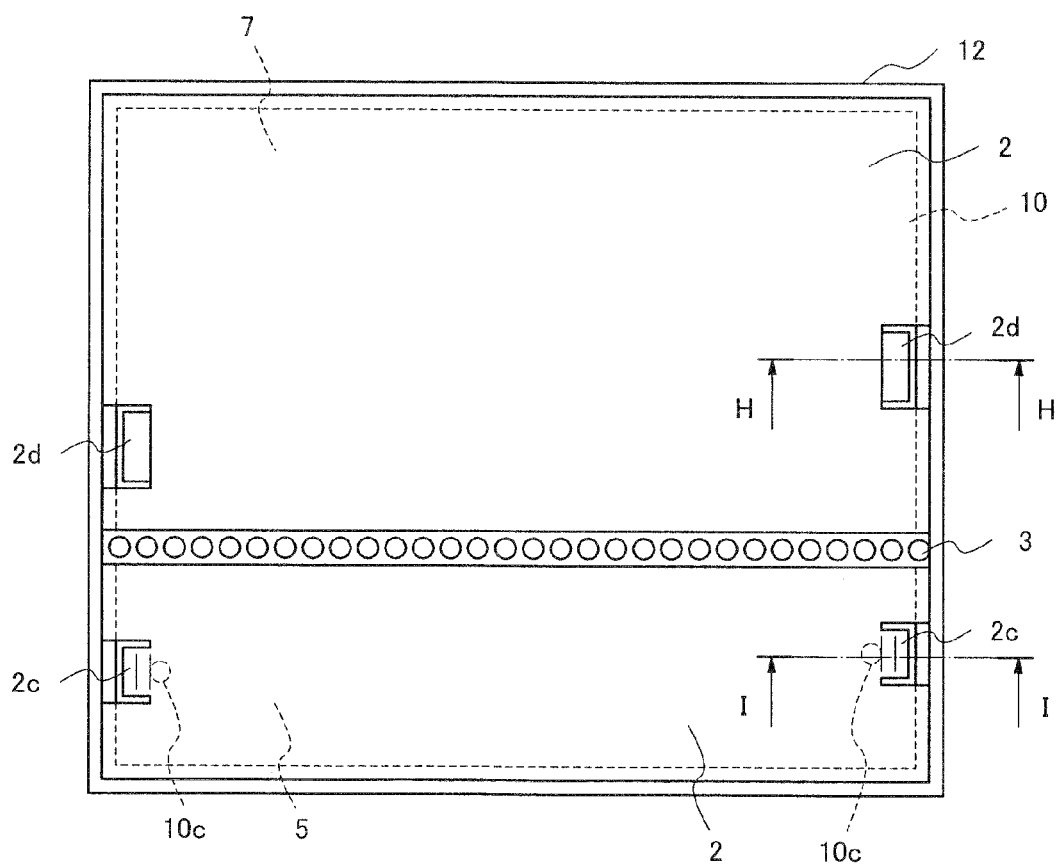
FIG. 25B is a plan view, which is seen from the back side of the liquid crystal display apparatus, showing a state assembled a rear cover, a light source, a liquid crystal display panel and a front cover as well as the state shown in FIG. 25A.
Figure 26:
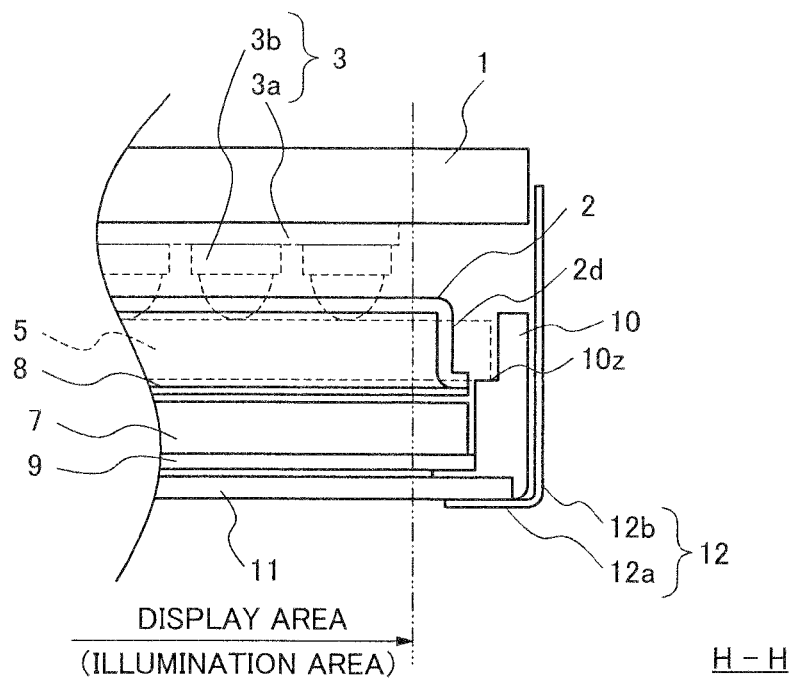
FIG. 26 is a fragmentary cross sectional view showing a cross section, which is parallel to the arrangement direction of the light emitting diodes mounted on the liquid crystal display apparatus, including the first light guide plate, reflection sheet and a nail part of a rear cover applied to the fourth exemplary embodiment.
Figure 27:
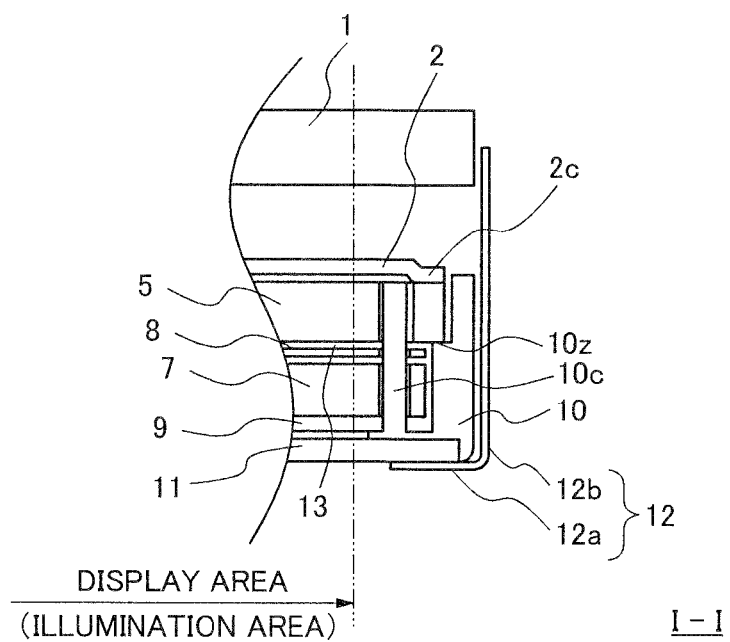
FIG. 27 is a fragmentary cross sectional view showing a cross section, which is parallel to an arrangement direction of the light emitting diodes mounted on the liquid crystal display apparatus, including the hole part of the first light guide plate, the hole part of the second light guide plate and the columnar projection part of the chassis applied to the fourth exemplary embodiment.

FIG. 23A is a plan view showing a hole part of a first light guide plate applied to the backlight and the liquid crystal display apparatus according to the fourth exemplary embodiment. FIG. 23B is a plan view showing a hole part of a second light guide plate applied to the fourth exemplary embodiment. FIG. 24A is a plan view showing a hole part of a reflection sheet applied to the fourth exemplary embodiment. FIG. 24B is a plan view showing a columnar projection part of a chassis applied to the fourth exemplary embodiment. FIG. 25A is a plan view, which is seen from the back side of the liquid crystal display apparatus (that is, right side direction in FIG. 3), showing a state assembled a first light guide plate and a second light guide plate into a chassis for the sake of convenience. FIG. 25B is a plan view, which is seen from the back side of the liquid crystal display apparatus (that is, right side direction in FIG. 3), showing a state assembled a rear cover, a light source, a liquid crystal display panel and a front cover as well as the state shown in FIG. 25A for the sake of convenience. FIG. 26 is a fragmentary cross sectional view showing a cross section, which is parallel to the arrangement direction of the light emitting diodes mounted on the liquid crystal display apparatus, including the first light guide plate, reflection sheet and a nail part of a rear cover applied to the exemplary embodiment. Here, FIG. 26 is a cross sectional view which is taken along H-H line in the plan view of the liquid crystal display apparatus as shown in FIG. 25B. FIG. 27 is a fragmentary cross sectional view showing a cross section, which is parallel to an arrangement direction of the light emitting diodes mounted on liquid crystal display apparatus, including the hole part of the first light guide plate, the hole part of the second light guide plate and the columnar projection part of the chassis which are applied to the exemplary embodiment. Here, FIG. 27 is a cross sectional view which is taken along I-I line in the plan view of the liquid crystal display apparatus as shown in FIG. 25B.

With regard to the above mentioned backlight according to the second exemplary embodiment, the projection 7a of the first light guide plate 7 is engaged with the concave part 10b of the chassis 10, and the projection part 5a of the second light guide plate 5 is engaged with the concave part 10a of the chassis 10. Moreover, the nail parts 2c and 2d of the rear cover 2 are engaged with the concave parts 10a and 10b of the chassis 10 respectively. As a result, according to the second exemplary embodiment, the first light guide plate 7 and the second light guide plate 5 are positioned and fixed in vertical and horizontal directions and in a thickness direction. But the present invention is not limited to the configuration.

As shown in FIG. 23A, the first light guide plate 7 applied to the backlight and the liquid crystal display apparatus according to the fourth exemplary embodiment has a pair of whole parts 7b outside the illumination area of the first light guide plate 7. Similarly, as shown in FIG. 23B, the second light guide plate 5 has a pair of whole parts 5b outside the illumination area of the second light guide plate 5. Moreover, as shown in FIG. 24A, the reflection sheet 8 has a pair of whole parts 8b similar to the pairs of whole parts 7b and 5b. According to the exemplary embodiment, as shown in FIG. 24B, the chassis 10 has a pair of columnar projection parts 10c outside the illumination area of the chassis 10. Moreover, according to the exemplary embodiment, as shown in FIG. 24B and FIG. 27, a step part 10z is mounted inside the chassis 10, outside the first light guide plate 7 and inside the second light guide plate 5. Here, the whole part 7b of the first light guide plate 7, the whole part 5b of the second light guide plate 5 and the whole part 8b of the reflection sheet 8 are mounted at positions which are corresponding to position of projection part 10c of the chassis 10. The rear cover 2 has structure equivalent to structures shown in FIGS. 5B, 6A and 6B mentioned above.

Further, with regard to the backlight and the liquid crystal display apparatus according to the exemplary embodiment, the whole part 7b of the first light guide plate 7 corresponds to the first position fixation part according to the present invention, and the whole part 5b of the second light guide plate 5 corresponds to the second position fixation part according to the present invention. Moreover, the projection part 10c of the chassis 10 corresponds to the first engagement part and the second engagement part of the present invention.

That is, as the specific attaching procedure of the light guide plate according to the exemplary embodiment, first, the columnar projection 10c, which is mounted on the chassis 10, is put into the whole part 7b, which is mounted on the first light guide plate 7 and then, marginal part of the first light guide plate 7 comes in contact with the chassis 10. Next, the projection part 10c is put into the whole part 8b which is mounted on the reflection sheet 8 and then, the reflection sheet 8 comes in contact with the first light guide plate 7. Furthermore, the projection part 10c is put into the whole part 5b which is mounted on the second light guide plate 5 and then, marginal part of the first light guide plate 5 comes in contact with the step part 10z of the chassis 10. That is, as shown in FIG. 25A and FIG. 27, the projection part 10c of the chassis 10 is put into and fit to the pair of whole parts 7b of the first light guide plate 7 and the pair of whole part 8b of the reflection sheet 8. As a result, the first light guide plate 7 and the reflection sheet 8 are fixed in vertical and horizontal directions, that is, in surface direction and held to the fixed position. Moreover, as shown in FIG. 25A and FIG. 27, since each projection part 10c of the chassis 10 is put into and fit to the pair of whole part 5b of the second light guide plate 5, the second light guide plate 5 is fixed in vertical and horizontal directions, that is, in surface direction and held to the fixed position. Meanwhile, as shown in FIG. 25B and FIG. 26, the whole parts 7b and 8b are fit to the projection part 10c of the chassis 10, and then, the pick part 2d of the rear cover 2 is engaged with marginal part of the first light guide plate 7 and the reflection sheet 8 which are dropped inside the chassis 10. Therefore, the first light guide plate 7 and the reflection sheet 8 are interposed. As a result, the first light guide plate 7 and the reflection sheet 8 are fixed in thickness direction and held to the fixed position. Moreover, as shown in FIG. 25B and FIG. 27, the whole part 5b is fit to the projection part 10c of the chassis 10, and then, the pick part 2c of the rear cover 2 is engaged with marginal part of the second light guide plate 5 which is dropped inside the chassis 10 so as to come in contact with the step part 10z mounted inside the chassis 10. Therefore, the second light guide plate 5 is interposed and consequently, the second light guide plate 5 is fixed in thickness direction and held to the fixed position. As a result, the first light guide plate 7 and the second light guide plate 5 are held parallel each other via the layer 13 of air.

Figure 28A:
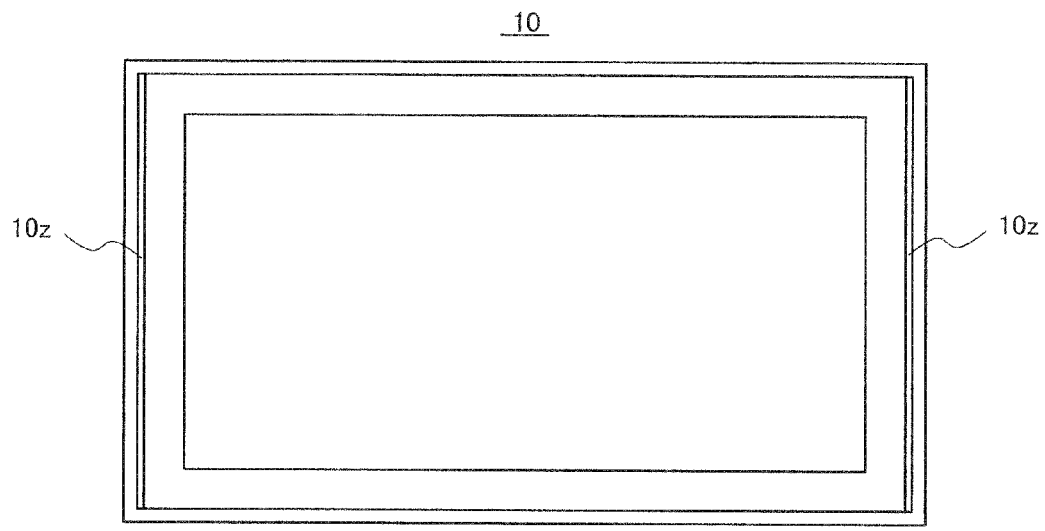
FIG. 28A is a plan view showing a chassis applied to other exemplary configuration of the fourth exemplary embodiment.
Figure 28B:
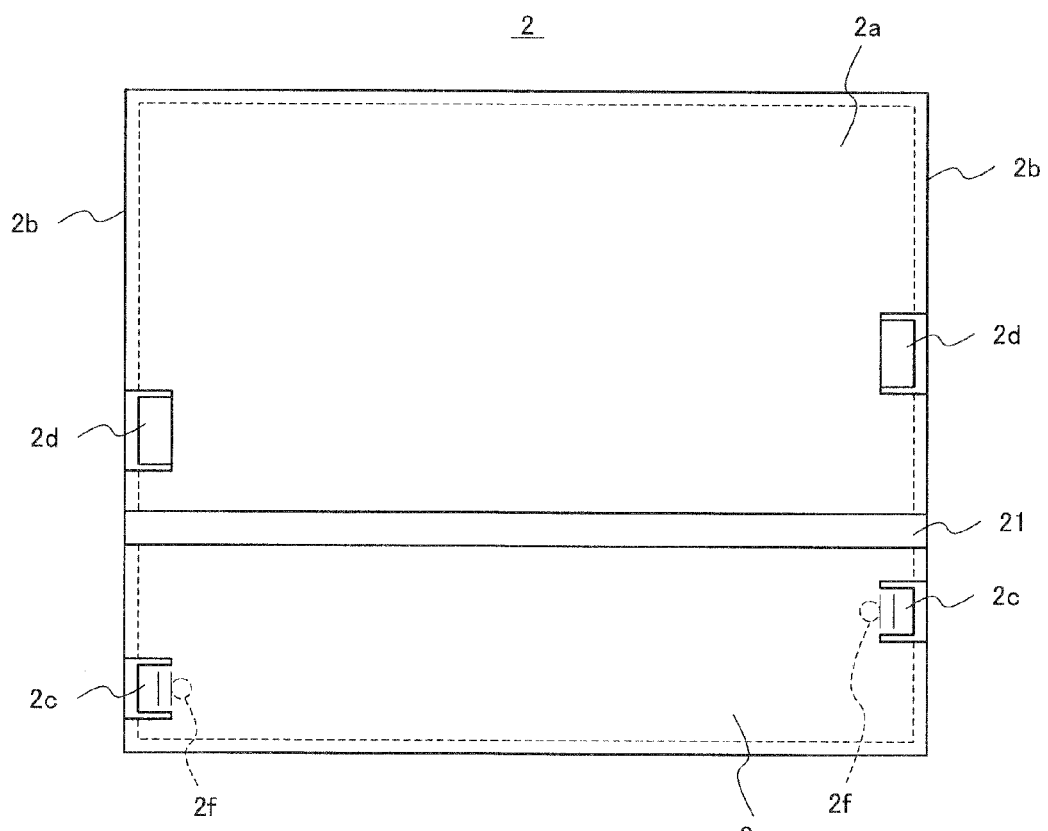
FIG. 28B is a plan view showing a nail part and a projection part of a rear cover applied to other exemplary configuration of the fourth exemplary embodiment.
Figure 29A:
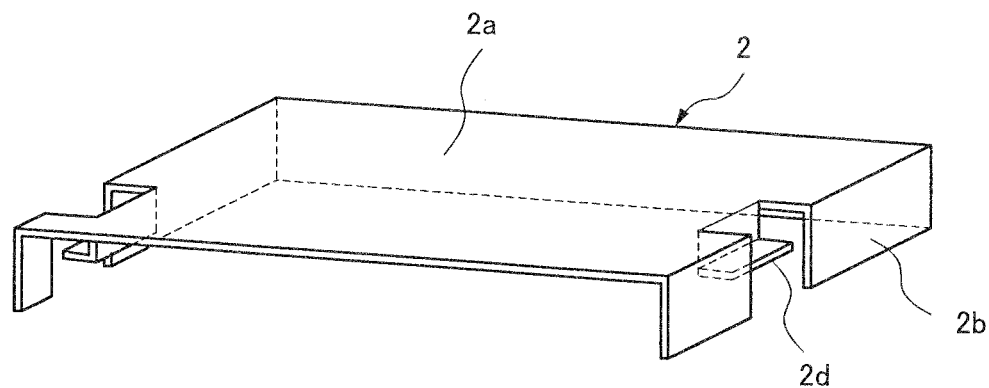
FIG. 29A is a perspective view showing a nail part of a rear cover shown upside in FIG. 28B.
Figure 29B:
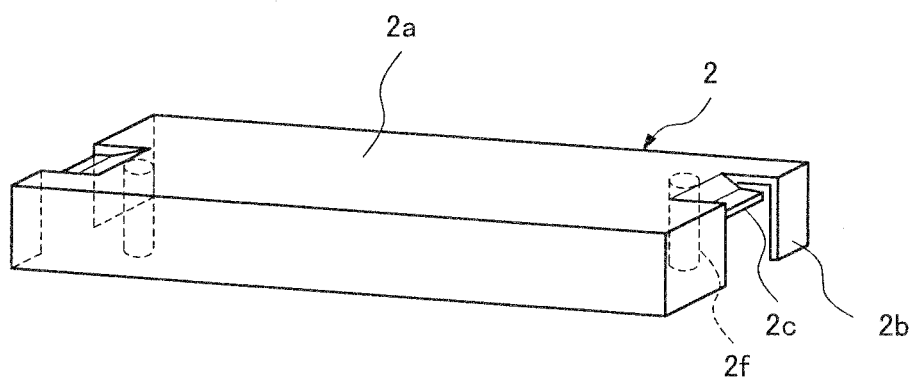
FIG. 29B is a perspective view showing a nail part of a rear cover shown downside in FIG. 28B.
Figure 30:
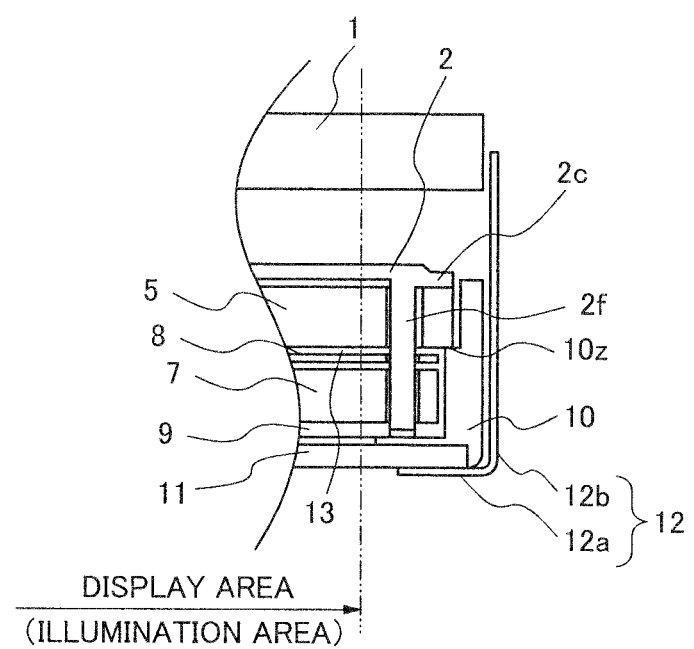
FIG. 30 is a fragmentary cross sectional view showing a cross section, which is parallel to an arrangement direction of the light emitting diodes mounted on the liquid crystal display apparatus, including the hole part of the first light guide plate, the hole part of the second light guide plate and a columnar projection part of a rear cover applied to other exemplary configuration of the fourth exemplary embodiment.

FIG. 28A is a plan view showing a chassis applied to other exemplary configuration of the fourth exemplary embodiment. FIG. 28B is a plan view showing a nail part and a projection part of a rear cover applied to other exemplary configuration. FIG. 29A is a perspective view showing a nail part of a rear cover shown upside in FIG. 28B. FIG. 29B is a perspective view showing a nail part of a rear cover shown downside in FIG. 28B. FIG. 30 is a fragmentary cross sectional view showing a cross section which is parallel to the arrangement direction of the light emitting diodes mounted on the liquid crystal display apparatus including the hole part of the first light guide plate, the hole part of the second light guide plate and a columnar projection part of a rear cover applied to other exemplary configuration. Here, FIG. 30 indicate a cross sectional views of the configuration which includes a columnar projection part at the rear cover 2 instead of the columnar projection part 10c of the chassis 10, in the cross sectional view which is taken along I-I line in the plan view of the liquid crystal display apparatus as shown in FIG. 25B.

It may be preferable that the backlight and the liquid crystal display apparatus according to the exemplary embodiment has configuration in which the rear cover 2 has a columnar projection part as shown in FIG. 29 and FIG. 30, in stead of configuration as shown in FIG. 24 and FIG. 27 mentioned above. According to the configuration, through putting the projection part into the whole parts 7b and 5b which are mounted on the light guide plate 7 and the light guide plate 5, the first light guide plate 7 and the second light guide plate 5 are fixed and held to the fixed position.

Figure 31A:
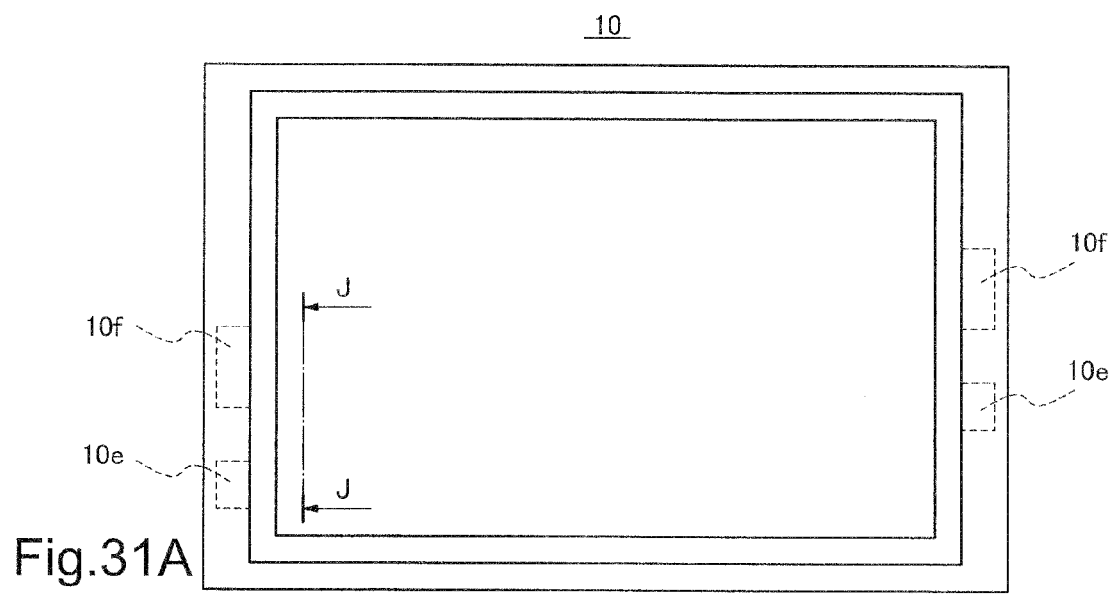
FIG. 31A is a plan view showing a concave part of a chassis applied to the backlight and the liquid crystal display apparatus according to a fifth exemplary embodiment.
Figure 31B:
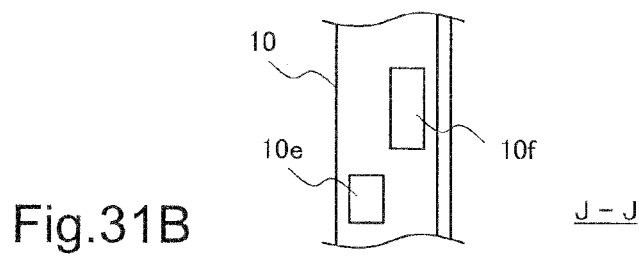
FIG. 31B is a view showing an opening edge of a concave part of a chassis shown in FIG. 31A.

The first light guide plate 7, the second light guide plate 5 and the reflection sheet 8 which are applied to the backlight and the liquid crystal display apparatus according to other exemplary configuration of the exemplary embodiment are equivalent respectively to the first light guide plate 7, the second light guide plate 5 and the reflection sheet 8 shown in FIGS. 25A, 25B and 26A mentioned above. As shown in FIG. 28A and FIG. 30, for example, a step part 10z is mounted inside the chassis 10, outside the first light guide plate 7 and inside the second light guide plate 5. As shown in FIGS. 30B, 31A and 31B, for example, the rear cover 2 has a pick parts 2c and 2d outside the illumination area which is corresponding to the display area of liquid crystal display panel 11. Moreover, the rear cover 2 has a pair of columnar projection parts 2f which projects vertically to the bottom plate 2a from root of the pick part 2c. Here, as shown in FIGS. 30B, 31A, 31B and 32, the projection part 2f is mounted only on one part out of two parts into which the rear cover 2 is divided (that is, one part of the rear cover described in the lower side of FIG. 28B) and which is attached above the second light guide plate 5.

According to the configuration, the columnar projection part 2f, which is mounted on the rear cover 2, is put into the whole parts 7b and 5b, which are mounted on each light guide plate, and the whole part mounted on the reflection sheet 8. As shown in FIG. 26, through engaging the pick part 2d of the rear cover 2 with marginal parts of the first light guide plate 7 and the reflection sheet 8 which are dropped inside the chassis 10, the first light guide plate 7 and the reflection sheet 8 are interposed. Moreover, as shown in FIG. 30, through engaging the pick part 2c of the rear cover 2 with marginal part of the second light guide plate 5 which are is dropped inside the chassis 10 so as to come in contact with the step part 10z which is mounted on inside surface of the chassis 10, the second light guide plate 5 is interposed. Therefore, the first light guide plate 7, the reflection sheet 8 and the second light guide plate 5 are fixed in vertical and horizontal directions, that is, in surface direction and held to the fixed position. Moreover, the first light guide plate 7 and the reflection sheet 8 are fixed in thickness direction in an unified state and held to the fixed position. The second light guide plate 5 is fixed in thickness direction separately from fixation of the first light guide plate 7 and the reflection sheet 8 and held to the fixed position. As a result, the first light guide plate 7 and the second light guide plate 5 are held parallel each other via the layer 13 of air.

Further, the present invention is not limited to the configuration mentioned above. That is, Moreover, according to further other exemplary configuration of the exemplary embodiment, it may be preferable that the reflection sheet 8 is formed to be larger than the first light guide plate 7 and smaller than the second light guide plate 5, and the chassis 10 includes a first step part with which the reflection sheet 8 comes into contact and a second step part with which the second light guide plate 5 comes into contact. As a result, according to the exemplary embodiment, it is possible that the first light guide plate 7, the reflection sheet 8 and the second light guide plate 5 are positioned and fixed respectively in a thickness direction. Moreover, according to the exemplary embodiment, it is also possible that the hole part 5b, the hole part 7b and the projection part 10c are arranged at positions which symmetric about a point with respect to opposed sides respectively, and thereby the first light guide plate 7 and the second light guide plate 5 can be prevented from being arranged inside out, as described in the second exemplary embodiment (refer to FIG. 4 and FIG. 5). Furthermore, according to the exemplary embodiment, it is also possible that the hole part 5b, the hole part 7b and the projection part 10c are arranged at positions which are not symmetric about a point with respect to opposed sides respectively, and thereby the first light guide plate 7 and the second light guide plate 5 can be prevented from being mounted inside out and right-side left, as described in the second exemplary embodiment (refer to FIG. 18 and FIG. 19).

The present invention is not limited to the configuration in which the hole part 7b of the first light guide plate 7, the hole part 5b of the second light guide plate 5, the projection part 10c of the chassis 10 and the nail part 2c of the rear cover 2 are arranged respectively only on two sides opposite to each other like the second embodiment mentioned above. That is, it may be preferable that each part of the above-mentioned hole parts 7b and 5b, the projection parts 10c and the nail part 2c is arranged on three or more sides or at a plurality of positions per one side according to the exemplary embodiment.

Fifth Exemplary Embodiment

Next, a backlight and a liquid crystal display apparatus according to a fifth exemplary embodiment will be described below with reference to FIG. 31 to FIG. 36.

Figure 31C:
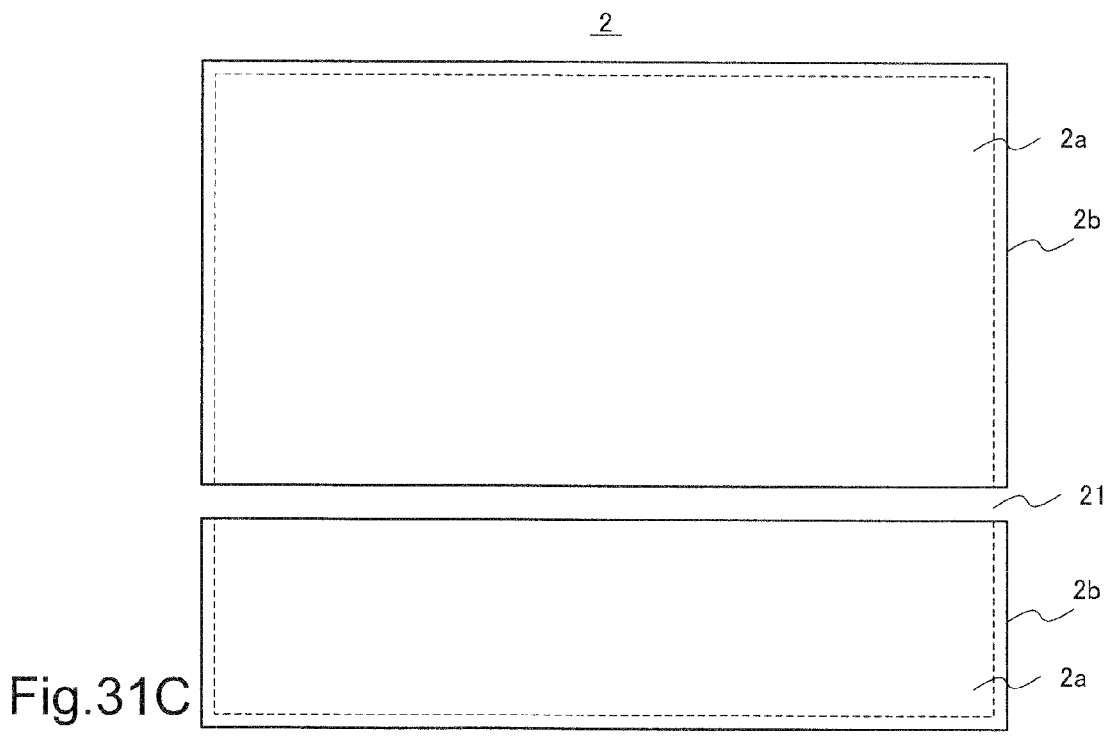
FIG. 31C is a plan view showing a rear cover applied to the backlight and the liquid crystal display apparatus according to the fifth exemplary embodiment.
Figure 32A:
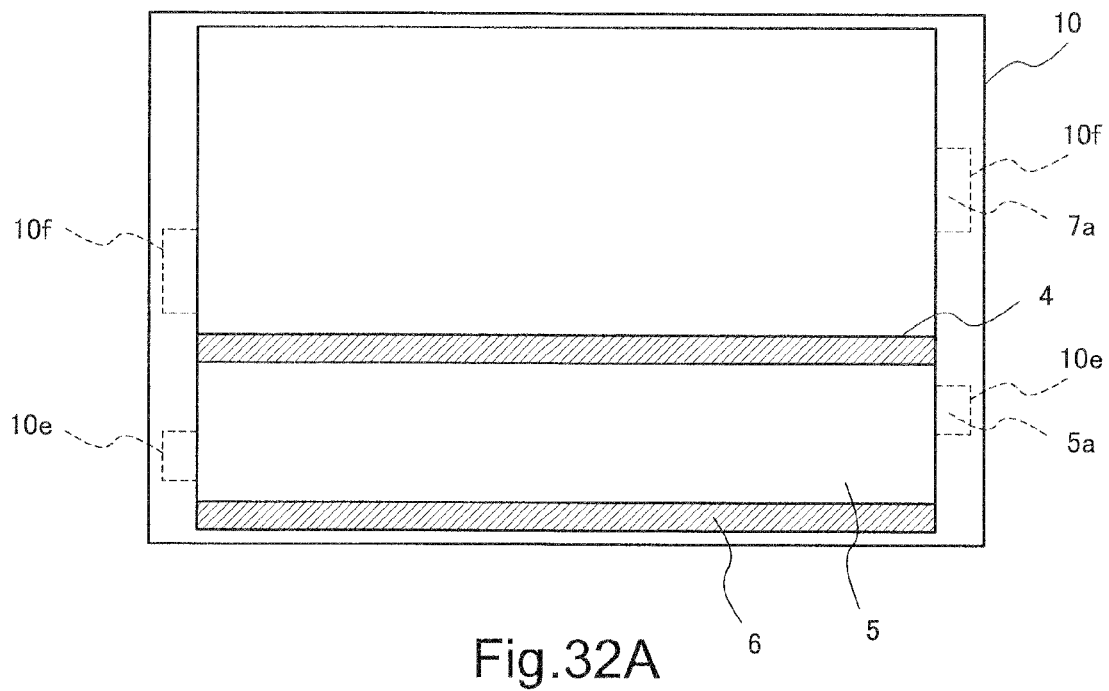
FIG. 32A is a plan view, which is seen from the back side of the liquid crystal display apparatus, showing a state assembled a first light guide plate and a second light guide plate into a chassis applied to the fifth exemplary embodiment.
Figure 32B:
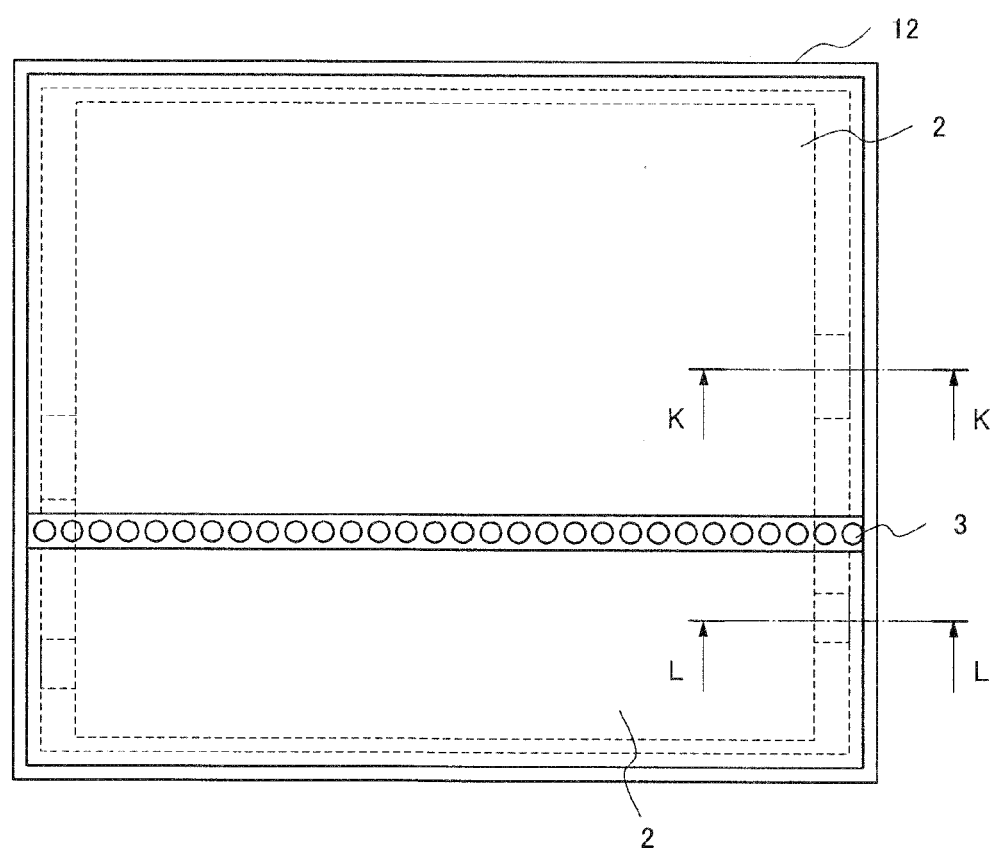
FIG. 32B is a plan view, which is seen from the back side of the liquid crystal display apparatus, showing a state assembled a rear cover, a light source, a liquid crystal display panel and a front cover as well as the state shown in FIG. 32A.
Figure 33A:
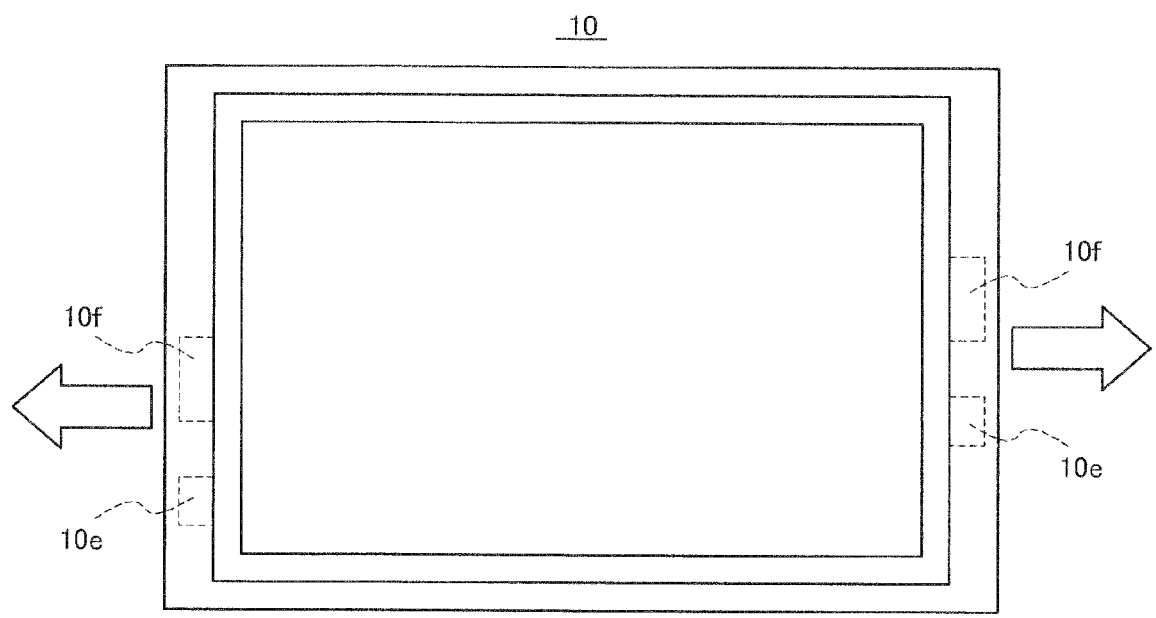
FIG. 33A is a schematic view showing an assembling procedure 1 of a light guide plate applied to the fifth exemplary embodiment.
Figure 33B:
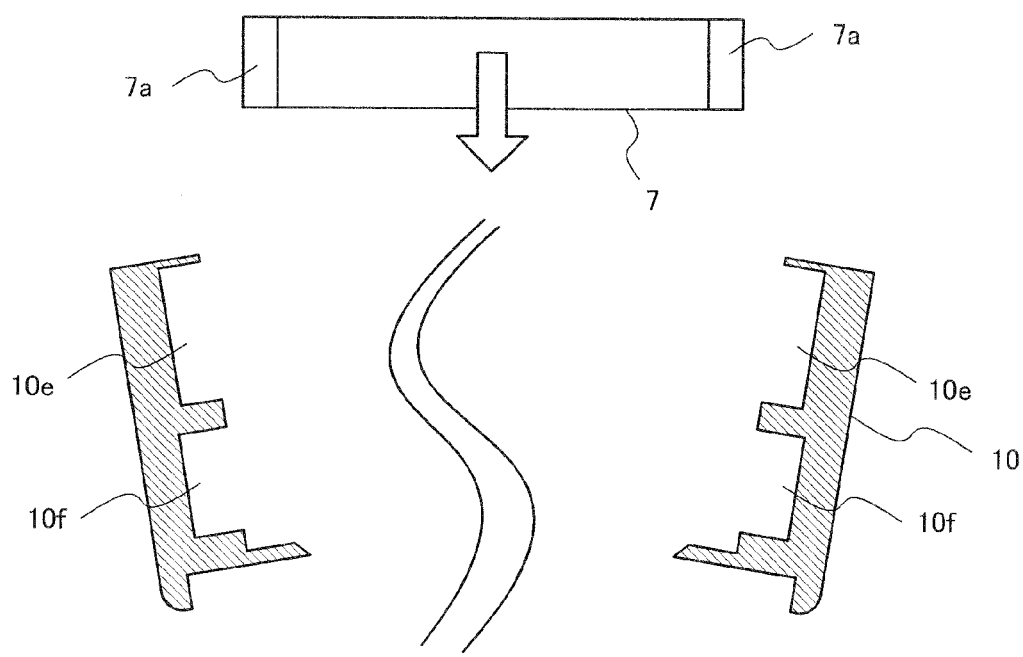
FIG. 33B is a schematic view showing an assembling procedure 2 of the light guide plate applied to the fifth exemplary embodiment.
Figure 34:
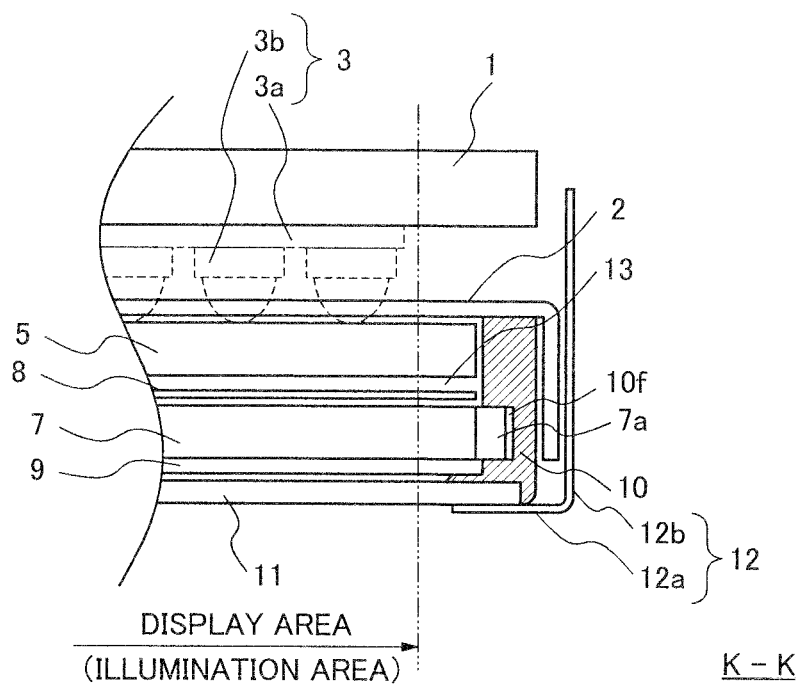
FIG. 34 is a fragmentary cross sectional view showing a cross section, which is parallel to an arrangement direction of the light emitting diodes mounted on the liquid crystal display apparatus, including a projection part of a first light guide plate applied to the fifth exemplary embodiment.
Figure 35:
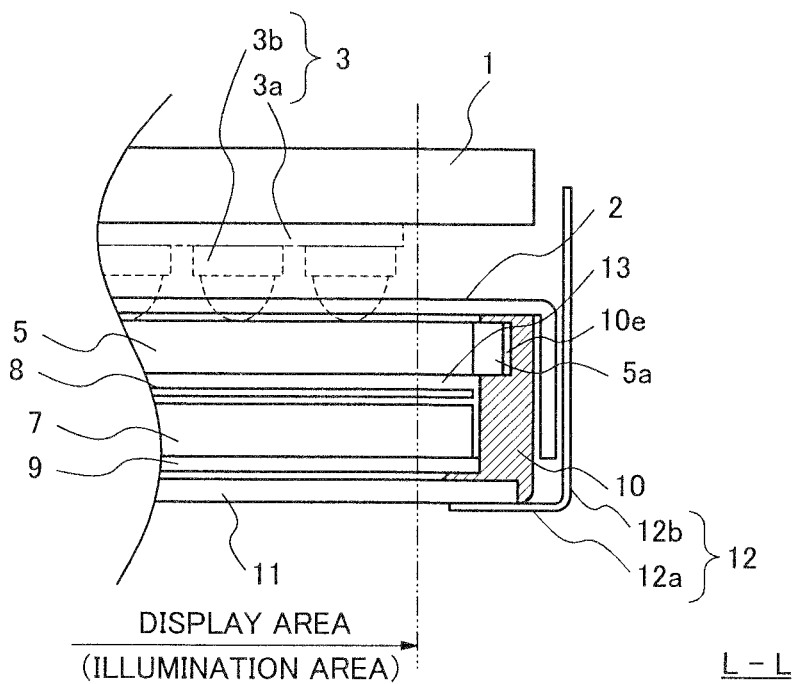
FIG. 35 is a fragmentary cross sectional view showing a cross section, which is parallel to the arrangement direction of the light emitting diodes mounted on the liquid crystal display apparatus, including a projection part of a second light guide plate applied to the fifth exemplary embodiment.
Figure 36A:
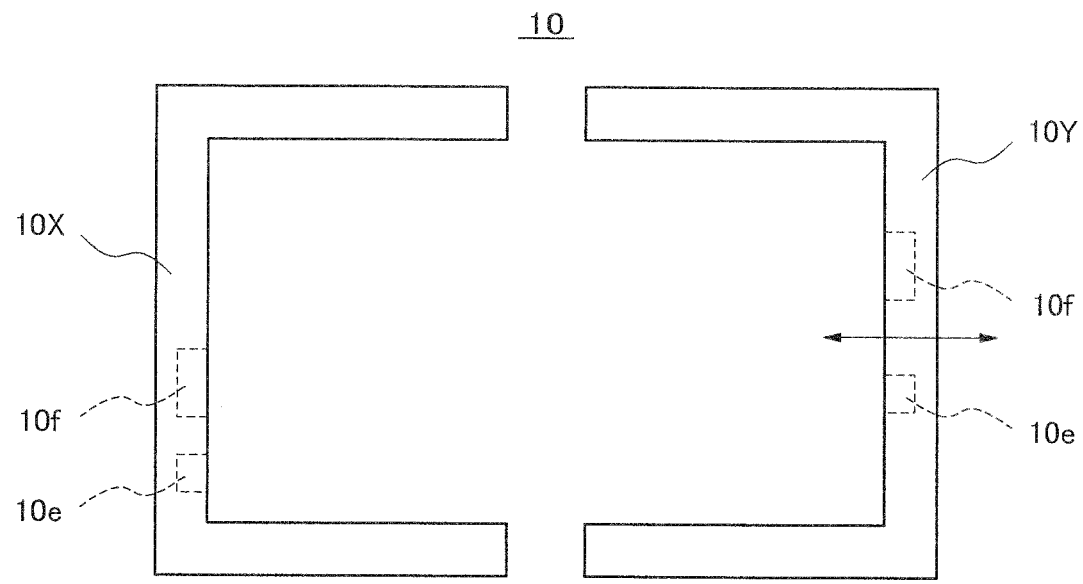
FIG. 36A is a schematic view showing other exemplary configuration of a chassis applied to the fifth exemplary embodiment.
Figure 36B:
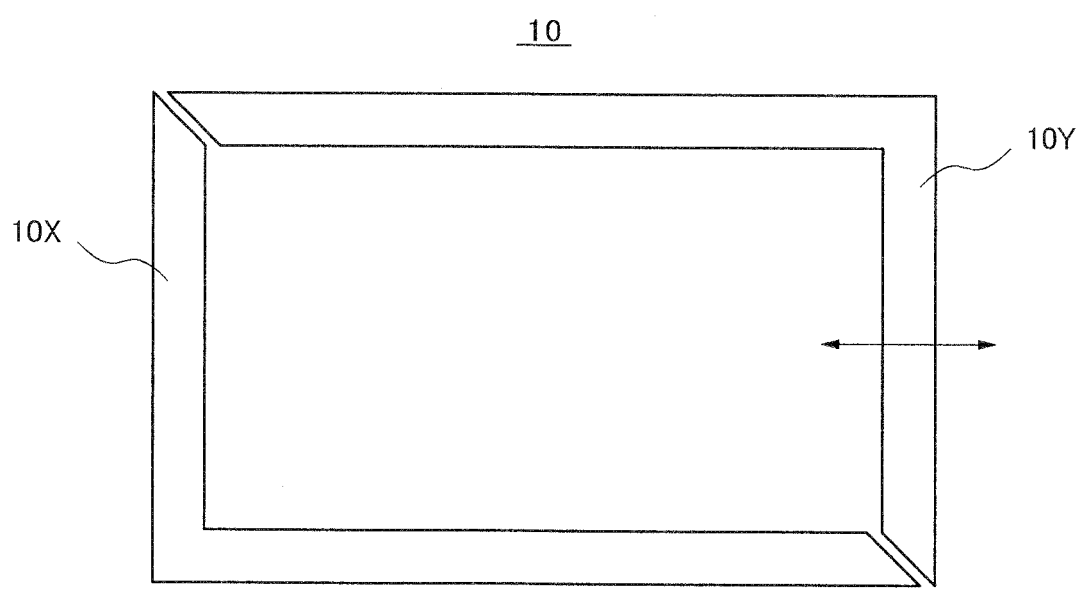
FIG. 36B is a schematic view showing further other exemplary configuration of the chassis applied to the fifth exemplary embodiment.

FIG. 31A is a plan view showing the concave part of the chassis applied to the backlight and the liquid crystal display apparatus according to a fifth exemplary embodiment, and FIG. 31B is a view showing an opening edge of a concave part of a chassis shown in FIG. 31A. Here, FIG. 31B is a view which is taken along J-J line indicated by arrows in the chassis as shown in FIG. 31A. FIG. 31C is a plan view showing a rear cover applied to the backlight and the liquid crystal display apparatus according to the exemplary embodiment. FIG. 32A is a plan view, which is seen from the back side of the liquid crystal display apparatus (that is, right side direction in FIG. 3), showing a state assembled a first light guide plate and a second light guide plate into a chassis for the sake of convenience. FIG. 32B is a plan view, which is seen from the back side of the liquid crystal display apparatus (that is, right side direction in FIG. 3), showing a state assembled a rear cover, a light source, a liquid crystal display panel and a front cover as well as the state shown in FIG. 32A for the sake of convenience. FIG. 33A and FIG. 33B are schematic views showing procedures 1 and 2 respectively for assembling the light guide plate to the chassis. FIG. 34 is a fragmentary cross section view showing a cross section which is parallel to an arrangement direction of the light emitting diodes mounted on the liquid crystal display apparatus, including a projection part of a first light guide plate applied to the exemplary embodiment. Here, FIG. 34 is a cross sectional view which is taken along K-K line in the plan view of the liquid crystal display apparatus as shown in FIG. 32B. FIG. 35 is a fragmentary cross sectional view showing a cross section which is parallel to the arrangement direction of the light emitting diodes arranged on the liquid crystal display apparatus, including a projection part of a second light guide plate applied to the exemplary embodiment. Here, FIG. 35 is a cross sectional view which is taken along L-L line in the plan view of the liquid crystal display apparatus as shown in FIG. 32B. FIG. 36A is a schematic view showing other exemplary configuration of the chassis applied to the exemplary embodiment. FIG. 36B is a schematic view showing further other exemplary configuration of a chassis.

The first light guide plate 7 and the second light guide plate 5 applied to the backlight and the liquid crystal display apparatus according to the fifth exemplary embodiment are equivalent to the configuration shown in FIG. 4A and FIG. 4B mentioned above. As shown in FIG. 31A and FIG. 31B, for example, a chassis 10 includes a pair of concave parts 10f on opposed sides (right side and left side in the figure) at positions corresponding to a projection part 7a of a first light guide plate 7. The chassis 10 includes a pair of concave parts 10e on opposed sides at positions corresponding to a projection part 5a of a second light guide plate 5. Here, the concave parts 10f and 10e are formed like a hole with an opening edge which faces toward an inside of the chassis 10.

As shown in FIG. 32A and FIG. 34, the projection part 7a of the first light guide plate 7 can be put into the concave part 10f from the inside of the chassis 10 and then, each side face of the projection part 7a of the first light guide plate 7 can come into contact with an inner face of the concave part 10f, as well as the above mentioned second exemplary embodiment (refer to FIG. 15). Similarly, as shown in FIG. 32A and FIG. 35, the projection part 5a of the second light guide plate 5 can be put into the concave part 10e from the inside of the chassis 10 and then, each side plane of the projection part 5a of the second light guide plate 5 can come into contact with an inner face of the concave part 10e. Here, as shown in FIG. 34 and FIG. 35, the concave parts 10f and 10e are formed at suitable positions so that the second light guide plate 5 may not come into contact with the first light guide plate 7 when the first light guide plate 7 and the second light guide plate 5 are assembled to the chassis 10. As shown in FIG. 31C, the rear cover 2 does not include a nail part according to above-mentioned embodiments of the present invention. That is, the rear cover 2 includes a bottom plate 2a and a side plate 2b which is extended toward a front part of the liquid crystal display apparatus from three sides of the bottom plate 2a other than a side facing the gap 21.

Based on the above configuration, in a first procedure for assembling the light guide plate, the first light guide plate 7 is assembled to the chassis 10. Here, the chassis 10 is made of an elastic material such as a resin which can be transformed easily. With regard to a specific procedure for assembling the first light guide plate 7 to the chassis 10, as shown in FIG. 33A, an external force is applied to opposed sides (right side and left side in the figure) on which the concave parts 10f and 10e are formed to transform the chassis 10 so as to extend the chassis 10 outward. As a result, the chassis 10 is, as shown in FIG. 33B, transformed so that an edge part (upper side in the figure) of the chassis to which the rear cover 2 is attached may open. In this state, the pair of projection parts 7a which is formed on opposed sides of the first light guide plate 7 is put into each of the concave part 10f from the inside of the chassis 10. Next, a reflection sheet 8 is arranged on the first light guide plate 7. Then, the pair of projection part 5a formed on the opposed sides of the second light guide plate 5 is put into each of the concave part 10e from the inside of the chassis 10 like the above-mentioned assembling procedure of the first light guide plate 7.

Afterward, the chassis 10 returns to an original shape by releasing the above-mentioned external force. As a result, as shown in FIG. 32A and FIG. 34, since the pair of projection parts 7a of the first light guide plate 7 is put into the concave part 10f of the chassis 10 and fitted to the concave part 10f, the first light guide plate 7 is positioned and fixed in vertical and horizontal directions, that is, in a surface direction, and in a thickness direction. Similarly, as shown in FIG. 32A and FIG. 35, since the pair of projection parts Sa of the second light guide plate 5 is put into the concave part 10e of the chassis 10 and fitted to the concave part 10e, the second light guide plate 5 is positioned and fixed in vertical and horizontal directions, that is, in a surface direction, and in a thickness direction. Accordingly, the first light guide plate 7 is held parallel to the second light guide plate 5 via a layer 13 of air. Afterward, as shown in FIG. 32B, the rear cover 2 is assembled to the chassis 10. As a result, the first light guide plate 7 and the second light guide plate 5 are covered and protected.

Further, in the procedure according to the exemplary embodiment, the first light guide plate 7 and the second light guide plate 5 are assembled to the chassis 10 in order, after transforming the chassis 10. But the present invention is not limited to the procedure. That is, even if the external force is applied, the chassis 10 may not transform enough to insert the first light guide plate 7 and the second light guide plate 5 into the chassis 10 in the above mentioned manner, depending on material and structure of the chassis 10. As a specific example, it is possible that the chassis 10 is made of metal or the like. In such case, a configuration in which a divided chassis 10 is employed can be applied according to the exemplary embodiment. With regard to other exemplary configuration according to the exemplary embodiment, when the chassis 10 is divided into two parts at a position on sides (upper side and lower side in the figure) on which the concave parts 10f and 10e are not formed, as shown in FIG. 36A for example, the chassis 10 includes a chassis member 10X and a chassis member 10Y which are independent each other and which are indicated in left side and right side of the figure. Moreover, with regard to further other exemplary configuration according to the exemplary embodiment, when the chassis 10 is divided into two parts at opposed corners (upper left corner and lower right corner in the figure) of a frame member of which the chassis 10 is composed, as shown in FIG. 36B, for example, the chassis 10 includes a chassis member 10X and a chassis member 10Y which are independent each other and which are indicated in lower left side and upper right side of the figure respectively.

According to these exemplary configurations, if each of the chassis members 10X and 10Y slide in a horizontal direction (refer to arrow indicated in the figure), the first light guide plate 7 and the second light guide plate 5 are assembled into the chassis 10. At this time, the projection part 7a of the first light guide plate 7 and the projection part 5a of the second light guide plate 5 are put into the concave parts 10f and the concave part 10e respectively from an inner face of the chassis 10, and are fitted into the concave parts 10f and the concave part 10e respectively. As a result, the first light guide plate 7 and the second light guide plate 5 are positioned and fixed in vertical and horizontal directions, that is, in a surface direction, and in a thickness direction.

Further, when the chassis 10, as shown in FIG. 36A and FIG. 36B, is applied to the liquid crystal display apparatus, the chassis members 10X and 10Y have to be joined together after the first light guide plate 7 and the second light guide plate 5 assembled into the chassis 10. As method in which the chassis members 10X and 10Y are joined together, adhering, welding, fixing by a screw, fitting or the like is applicable.

Moreover, as mentioned above, the present invention is not limited to the configuration in which the projection part 7a of the first light guide plate 7, the projection part 5a of the second light guide plate 5, the concave part 10f of the chassis 10, and the concave part 10e of the chassis 10 are arranged respectively only on opposite sides. That is, it may be preferable that each part of the above-mentioned projection parts 7a and 5a, and the concave parts 10f and 10e is arranged on three or more sides or at a plurality of positions per one side according to the exemplary embodiment. Furthermore, as mentioned above, the present invention is not limited to the configuration in which the pair of projection parts 7a, the pair of projection parts 5a, the pair of concave parts 10f, and the pair of concave parts 10e are arranged respectively at positions which are symmetric about a point with respect to a predetermined central rotation axis (refer to FIG. 4 and FIG. 5). That is, it may be preferable that the pair of projection parts 7a, the pair of projection parts 5a, the pair of concave parts 10f, and the pair of concave parts 10e are arranged respectively at positions which are not symmetric about a point with respect to a predetermined central rotation axis according to the exemplary embodiment.

Sixth Exemplary Embodiment

Next, a backlight and a liquid crystal display apparatus according to a sixth exemplary embodiment will be described in the following with reference to FIG. 37 to FIG. 41.

Figures 37A, 37B:
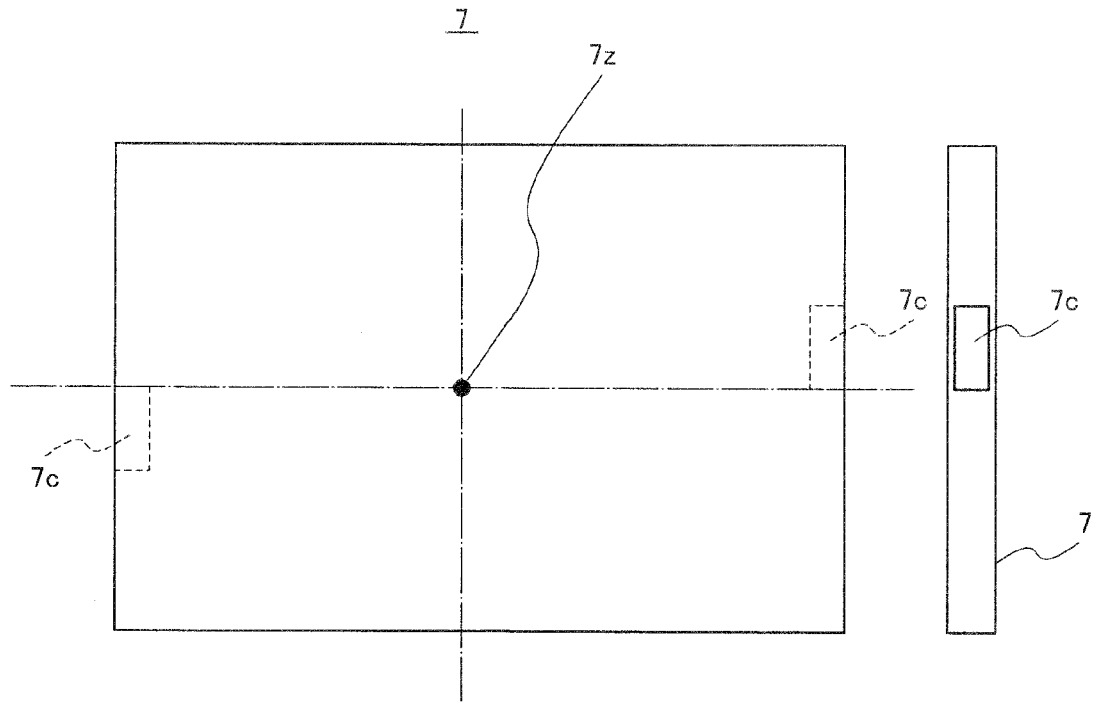
FIG. 37A is a plan view showing a first light guide plate applied to the backlight and the liquid crystal display apparatus according to a sixth exemplary embodiment.
FIG. 37B is a side view showing the first light guide plate shown in FIG. 37A.
Figures 37C, 37D:
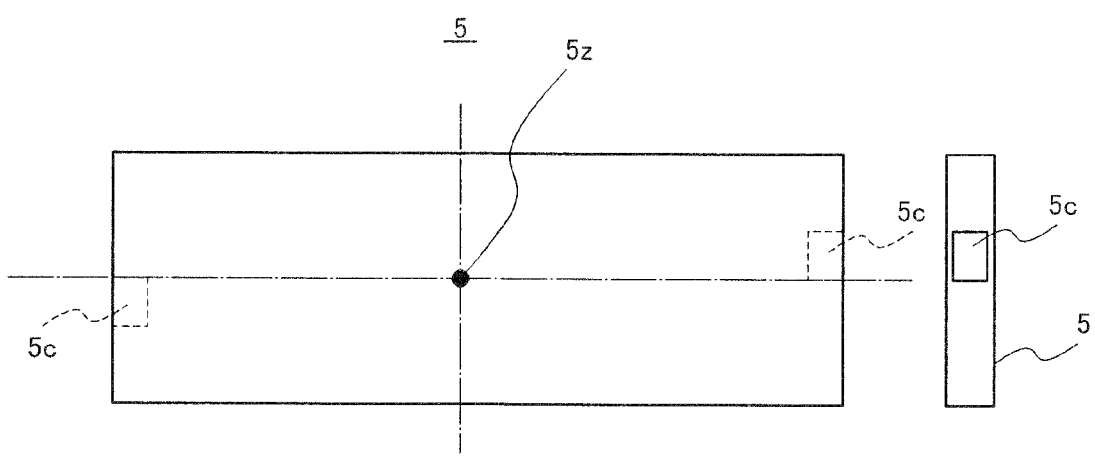
FIG. 37C is a plan view showing a second light guide plate applied to the sixth exemplary embodiment.
FIG. 37D is a side view showing the second light guide plate shown in FIG. 37C.
Figure 38A:
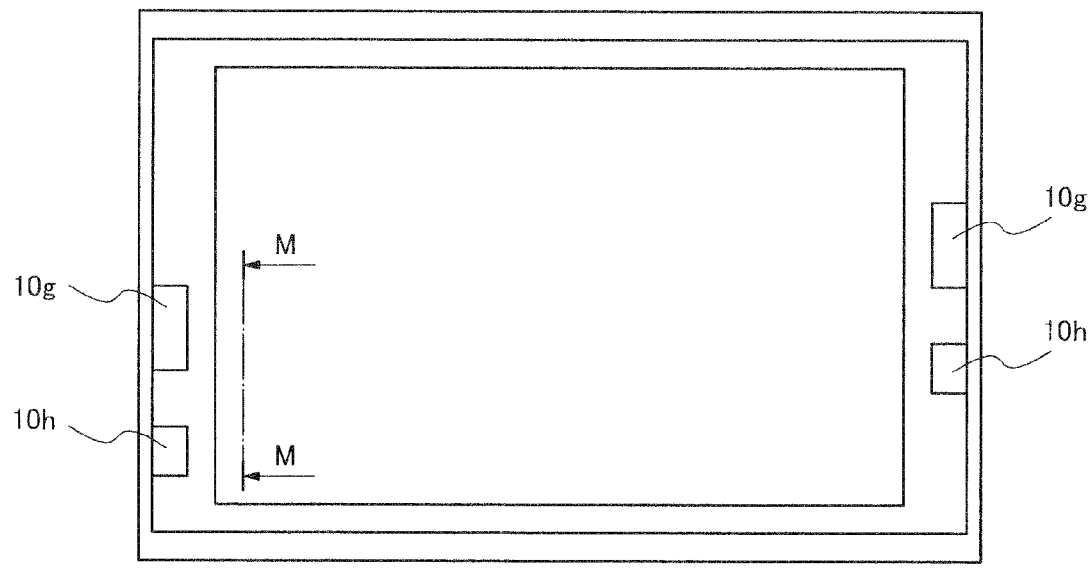
FIG. 38A is a plan view showing a chassis applied to the sixth exemplary embodiment.
Figure 38B:
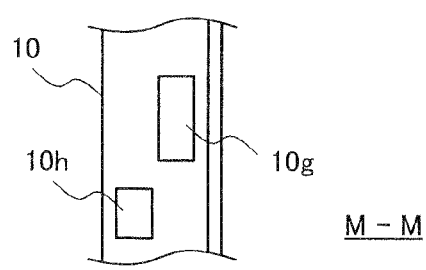
FIG. 38B is a view showing a projection part of a chassis shown in FIG. 38A.
Figure 39A:
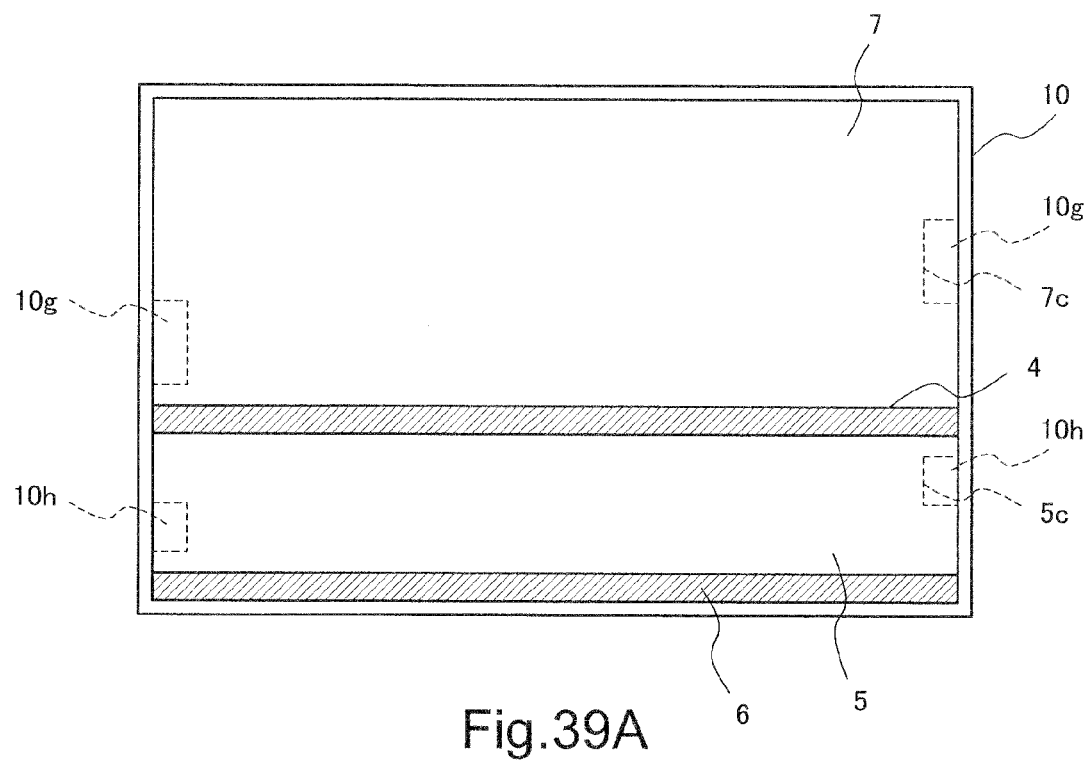
FIG. 39A is a plan view, which is seen from the back side of the liquid crystal display apparatus, showing a state assembled a first light guide plate and a second light guide plate into a chassis applied to the sixth exemplary embodiment.
Figure 39B:
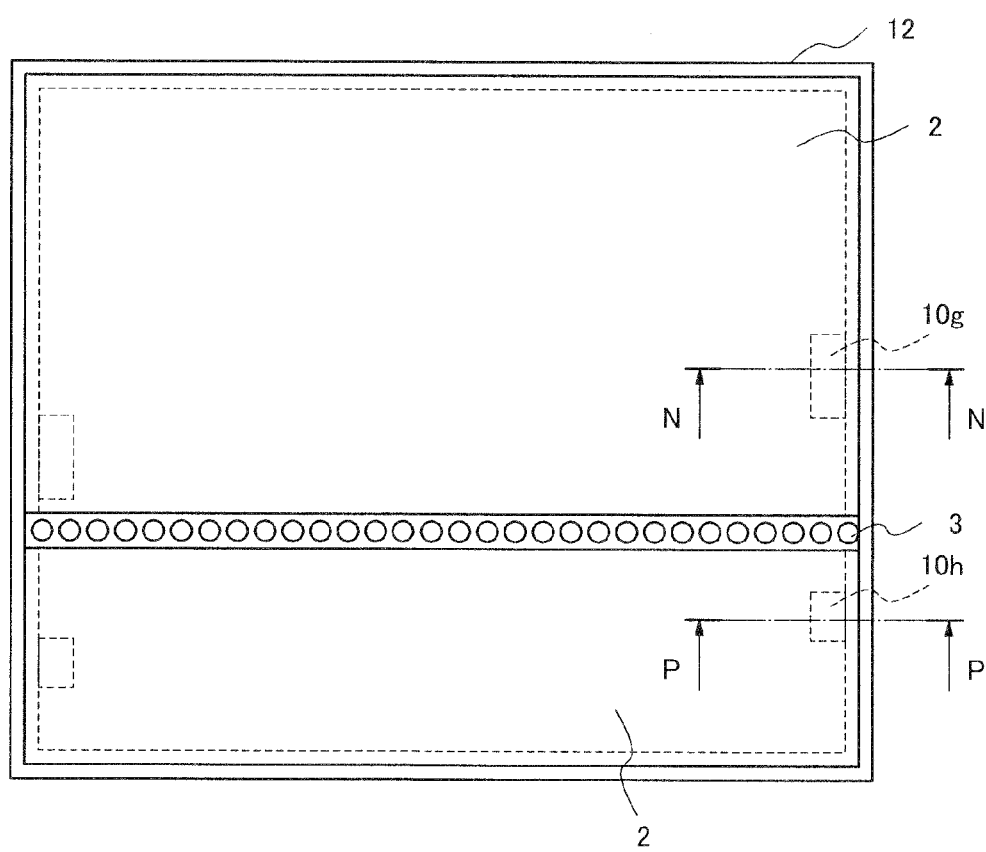
FIG. 39B is a plan view, which is seen from the back side of the liquid crystal display apparatus, showing a state assembled a rear cover, a light source, a liquid crystal display panel and a front cover as well as the state shown in FIG. 39A.
Figure 40:
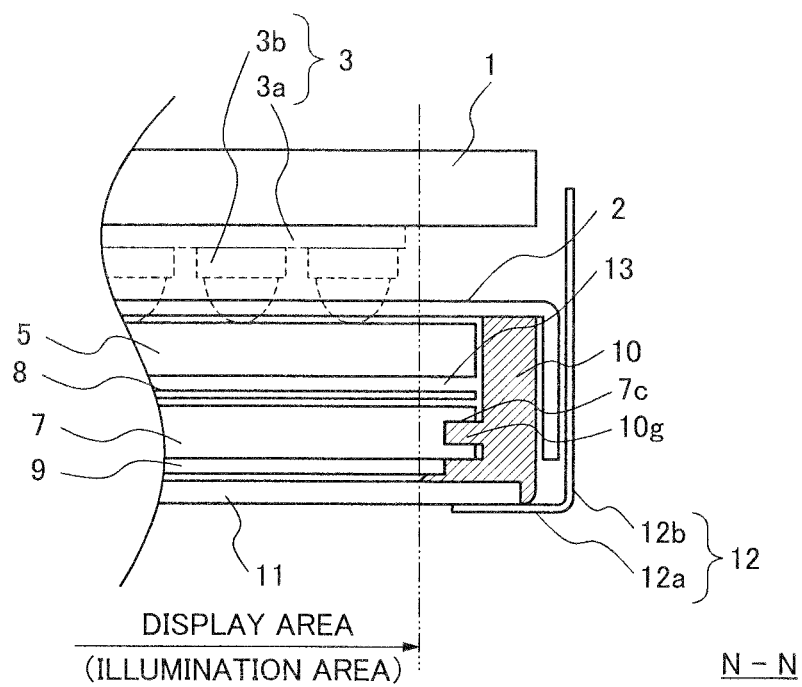
FIG. 40 is a fragmentary cross sectional view showing a cross section, which is parallel to the arrangement direction of the light emitting diodes mounted on the liquid crystal display apparatus, including the concave part of the first light guide plate applied to the sixth exemplary embodiment.
Figure 41:
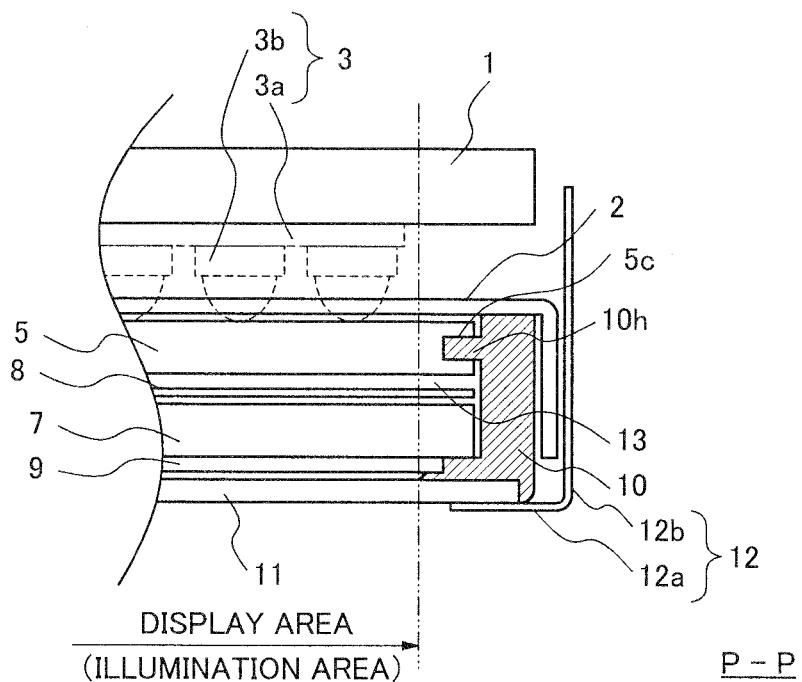
FIG. 41 is a fragmentary cross sectional view showing a cross section, which is parallel to the arrangement direction of the light emitting diodes mounted on the liquid crystal display apparatus, including the concave part of the second light guide plate applied to the sixth exemplary embodiment.
Figure 42:
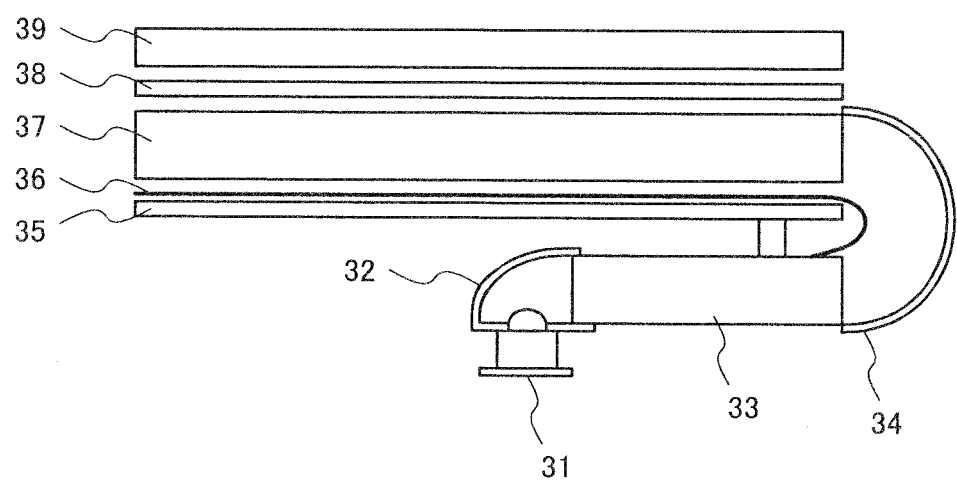
FIG. 42 is a cross sectional view showing a liquid crystal display apparatus described in the document 2.

FIG. 37A is a plan view showing a first light guide plate applied to the backlight and the liquid crystal display apparatus according to a sixth exemplary embodiment. FIG. 37B is a side view showing the first light guide plate of FIG. 37A. FIG. 37C is a plan view showing a second light guide plate applied to the sixth exemplary embodiment. FIG. 37D is a side view showing the second light guide plate of FIG. 37C. FIG. 38A is a plan view showing a chassis applied to the sixth exemplary embodiment. FIG. 38B is a view showing a projection part of a chassis of FIG. 38A. Here, FIG. 38B is a view which is taken along M-M line indicated by arrows in the chassis as shown in FIG. 38A. FIG. 39A is a plan view, which is seen from the back side of the liquid crystal display apparatus (that is, right side direction in FIG. 3), showing a state assembled a first light guide plate and a second light guide plate into a chassis for the sake of convenience. FIG. 39B is a plan view, which is seen from the back side of the liquid crystal display apparatus (that is, right side direction in FIG. 3), showing a state assembled a rear cover, a light source, a liquid crystal display panel and a front cover as well as the state shown in FIG. 39A for the sake of convenience. FIG. 40 is a fragmentary cross section view showing a cross section which is parallel to the arrangement direction of the light emitting diode mounted on the liquid crystal display apparatus including the concave part of the first light guide plate applied to the sixth exemplary embodiment. Here, FIG. 40 is a cross sectional view which is taken along N-N line in the plan view of the liquid crystal display apparatus as shown in FIG. 39B. FIG. 41 is a fragmentary cross sectional view showing a cross section which is parallel to the arrangement direction of the light emitting diode mounted on the liquid crystal display apparatus including the concave part of the second light guide plate applied to the sixth exemplary embodiment. Here, FIG. 41 is a cross sectional view which is taken along P-P line in the plan view of the liquid crystal display apparatus as shown in FIG. 39B.

With regard to the backlight according to the fifth exemplary embodiment mentioned above, when the pair of projection parts 7a of the first light guide plate 7 and the pair of projection parts 5a of the second light guide plate 5 are put into the pair of concave parts 10f and the pair of concave parts 10e respectively, the first light guide plate 7 and the second light guide plate 5 are fixed. The present invention is not limited to the configuration.

According to the backlight and the liquid crystal display apparatus of the sixth embodiment, as shown in FIG. 37A and FIG. 37B, a first light guide plate 7 includes a pair of concave parts 7c on opposed end faces (right side and left side in the figure). Similarly, as shown in FIG. 37C and FIG. 37D, a second light guide plate 5 includes a pair of concave parts 5c on opposed end faces. Here, the concave parts 7c and 5c are formed like a hole with an opening edge on opposed end faces mentioned above. As shown in FIG. 38A and FIG. 38B, a chassis 10 includes a pair of projection parts 10g on opposed sides at positions corresponding to the pair of concave parts 7c of the first light guide plate 7. Moreover, the chassis 10 includes a pair of projection parts 10h on two opposite sides at positions corresponding to the pair of concave parts 5c of the second light guide plate 5. Here, the projection parts 10g and 10h are formed so as to project toward the inside of the chassis 10.

Here, as shown in FIG. 39A and FIG. 40, the concave part 7c of the first light guide plate 7 can be put into by the projection part 10g from the inside of the chassis 10 and then, an inner face of the concave part 7c of the first light guide plate 7 can come into contact with each face of the projection part 10g. Similarly, as shown in FIG. 39A and FIG. 41, the concave part 5c of the second light guide plate 5 can be put into by the projection part 10h from the inside of the chassis 10 and then, an inner face of the concave part 5c of the second light guide plate 5 can come into contact with each face of the projection part 10h. Here, as shown in FIG. 40 and FIG. 41, the concave parts 10g and 10h are formed at suitable positions so that the second light guide plate 5 does not come into contact with the first light guide plate 7, when the first light guide plate 7 and the second light guide plate 5 are assembled to the chassis 10. The rear cover 2 is equivalent to the configuration shown in FIG. 31C mentioned above.

Further, with regard to the backlight and the liquid crystal display apparatus according to the exemplary embodiment, the whole part 7c of the first light guide plate 7 corresponds to the first positioning part according to the present invention, and the whole part 5c of the second light guide plate 5 corresponds to the second positioning part according to the present invention. Moreover, the projection part 10g of the chassis 10 corresponds to the first engaging part and the second engaging part according to the present invention, and the projection part 10h of the chassis 10 corresponds to the first engaging part and the second engaging part according to the present invention.

In such configuration, a procedure for assembling the light guide plate is performed in the state which made chassis 10 transformed, as described in the fifth exemplary embodiment. That is, with regard to a specific procedure for assembling the first light guide plate 7 to the chassis 10, an external force is applied to opposed sides of the chassis 10 on which the concave parts 10g and 10h are formed in order to transform the chassis 10 so as to extend the chassis 10 outward. Then, the pair of concave parts 7a which are formed on opposed sides of the first light guide plate 7 is put into by the projection parts 10g on the inner face of the chassis 10. Next, a reflection sheet 8 is arranged on the first light guide plate 7. Then, the pair of concave part 5c which is formed on opposite sides of the second light guide plate 5 is put into by the projection part 10h from the inside of the chassis 10 like the above-mentioned assembling procedure of the first light guide plate 7.

Afterward, the chassis 10 returns to an original shape by releasing the above-mentioned external force. As a result, as shown in FIG. 39A and FIG. 40, since the pair of concave parts 7c of the first light guide plate 7 is put into by the projection part 10g of the chassis 10 and fitted to the projection part 10g, the first light guide plate 7 is positioned and fixed in vertical and horizontal directions, that is, in a surface direction, and in a thickness direction. Similarly, as shown in FIG. 39A and FIG. 41, since the pair of concave parts 5c of the second light guide plate 5 is put into by the projection part 10h of the chassis 10 and fitted to the projection part 10h, the second light guide plate 7 is positioned and fixed in vertical and horizontal directions, that is, in the surface direction, and in the thickness direction. Accordingly, the first light guide plate 7 is held parallel to the second light guide plate 5 via a layer of air. Afterward, as shown in FIG. 39B, the rear cover 2 is assembled to the chassis 10. As a result, the first light guide plate 7 and the second light guide plate 5 are covered and protected.

When the chassis 10 can not be sufficiently transformed due to material quality and structure of the chassis 10 even if the external force is applied, like the fifth embodiment mentioned above, a configuration in which the chassis 10 is divided, as shown in FIG. 36A and FIG. 36B, is applicable in the exemplary embodiment.

Moreover, similarly as mentioned above, the present invention is not limited to the configuration in which the concave part 7c of the first light guide plate 7, the concave part 5c of the second light guide plate 5, the projection part 10g of the chassis 10, and the projection part 10h of the chassis 10 are arranged respectively only on opposed sides. That is, it may be preferable that each part of the above-mentioned concave parts 7c, 5c and the projection parts 10g, 10h is arranged on three or more sides or at a plurality of positions per one side according to the exemplary embodiment. Furthermore, as mentioned above, as shown in FIG. 37A and FIG. 37B, the present invention is not limited to the configuration in which the pair of concave parts 7c, the pair of projection parts 10g, the pair of concave parts 5c and the pair of projection parts 10h are arranged respectively at positions which are symmetric about a point with respect to a predetermined central rotation axes 7z and 5z. It may be preferable that the pair of concave parts 7c, the pair of projection parts 10g, the pair of concave parts 5c and the pair of projection parts 10h are arranged respectively at positions which are not symmetric about a point.

Further, according to above-mentioned embodiments of the present invention, a red diode, a green diode and a blue diode are applied to the light emitting diode 3b as the light source 3. But a white diode may be used as the light emitting diode 3b of the light source 3. The projection parts 5a, 7a and 8a, the concave parts 10a, 10b and 10d, the nail parts 2c, 2d and 2e and the concave parts 10e and 10f according to the second exemplary embodiment are just examples. The projection parts 5a and 7a, the concave parts 10a and 10b, and the stationary parts 25 and 26 according to the third exemplary embodiment, and the hole parts 5b and 7b and the projection part 10c according to the forth exemplary embodiment are also examples. The projection parts 5a and 7a, the concave parts 10e and 10f, the chassis members 10X and 10Y according to the fifth exemplary embodiment, and the concave parts 5c and 7c and the projection parts 10g and 10h according to the sixth exemplary embodiment are also examples.

The present invention is not limited to the above-mentioned embodiments, and it is possible to modify a shape, a position, a structure or the like of the first light guide plate and the second light guide plate properly as far as it is possible to position and fix the first light guide plate and the second light guide plate.

The present invention is applicable to the backlight, the liquid crystal display apparatus having the backlight, and any equipment having the liquid crystal display apparatus.

Further, other embodiments of the present invention about the backlight and the liquid crystal display apparatus having the backlight will be described below. Each exemplary embodiment has the same function and effect as each exemplary embodiment mentioned above has.

A backlight according to a seventh exemplary embodiment includes a first light guide plate which emits light, which is inputted from at least one end surface, from one main surface, a second light guide plate which includes an end surface for inputting light and an end surface for emitting light, and which is mounted on rear side of the first light guide plate, a plurality of point light sources mounted near the end surface for inputting light of the second light guide plate, a reflection sheet mounted between the first light guide plate and the second light guide plate, a radiation member to which the point light source is fixed, a chassis which stores the first light guide plate, the second light guide plate and the reflection sheet, and a rear cover which is fixed to the radiation member and interposes the first light guide plate, the second light guide plate and the reflection sheet with the chassis. The first light guide plate and the second light guide plate are fixed separately in thickness direction and held to the fixed positions.

A backlight according to an eighth exemplary embodiment includes a first light guide plate which emits light, which is inputted from at least one end surface, from one main surface, a second light guide plate which includes an end surface for inputting light and an end surface for emitting light, and which is mounted on rear side of the first light guide plate, a plurality of point light sources mounted near the end surface for inputting light of the second light guide plate, a reflection sheet mounted between the first light guide plate and the second light guide plate, a radiation member to which the point light source is fixed, a chassis which stores the first light guide plate, the second light guide plate and the reflection sheet, and a rear cover which is fixed to the radiation member and interposes the first light guide plate, the second light guide plate and the reflection sheet with the chassis. The first light guide plate, the second light guide plate and the reflection sheet are fixed separately in thickness direction and held to the fixed positions.

A backlight according to a ninth exemplary embodiment includes a first light guide plate which emits light, which is inputted from at least one end surface, from one main surface, a second light guide plate which includes an end surface for inputting light and an end surface for emitting light, and which is mounted on rear side of the first light guide plate, a plurality of point light sources mounted near the end surface for inputting light of the second light guide plate, a reflection sheet mounted between the first light guide plate and the second light guide plate, a radiation member to which the point light source is fixed, a chassis which stores the first light guide plate, the second light guide plate and the reflection sheet, and a rear cover which is fixed to the radiation member and interposes the first light guide plate, the second light guide plate and the reflection sheet with the chassis. The first light guide plate and the reflection sheet are fixed in thickness direction in an unified state and held to the fixed positions, and the second light guide plate is fixed in thickness direction separately and held to the fixed position.

With regard to the backlight according to any one of the seventh to the ninth embodiments of the present invention mentioned above, a layer of air exists between the second light guide plate and the reflection sheet within the illumination area.

The backlight according to any one of the seventh to the ninth embodiments of the present invention mentioned above may have following configuration. The backlight has configuration in which the projection part mounted on the first light guide plate, the second light guide plate and the reflection sheet outside the illumination area of the first light guide plate, the second light guide plate and the reflection sheet is fit to the concave part of the chassis, which is opposite to the projection part. As a result, the first light guide plate, the second light guide plate and the reflection sheet are fixed in thickness direction and held to the fixed positions.

The backlight according to any one of the seventh to the ninth embodiments of the present invention mentioned above may have following configuration. The backlight has configuration in which the concave part mounted on the first light guide plate, the second light guide plate and the reflection sheet outside the illumination area of the first light guide plate, the second light guide plate and the reflection sheet is fit to the projection part of the chassis, which is opposite to the concave part. As a result, the first light guide plate, the second light guide plate and the reflection sheet are fixed in thickness direction and held to the fixed positions.

A backlight according to a tenth exemplary embodiment includes a first light guide plate which emits a light inputted from at least one end face from one main face, a second light guide plate which includes an end face for receiving a light and an end face for emitting a light and which is arranged behind the first light guide plate, a plurality of point light sources arranged near the end face for receiving a light of the second light guide plate, a reflection sheet arranged between the first light guide plate and the second light guide plate, a radiation member to which the plurality of point light sources are mounted, a chassis which houses the first light guide plate, the second light guide plate and the reflection sheet and a rear cover which is fixed to the radiation member and fixes the first light guide plate, the second light guide plate and the reflection sheet with the chassis. The first light guide plate includes one or more first projection parts. The second light guide plate includes one or more second projection parts each of which is arranged at a position different from that of the first projection parts. The chassis includes a first concave part at a position facing the first projection part, and includes a second concave part at a position facing the second projection part. The rear cover includes a first nail part at a position facing the first concave part, and a second nail part at a position facing the second concave part. When the first concave part, the first projection part and the first nail part are engaged together, the first light guide plate is positioned and fixed in a thickness direction. When the second concave part, the second projection part and the second nail part are engaged together, the second light guide plate is positioned and fixed in a thickness direction.

A backlight according to a eleventh exemplary embodiment includes a first light guide plate which emits a light inputted from at least one end face from one main face, a second light guide plate which includes an end face for receiving a light and an end face for emitting a light, and which is arranged behind the first light guide plate, a plurality of point light sources mounted near the end face for receiving a light of the second light guide plate, a reflection sheet arranged between the first light guide plate and the second light guide plate, a radiation member to which the plurality of point light sources are fixed, a chassis which houses the first light guide plate, the second light guide plate and the reflection sheet, and a rear cover which is fixed to the radiation member and fixes the first light guide plate, the second light guide plate and the reflection sheet with the chassis. The first light guide plate includes one or more first projection parts. The second light guide plate includes one or more second projection parts each of which is arranged at a position different from that of the first projection part. The chassis includes a first concave part at position facing the first projection part, and a second concave part at a position facing the second projection part. A first nail part is fixed to the radiation member at a position facing the first concave part and a second nail part is fixed to the radiation member at a position facing the second concave part. When the first concave part, the first projection part and the first nail part are engaged together, the first light guide plate is positioned and fixed in a thickness direction. When the second concave part, the second projection part and the second nail part are engaged together, the second light guide plate is positioned and fixed in a thickness direction.

With regard to the backlight according to above mentioned tenth and eleventh embodiments of the present invention, the reflection sheet includes one or more third projection parts respectively at a position corresponding to the first projection part. When the first concave part, the first projection part, the third projection part and the first nail part are engaged together, the first light guide plate and the reflection sheet are integrally positioned and fixed in a thickness direction.

The backlight according to above mentioned tenth and eleventh embodiments of the present invention may include a following configuration. The reflection sheet includes one or more third projection parts at positions different from positions of the first projection part and the second projection part. The chassis includes a third concave part at a position facing the third projection part. The rear cover or the radiation member includes a third nail part at a position facing the third concave part. When the third concave part, the third projection part and the third nail part are engaged, the reflection sheet is positioned and fixed in a thickness direction, independently of the first light guide plate and the second light guide plate.

The backlight according to above mentioned tenth and eleventh embodiments of the present invention may include a following configuration. The first concave part, the first projection part, the first nail part, the second concave part, the second projection part and the second nail part are respectively arranged at positions which are symmetric about a point or at positions which are not symmetric about a point with respect to two sides orthogonal to an arrangement direction of the point light source.

With regard to the backlight according to above mentioned tenth and eleventh embodiments of the present invention, it is preferable that the first and second projection parts are formed outside an illumination area, or the first, second and third projection parts are formed outside the illumination area.

A backlight according to a twelfth exemplary embodiment includes a first light guide plate which emits a light inputted from at least one end face from one main face, a second light guide plate which includes an end face for receiving a light and an end face for emitting a light, and which is arranged behind the first light guide plate, a plurality of point light sources arranged near the end face for receiving a light of the second light guide plate, a reflection sheet arranged between the first light guide plate and the second light guide plate, a radiation member to which the plurality of point light sources are fixed, a chassis which houses the first light guide plate, the second light guide plate and the reflection sheet, and a rear cover which is fixed to the radiation member and fixes the first light guide plate, the second light guide plate and the reflection sheet with the chassis. The second light guide plate includes a larger profile size than those of the first light guide plate and the reflection sheet. The chassis includes a step part which only the second light guide plate touches at edge area thereof and includes one or more projection parts. The first light guide plate includes a first hole part at a position facing the projection part, and the second light guide plate includes a second hole part at a position facing the projection part. Then, when the second light guide plate comes into contact with the step part, the first light guide plate and the second light guide plate are; positioned and fixed respectively in a thickness direction. Moreover, when the projection part, the first hole part and the second hole part are engaged together, the first light guide plate and the second light guide plate are positioned and fixed respectively in a surface direction.

With regard to the backlight according to the twelfth exemplary embodiment, the projection part, the first hole part and the second hole part are arranged at positions which are symmetric about a point or at positions which are not symmetric about appoint with respect to two sides orthogonal to the arrangement direction of the point light source.

Moreover, with regard to the backlight according to the twelfth exemplary embodiment, it is preferable that the first hole part and the second hole part are arranged outside an illumination area.

Furthermore, the backlight according to any one of the tenth to the twelfth above-mentioned embodiments may include a following configuration. It is preferable that the point light source is a light emitting diode. The light emitting diode includes several of kinds of light emitting diodes each of which emits a single color light, at least including red, green and a blue light, and the second light guide plate mixes lights having a plurality of colors which are emitted by the several kinds of light emitting diodes.

A liquid crystal display apparatus according to a thirteenth exemplary embodiment includes a liquid crystal display panel and a backlight for illuminating the liquid crystal display panel. The liquid crystal display apparatus employs the backlight according to any one of the seventh to the twelfth embodiments of the present invention.

As described above, the backlight and the liquid crystal display apparatus according to the seventh to the thirteenth embodiments of the present invention can improve accuracy in positioning the point light source and a light path since the first light guide plate and the second light guide plate are positioned and fixed respectively in a thickness direction by the chassis and the rear cover.

Moreover, the backlight and the liquid crystal display apparatus according to the seventh to the thirteenth embodiments of the present invention can obtain a similar effect mentioned above since the first light guide plate, the second light guide plate and the reflection sheet are positioned and fixed respectively in a thickness direction by the chassis and the rear cover.

Furthermore, the backlight and the liquid crystal display apparatus according to the seventh to the thirteenth embodiments of the present invention can obtain a similar effect mentioned above since the first light guide plate and the reflection sheet are integrally positioned and fixed in a thickness direction by the chassis and the rear cover and the second light guide plate is individually positioned and fixed.

That is, the present invention solves a following problem.

The document 1 mentioned above discloses that a white light fluorescence tube is applied to backlight source. Moreover, the document 1 discloses that such the light source is arranged at a position adjacent to an end face which is a light receiving part of a light guide plate. A configuration for fixing the light guide plate described in the document 1 includes a pair of projections, which projects outward on both sides of the light guide plate. Moreover, the configuration for fixing the light guide plate includes a concave part at position corresponding to above mentioned pair of projections on a chassis which is arranged behind the light guide plate. According to the configuration, when the projections of the light guide plate are fitted into the concave part of the chassis, the light guide plate is positioned in a vertical direction and in a horizontal direction. Moreover according to the configuration, since the projection of the light guide plate is sandwiched by the concave part of the chassis, and an optical sheet and a liquid crystal display panel which are arranged in a front side of the light guide plate, the light guide plate is positioned and fixed in a thickness direction.

Meanwhile, as disclosed in the document 2 mentioned above, a backlight which includes a light source which is employed recently in order to generate an image having high quality, a first light guide plate and a second light guide plate, is well known. Here, the light source includes separately a plurality of point light sources such as light emitting diode which emits single color light of R, G and B. However, in such backlight, the second light guide plate is required to be positioned and fixed. Such requirement is unnecessary for other type of a backlight. Therefore, the document 2 discloses a configuration in which a reflection sheet 36 is bent so that a mixed light does not leaks out from a gap between a second light guide plate 33 and a aluminum plate 35, and the reflection sheet 36 is fixed. However, the configuration does not include mechanism to hold the second light guide plate 33 and a first light guide plate 37 at a constant distance. Therefore, in the configuration, a distance between the second light guide plate 33 and the first light guide plate 37 tends to fluctuate. Therefore, homogeneity in brightness and color of an illumination surface per each product and homogeneity in brightness and color within the illumination surface of a product deteriorate.

An exemplary advantage according to embodiment the present invention is to improve accuracy in positioning the light source, the first light guide plate, the second light guide plate and the reflection sheet, and can reduce unevenness of brightness and color of an illumination surface per each product and unevenness of brightness and color within the illumination surface of a product. As a result, the backlight and the liquid crystal display apparatus according to the embodiments of the present invention include an effect to improve display quality, since both the rear cover fixed to the radiation member (that is, heat sink) to which the point light source is fixed and the chassis which houses the first light guide plate, the second light guide plate and the reflection sheet can position and fix the first light guide plate, the second light guide plate and the reflection sheet respectively.

Another exemplary advantage according to the present invention is to prevent materials from getting damaged, since stress due to impact and vibration is not applied to an optical material except the chassis and the rear cover from the first light guide plate and the second light guide plate.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. A backlight, comprising:
    a first light guide plate which emits a light inputted from an end face thereof from a main surface thereof;
    a second light guide plate which includes an end face for an incoming light and an end face for an emitting light, and which is arranged behind said first light guide plate;
    a light source which is arranged near said end face for an incoming light of said second light guide plate;
    a reflection sheet which is arranged between said first light guide plate and said second light guide plate;
    a chassis which houses said first light guide plate, said second light guide plate and said reflection sheet;
    a rear cover which fixes said first light guide plate, said second light guide plate and said reflection sheet with said chassis, wherein
    said first light guide plate and said second light guide plate are positioned in a thickness direction thereof,
    wherein the first light guide plate and the second light guide plate are sandwiched by the chassis and the rear cover at respective positions thereof; and
    a reflector optically connecting i) the end face for the emitting light of the second light guide to ii) the inputted light end face of the first light guide,
    wherein a layer of air exists between said first light guide plate and said second light guide plate, and
    wherein said first light guide plate includes one or more first projection parts, wherein said second light guide plate includes one or more second projection parts at a position which is different from a position of said first projection part, and wherein said chassis includes a first concave part at a position facing said first projection part and includes a second concave part at a position facing said second projection part.

2. The backlight according to claim 1, wherein said chassis includes a first engaging part at a position facing said first positioning part and includes a second engaging part at a position facing said second positioning part.

3. The backlight according to claim 1, wherein said second light guide plate includes one or more second concave parts at a position which is different from a position of said first concave part, and wherein said chassis includes a first projection part at a position facing said first concave part and includes a second projection part facing said second projection part.

4. The backlight according to claim 1, wherein said first light guide plate includes one or more first hole parts, wherein said second light guide plate includes one or more second hole parts, and wherein said chassis includes one or more projection parts at a position facing said first hole part and said second hole part.

5. The backlight according to claim 1, wherein said first light guide plate includes one or more first hole parts, wherein said second light guide plate includes one or more second hole parts, and wherein said rear cover includes one or more projection parts facing said first hole part and said second hole part.

6. The backlight according to claim 2, wherein said first positioning part and said second positioning part are arranged outside an illumination area.

7. The backlight according to claim 6, wherein said first positioning part is arranged on two opposed sides of said first light guide plate, and said second positioning part is arranged on two opposed sides of said second light guide plate.

8. The backlight according to claim 6, wherein said first positioning part is arranged at positions which are symmetric with respect to a point on said first light guide plate, and said second positioning part is arranged at positions which are symmetric with respect to a point on said second light guide plate.

9. The backlight according to claim 7, wherein said first positioning part is arranged at positions which are not symmetric with respect to a point on said first light guide plate, and said second positioning part is arranged at positions which are not symmetric with respect to a point on said second light guide plate.

10. The backlight according to claim 1, wherein said light source includes a plurality of point light sources.

11. The backlight according to claim 10, wherein said plurality of point light sources include at least a LED (Light Emitting Diode) emitting a red light, a LED emitting a green light and a LED emitting a blue light, and wherein said second light guide plate mixes a plurality of lights emitted by said plurality of LEDs.

12. A liquid crystal display apparatus, comprising a liquid crystal display panel, and an illumination device which illuminates said liquid crystal display panel, wherein said illumination device includes said backlight according to claim 1.

13. The backlight according to claim 1, wherein,
the reflector changes a direction of the received incoming light of the second light guide plate at an angle of 180 degrees and outputting the direction-changed light changed into the end face of the first light guide plate,
the first reflector includes an outer shape of a cylinder halved lengthwise with a curved surface inside the first reflector including a mirror face.

14. A backlight, comprising:
a first light guide plate which emits a light inputted from an end face thereof from a main surface thereof;
a second light guide plate which includes an end face for an incoming light and an end face for an emitting light, and which is arranged behind said first light guide plate;
a light source which is arranged near said end face for an incoming light of said second light guide plate;
a reflection sheet which is arranged between said first light guide plate and said second light guide plate;
a chassis which houses said first light guide plate, said second light guide plate and said reflection sheet;
a rear cover which fixes said first light guide plate, said second light guide plate and said reflection sheet with said chassis, wherein
said first light guide plate and said second light guide plate are positioned in a thickness direction thereof,
wherein the first light guide plate and the second light guide plate are sandwiched by the chassis and the rear cover at respective positions thereof; and
a reflector optically connecting i) the end face for the emitting light of the second light guide to ii) the inputted light end face of the first light guide,
wherein a layer of air exists between said first light guide plate and said second light guide plate,
wherein said first light guide plate includes one or more first positioning parts, wherein said second light guide plate includes one or more second positioning parts at a position which is different from a position of said first positioning parts, and wherein said chassis includes a first engaging part at a position facing said first positioning part and includes a second engaging part at a position facing said second positioning part, and
wherein said reflection sheet includes one or more third positioning parts.

15. A backlight, comprising:
a first light guide plate which emits a light inputted from an end face thereof from a main surface thereof;
a second light guide plate which includes an end face for an incoming light and an end face for an emitting light, and which is arranged behind said first light guide plate;
a light source which is arranged near said end face for an incoming light of said second light guide plate;
a reflection sheet which is arranged between said first light guide plate and said second light guide plate;
a chassis which houses said first light guide plate, said second light guide plate and said reflection sheet;
a rear cover which fixes said first light guide plate, said second light guide plate and said reflection sheet with said chassis, wherein
said first light guide plate and said second light guide plate are positioned in a thickness direction thereof,
wherein the first light guide plate and the second light guide plate are sandwiched by the chassis and the rear cover at respective positions thereof; and
a reflector optically connecting i) the end face for the emitting light of the second light guide to ii) the inputted light end face of the first light guide,
wherein a layer of air exists between said first light guide plate and said second light guide plate,
wherein said first light guide plate includes one or more first positioning parts, wherein said second light guide plate includes one or more second positioning parts at a position which is different from a position of said first positioning parts, and wherein said chassis includes a first engaging part at a position facing said first positioning part and includes a second engaging part at a position facing said second positioning part, and
wherein said reflection sheet includes one or more third positioning parts at a position corresponding to said first positioning part.

16. A backlight, comprising:
a first light guide plate which emits a light inputted from an end face thereof from a main surface thereof;
a second light guide plate which includes an end face for an incoming light and an end face for an emitting light, and which is arranged behind said first light guide plate;
a light source which is arranged near said end face for an incoming light of said second light guide plate;
a reflection sheet which is arranged between said first light guide plate and said second light guide plate;
a chassis which houses said first light guide plate, said second light guide plate and said reflection sheet;
a rear cover which fixes said first light guide plate, said second light guide plate and said reflection sheet with said chassis, wherein
said first light guide plate and said second light guide plate are positioned in a thickness direction thereof,
wherein the first light guide plate and the second light guide plate are sandwiched by the chassis and the rear cover at respective positions thereof; and a reflector optically connecting i) the end face for the emitting light of the second light guide to ii) the inputted light end face of the first light guide, wherein a layer of air exists between said first light guide plate and said second light guide plate, wherein said first light guide plate includes one or more first positioning parts, wherein said second light guide plate includes one or more second positioning parts at a position which is different from a position of said first positioning parts, and wherein said chassis includes a first engaging part at a position facing said first positioning part and includes a second engaging part at a position facing said second positioning part, and wherein said reflection sheet includes one or more third positioning parts at a position which is different from a position of said first positioning part and said second positioning part, and wherein said chassis includes a third engaging part at a position facing said third positioning part.

* * * * *